(12) United States Patent
Koottayi et al.

(10) Patent No.: US 11,265,329 B2
(45) Date of Patent: **\*Mar. 1, 2022**

(54) MECHANISMS FOR ANOMALY DETECTION AND ACCESS MANAGEMENT

(71) Applicant: Oracle International Corporation, Redwood Shores, CA (US)

(72) Inventors: Vipin Koottayi, Kerala (IN); Vikas Pooven Chathoth, Karnataka (IN); Aarathi Balakrishnan, Karnataka (IN); Madhu Martin, Karnataka (IN); Deepak Ramakrishanan, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/867,243

(22) Filed: May 5, 2020

(65) Prior Publication Data

US 2020/0267162 A1 Aug. 20, 2020

Related U.S. Application Data

(63) Continuation of application No. 15/940,604, filed on Mar. 29, 2018, now Pat. No. 10,721,239.
(Continued)

(51) Int. Cl.
*H04L 29/06* (2006.01)
*H04L 67/50* (2022.01)
(Continued)

(52) U.S. Cl.
CPC .......... *H04L 63/102* (2013.01); *G06F 15/76* (2013.01); *G06F 21/50* (2013.01); *G06F 21/552* (2013.01);
(Continued)

(58) Field of Classification Search
CPC .............. H04L 63/102; H04L 63/1416; H04L 63/1433; H04L 67/22; G06F 15/76;
(Continued)

(56) References Cited

U.S. PATENT DOCUMENTS 7,305,709 B1  12/2007  Lymer et al.
7,581,249 B2  8/2009  Bussiere et al.
(Continued)

FOREIGN PATENT DOCUMENTS

CA  2531410  6/2007
CN  104951539  9/2015
(Continued)

OTHER PUBLICATIONS

Japan Application No. 2019-514755 received an Office Action, dated Oct. 5, 2021, no English Translation Available, list of references is attached, 4 pages.
(Continued)

*Primary Examiner* — Ghodrat Jamshidi
(74) *Attorney, Agent, or Firm* — Kilpatrick Townsend & Stockton LLP

(57) ABSTRACT

The present disclosure relates generally to threat detection, and more particularly, to techniques for managing user access to resources in an enterprise environment. Some aspects are directed to the concept of managing access to a target resource based on a threat perception of a user that is calculated using a rule or policy based risk for the user and a behavior based risk for the user. Other aspects are directed to preventing insider attacks in a system based on a threat perception for each user logged into the system that is calculated using a rule or policy based risk for each user and a behavior based risk for each user. Yet other aspects are directed to providing a consolidated view of users, applica-
(Continued)

tions being accessed by users, and the threat perception, if any, generated for each of the users.

11 Claims, 18 Drawing Sheets

Related U.S. Application Data

(60) Provisional application No. 62/479,827, filed on Mar. 31, 2017.

(51) Int. Cl.
    *G06F 21/50*     (2013.01)
    *G06K 9/62*     (2022.01)
    *G06F 21/55*     (2013.01)
    *G06F 15/76*     (2006.01)
    *G06N 20/00*     (2019.01)

(52) U.S. Cl.
    CPC ........ *G06K 9/6218* (2013.01); *H04L 63/1416* (2013.01); *H04L 63/1433* (2013.01); *H04L 67/22* (2013.01); *G06N 20/00* (2019.01)

(58) Field of Classification Search
CPC ..... G06F 21/50; G06F 21/552; G06K 9/6218; G06N 20/00
See application file for complete search history.

(56) References Cited

U.S. PATENT DOCUMENTS

| | | | |
|---|---|---|---|
| 7,783,666 B1 * | 8/2010 | Zhuge | G06F 16/122 707/783 |
| 7,912,965 B2 | 3/2011 | Wahl | |
| 7,921,459 B2 | 4/2011 | Houston et al. | |
| 9,166,993 B1 | 10/2015 | Liu | |
| 9,419,841 B1 | 8/2016 | Kozolchyk et al. | |
| 10,412,106 B2 * | 9/2019 | Srivastava | H04L 63/1466 |
| 10,432,671 B2 | 10/2019 | Joseph et al. | |
| 10,447,738 B2 | 10/2019 | Joseph et al. | |
| 10,547,646 B2 | 1/2020 | Joseph et al. | |
| 10,679,756 B1 * | 6/2020 | Hanson | G06F 17/18 |
| 10,721,239 B2 | 7/2020 | Koottayi et al. | |
| 2005/0041789 A1 | 2/2005 | Warren-Smith et al. | |
| 2005/0108568 A1 | 5/2005 | Bussiere et al. | |
| 2006/0140127 A1 | 6/2006 | Lee et al. | |
| 2007/0121596 A1 | 5/2007 | Kurapati et al. | |
| 2008/0022404 A1 | 1/2008 | Holtmanns et al. | |
| 2009/0177675 A1 | 7/2009 | Trumbull et al. | |
| 2011/0225625 A1 | 9/2011 | Wolfson et al. | |
| 2011/0258118 A1 | 10/2011 | Ciurea | |
| 2013/0097662 A1 | 4/2013 | Pearcy et al. | |
| 2013/0097701 A1 * | 4/2013 | Moyle | H04L 63/20 726/22 |
| 2013/0312097 A1 | 11/2013 | Turnbull | |
| 2014/0089807 A1 | 3/2014 | Delrio et al. | |
| 2014/0181968 A1 | 6/2014 | Ge et al. | |
| 2014/0245378 A1 | 8/2014 | Faltyn et al. | |
| 2014/0258155 A1 | 9/2014 | Suryanarayanan et al. | |
| 2015/0215329 A1 | 7/2015 | Singla et al. | |
| 2015/0262066 A1 | 9/2015 | Li et al. | |
| 2015/0319185 A1 * | 11/2015 | Kirti | H04L 67/306 726/23 |
| 2015/0356451 A1 * | 12/2015 | Gupta | G06F 21/552 706/52 |
| 2016/0088019 A1 | 3/2016 | Li et al. | |
| 2016/0094461 A1 | 3/2016 | Shetty et al. | |
| 2016/0258845 A1 * | 9/2016 | Mankovskii | H04L 67/18 |
| 2016/0358268 A1 | 12/2016 | Verma et al. | |
| 2016/0359872 A1 | 12/2016 | Yadav et al. | |
| 2017/0060918 A1 | 3/2017 | Iyer et al. | |
| 2017/0140278 A1 | 5/2017 | Gupta et al. | |
| 2017/0230418 A1 | 8/2017 | Amar et al. | |
| 2017/0251008 A1 * | 8/2017 | Andreeva | G06F 21/316 |
| 2018/0288063 A1 | 10/2018 | Koottayi et al. | |
| 2018/0307909 A1 | 10/2018 | O'Brien et al. | |
| 2018/0316576 A1 | 11/2018 | Kang et al. | |
| 2019/0245856 A1 | 8/2019 | Irwan et al. | |
| 2019/0327271 A1 | 10/2019 | Saxena et al. | |

FOREIGN PATENT DOCUMENTS

| | | |
|---|---|---|
| CN | 105303324 | 2/2016 |
| JP | 2013533531 A | 8/2013 |
| WO | WO2016138067 A | 9/2016 |

OTHER PUBLICATIONS

U.S. Appl. No. 16/716,133, Non-Final Office Action dated Aug. 4, 2021, 10 pages.
Chinese Application No. 201780056956.5 received a First Office Action dated Jan. 13, 2021, 5 pages Original Office Action, 6 pages English Translation.
"Information Technology-Security Techniques-Selection", Deployment and Operations of Intrusion Detection and Prevention Systems (IDPS), ISO/IEC 27039, Feb. 15, 2015, pp. 1-48.
"Seven Steps to a Superior Physical Identity and Access Management Solution", Alert Enterprise, White Paper, Available online at: www.alertenterprise.com, Nov. 17, 2015, 19 pages.
Ahn et al., "Security Policy Decision for Automation of Security Network Configuration", Communications, APCC, The 9th Asia-Pacific Conference, IEEE, vol. 3, Sep. 21, 2003, pp. 1057-1061.
Pal et al., "User Behavior Based Anomaly Detection for Cyber Network Security", Happiest Minds Technologies Pvt. Ltd., Jan. 2014, pp. 1-8.
Turbotodd, Tivoli Access Manager, WordPress.com. Available online at: https://turbotodd.wordpress.com/tag/tivoli-access-manager/, Feb. 22, 2012, pp. 1-3.
International Application No. PCT/US2017/051886, International Preliminary Report on Patentability dated Mar. 28, 2019, 10 pages.
International Application No. PCT/US2017/051886, International Search Report and Written Opinion dated Jan. 9, 2018, 18 pages.
International Application No. PCT/US2017/051886, Invitation to Pay Additional Fees and Partial Search Report dated Nov. 7, 2017, 13 pages.
U.S. Appl. No. 15/705,377, Non-Final Office Action dated May 8, 2019, 9 pages.
U.S. Appl. No. 15/705,377, Notice of Allowance dated Aug. 16, 2019, 8 pages.
U.S. Appl. No. 15/705,383, Notice of Allowance dated Aug. 1, 2019, 5 pages.
U.S. Appl. No. 15/705,383, Notice of Allowance dated May 10, 2019, 9 pages.
U.S. Appl. No. 15/705,388, Non-Final Office Action dated May 8, 2019, 7 pages.
U.S. Appl. No. 15/705,388, Notice of Allowance dated Sep. 18, 2019, 9 pages.
U.S. Appl. No. 15/940,604, Non-Final Office Action dated Dec. 20, 2019, 15 pages.
U.S. Appl. No. 15/940,604, Notice of Allowance dated Apr. 2, 2020, 10 pages.
U.S. Appl. No. 16/716,133 received a Final Office Action dated Nov. 23, 2021, 10 pages.

* cited by examiner

MECHANISMS FOR ANOMALY DETECTION AND ACCESS MANAGEMENT

CROSS-REFERENCE TO RELATED APPLICATIONS

The present application is a continuation of U.S. Non-Provisional application Ser. No. 15/940,604, filed Mar. 29, 2018, entitled "MECHANISMS FOR ANOMALY DETECTION AND ACCESS MANAGEMENT," which claims priority and benefit from U.S. Provisional Application No. 62/479,827, filed Mar. 31, 2017, entitled "MECHANISMS FOR ANOMALY DETECTION AND ACCESS MANAGEMENT," the entire contents of which are incorporated herein by reference for all purposes.

BACKGROUND

The present disclosure relates generally to threat detection, and more particularly, to techniques (e.g., systems, methods, computer program products storing code or instructions executable by one or more processors) for managing user access to resources in an enterprise environment.

Computer networks have become important tools for modern business. Today a large amount of information is stored in and accessed across such networks by users throughout the world. Much of this information is, to some degree, private or confidential and protection of the information is required. Not surprisingly then, various network security monitor devices have been developed to help uncover attempts by unauthorized persons and/or devices to gain access to computer networks and the information stored therein.

In the context of enterprise systems, a user identity generally refers to information that uniquely identifies a user. By providing some of such information to a network security monitor device of the enterprise system, a user may be permitted to access various resources available within the enterprise. These resources can include, for example, software products, applications (e.g., cloud-based applications, enterprise applications, or any other applications), cloud services, various types of data (e.g., networked files, directory information, databases, or the like) and other resources. In order to effectively manage user access to resources within an enterprise, the enterprise often has to monitor and track the users' access to information stored in multiple target systems of the enterprise.

Therefore, techniques for managing user access to available resources within an enterprise environment continues to be a priority and are desired.

BRIEF SUMMARY

In various embodiments, techniques are provided (e.g., a method, a system, non-transitory computer-readable medium storing code or instructions executable by one or more processors) for monitoring user access and detecting threats in real-time by detecting anomalous access requests from users. In various embodiments, a method is provided for accessing management of a target resource. The method includes receiving, at a computing system from a client application executing at a computing device, data associated with an access request, the access request requesting access to the target resource on a target system, by a user; analyzing, by the computing system, the data associated with the access request against data collected concerning interactions between the user and one or more enforcement policies to obtain a rule or policy based risk for the user; analyzing, by the computing system, the data associated with the access request against a behavior model associated with the user to obtain a behavior based risk for the user; determining, by the computing system, a threat perception for the user based on the rule or policy based risk for the user and the behavior based risk; and transmitting, by the computing system, the threat perception score to at least one of: the target system, the target resource, a visualization server, and an access manager such that the at least one of: the target system, the target resource, the visualization server, and the access manager allow, challenge, or deny access to the target resource based on the threat perception score for the user.

In some embodiments, the method further includes selecting, by the computing system, the behavior model from a plurality of behavior models associated with the user, wherein: (i) the selection is based on the data associated with the access request, (ii) the selected behavior model includes a data cluster generated based on a parameter of data, and (iii) the data associated with the access request includes data associated with the parameter of data.

In some embodiments, the method further includes generating, by the computing system, the plurality of behavior models, where the generating the plurality of behavior models comprises: obtaining, by the computing system, a plurality of historical access requests associated with the user over a period of time; identifying, by the computing system, a set of parameters associated with data from the plurality of historical access requests to be monitored; and analyzing, by the computing system, the data from the plurality of historical access requests against the set of parameters to generate the plurality of behavior models.

Optionally, the analyzing the data from the plurality of historical access requests comprises generating, by the computing system, the behavior model by classifying the data from the plurality of historical access requests against the parameter and using a clustering algorithm on the classified data to generate the data cluster. The set of parameters to be monitored may be identified by the target application on the target system.

Optionally, the analyzing the data associated with the access request against the behavior model comprises: (i) determining, by the computing system, a deviation of the access request from one or more data clusters of the behavior model, and (ii) obtaining, by the computing system, the behavior based risk for the user based on the deviation.

Optionally, the analyzing the data associated with the access request against the data collected concerning the interactions between the user and the one or more enforcement policies comprises: (i) determining, by the computing system, a number of times that the user successfully or unsuccessfully accessed the target application on the target system, and (ii) obtaining, by the computing system, the rule or policy based risk for the user based on the number of times that the user successfully or unsuccessfully accessed the target application.

In some embodiments, the method further includes assigning, by the computing system, a first weight to the rule or policy based risk for the user, and assigning, by the computing system, a second weight to the behavior based risk for the user.

In various embodiments a system is provided for access management of a target resource. The system includes one or more processors and non-transitory machine readable storage medium; a distributed environment that includes a user device, a plurality of agents, an access management and threat detection system, an information management system, and target system having a target resource; and program instructions configured to: receive, at the information management system from the user device, data associated with an access request, the access request requesting access to the target resource, by a user; analyze, by the information management system, the data associated with the access request against data collected concerning interactions between the user and one or more enforcement policies deployed within the access management and threat detection system to obtain a rule or policy based risk for the user; analyze, by the information management system, the data associated with the access request against a behavior model associated with the user to obtain a behavior based risk for the user; determine, by the information management system, a threat perception for the user based on the rule or policy based risk for the user and the behavior based risk; and transmit, by the information management system, the threat perception score to the access management and threat detection system such that the access management and threat detection system allows, challenges, or denies access to the target resource based on the threat perception score for the user. The program instructions are stored on the non-transitory machine readable storage medium for execution by the one or more processors.

In some embodiments, the program instructions are further configured to select, by the information management system, the behavior model from a plurality of behavior models associated with the user, wherein: (i) the selection is based on the data associated with the access request, (ii) the selected behavior model includes a data cluster generated based on a parameter of data, and (iii) the data associated with the access request includes data associated with the parameter of data.

In some embodiments, the program instructions are further configured to generate, by the information management system, the plurality of behavior models, where the generating the plurality of behavior models comprises: obtaining, by the access management and threat detection system, a plurality of historical access requests associated with the user over a period of time; identifying, by the information management system, a set of parameters associated with data from the plurality of historical access requests to be monitored; and analyzing, by the information management system, the data from the plurality of historical access requests against the set of parameters to generate the plurality of behavior models.

Optionally, the analyzing the data from the plurality of historical access requests comprises generating, by the computing system, the behavior model by classifying the data from the plurality of historical access requests against the parameter and using a clustering algorithm on the classified data to generate the data cluster. The set of parameters to be monitored may be identified by the target application on the target system.

Optionally, the analyzing the data associated with the access request against the behavior model comprises: (i) determining, by the information management system, a deviation of the access request from one or more data clusters of the behavior model, and (ii) obtaining, by the information management system, the behavior based risk for the user based on the deviation.

Optionally, the analyzing the data associated with the access request against the data collected concerning the interactions between the user and the one or more enforcement policies comprises: (i) determining, by the information management system, a number of times that the user successfully or unsuccessfully accessed the target application on the target system, and (ii) obtaining, by the information management system, the rule or policy based risk for the user based on the number of times that the user successfully or unsuccessfully accessed the target application.

In some embodiments, the program instructions are further configured to assign, by the information management system, a first weight to the rule or policy based risk for the user, and assigning, by the information management system, a second weight to the behavior based risk for the user.

In various embodiments, a non-transitory machine readable storage medium is provided for=access management of a target resource. The non-transitory machine readable storage medium having instructions stored thereon that when executed by one or more processors cause the one or more processors to perform a method comprising: receiving, at an information management system from a user device, data associated with an access request, the access request requesting access to a target resource on a target system, by a user; analyzing, by the information management system, the data associated with the access request against data collected concerning interactions between the user and one or more enforcement policies deployed within an access management and threat detection system to obtain a rule or policy based risk for the user; analyzing, by the information management system, the data associated with the access request against a behavior model associated with the user to obtain a behavior based risk for the user; determining, by the information management system, a threat perception for the user based on the rule or policy based risk for the user and the behavior based risk; and transmitting, by the information management system, the threat perception score to the access management and threat detection system such that the access management and threat detection system allows, challenges, or denies access to the target resource based on the threat perception score for the user.

Optionally, the analyzing the data associated with the access request against the behavior model comprises: (i) determining, by the information management system, a deviation of the access request from one or more data clusters of the behavior model, and (ii) obtaining, by the information management system, the behavior based risk for the user based on the deviation.

Optionally, the analyzing the data associated with the access request against the data collected concerning the interactions between the user and the one or more enforcement policies comprises: (i) determining, by the information management system, a number of times that the user successfully or unsuccessfully accessed the target application on the target system, and (ii) obtaining, by the information management system, the rule or policy based risk for the user based on the number of times that the user successfully or unsuccessfully accessed the target application.

In some embodiments, the method further comprises assigning, by the information management system, a first weight to the rule or policy based risk for the user, and assigning, by the information management system, a second weight to the behavior based risk for the user.

In various embodiments, a method is provided for preventing insider attacks from within a system. The method includes monitoring, by a computing system, one or more live information flows, where the live information flows include flows of data from users within user sessions to a plurality of destinations on a system; analyzing, by the computing system, the data associated with the one or more live information flows against data collected concerning interactions between each of the users and one or more enforcement policies to obtain a rule or policy based risk for each of the users; analyzing, by the computing system, the data associated with the one or more live information flows against a behavior model associated with each of the users to obtain a behavior based risk for each of the users; determining, by the computing system, a threat perception for each of the users based on the rule or policy based risk and the behavior based risk obtained for each of the users, respectively; and transmitting, by the computing system, the threat perception score to at least one of: the target system, the target resource, a visualization server, and an access manager such that the at least one of: the target system, the target resource, the visualization server, and the access manager allow, challenge, or deny activity of each of the users based on the threat perception score determined for each of the users, respectively.

In some embodiments, the method further includes generating, by the computing system, one or more behavior models for each of the users, where the generating the one or more behavior models comprises: obtaining, by the computing system, a plurality of historical user activity associated with each of the users over a period of time; identifying, by the computing system, a set of parameters associated with data from the plurality of historical access requests to be monitored, wherein the set of parameters are identified based on multiple factors including a pattern of system usage by users or a group of users that are similar to each of the users; and analyzing, by the computing system, the data from the plurality of historical access requests against the set of parameters to generate the plurality of behavior models.

Optionally, the analyzing the data from the plurality of historical access requests comprises generating, by the computing system, the behavior model associated with each of the users by classifying the data from the plurality of historical access requests against the set of parameters and using a clustering algorithm on the classified data to generate one or more data clusters within each of the behavior models associated with each of the users.

Optionally, the analyzing the data associated with the one or more live information flows against the behavior model associated with each of the users comprises: (i) determining, by the computing system, a deviation of the activity within the live information flows from the one or more data clusters within each of the behavior models associated with each of the users, and (ii) obtaining, by the computing system, the behavior based risk for each of the users based on the deviation, respectively.

Optionally, the analyzing the data associated with the one or more live information flows against the data collected concerning the interactions between each of the users and the one or more enforcement policies comprises: (i) determining, by the computing system, a number of times that each of the users successfully or unsuccessfully performed the activity, and (ii) obtaining, by the computing system, the rule or policy based risk for the user based on the number of times that the user successfully or unsuccessfully performed the activity.

In some embodiments, the method further includes assigning, by the computing system, a first weight to the rule or policy based risk for each of the users, and assigning, by the computing system, a second weight to the behavior based risk for each of the users, wherein the first weight and the second weight are assigned based on a frequency the activity within the system.

In some embodiments, the method further includes: providing, by the computing system, a user interface that includes a depiction of each of the live information flows from each of the users to each of the destinations on the system, wherein the user interface further includes a depiction of the threat perception determined for each of the users; determining, by the computing system, an occurrence of a security event within the one or more live information flows based on a trigger of an enforcement policy from the one or more enforcement policies, wherein the enforcement policy includes a specification of a source, a destination, and an enforcement action, and when the data within the one or more live information flows matches at least the source and the destination of the enforcement policy, the enforcement policy is triggered and the enforcement action is applied; and updating, by the computing system, the user interface to reflect the occurrence of the security event by: (i) identifying the user that is associated with the enforcement action applied by the enforcement policy, and (ii) updating the threat perception determined for the user based on the occurrence of the security event.

In various embodiments, a system is provided for preventing insider attacks from within a system. The system includes: one or more processors and non-transitory machine readable storage medium; a distributed environment that includes a plurality of user devices, a plurality of agents, an access management and threat detection system, an information management system, and a plurality of destinations on a system; and program instructions configured to: monitor, by the access management and threat detection system, one or more live information flows, where the live information flows include flows of data from the plurality of user devices to the plurality of destinations on the system; analyze, by the information management system, the data associated with the one or more live information flows against data collected concerning interactions between each user associated with each of the plurality of user devices and one or more enforcement policies deployed within the access management and threat detection system to obtain a rule or policy based risk for each of the users; analyze, by the information management system, the data associated with the one or more live information flows against a behavior model associated with each of the users to obtain a behavior based risk for each of the users; determine, by the information management system, a threat perception for each of the users based on the rule or policy based risk and the behavior based risk obtained for each of the users, respectively; and transmit, by the information management system, the threat perception score to the access management and threat detection system such that the access management and threat detection system allows, challenges, or denies activity of each of the users based on the threat perception score determined for each of the users, respectively. The program instructions are stored on the non-transitory machine readable storage medium for execution by the one or more processors.

In some embodiments, the program instructions are further configured to generate, by the information management system, one or more behavior models for each of the users, where the generating the one or more behavior models comprises: obtaining, by the access management and threat detection system, a plurality of historical user activity associated with each of the users over a period of time; identifying, by the information management system, a set of parameters associated with data from the plurality of historical access requests to be monitored, wherein the set of parameters are identified based on multiple factors including a pattern of system usage by users or a group of users that are similar to each of the users; and analyzing, by the information management system, the data from the plurality of historical access requests against the set of parameters to generate the plurality of behavior models.

Optionally, the analyzing the data from the plurality of historical access requests comprises generating, by the information management system, the behavior model associated with each of the users by classifying the data from the plurality of historical access requests against the set of parameters and using a clustering algorithm on the classified data to generate one or more data clusters within each of the behavior models associated with each of the users.

Optionally, the analyzing the data associated with the one or more live information flows against the behavior model associated with each of the users comprises: (i) determining, by the information management system, a deviation of the activity within the live information flows from the one or more data clusters within each of the behavior models associated with each of the users, and (ii) obtaining, by the information management system, the behavior based risk for each of the users based on the deviation, respectively.

Optionally, the analyzing the data associated with the one or more live information flows against the data collected concerning the interactions between each of the users and the one or more enforcement policies comprises: (i) determining, by the information management system, a number of times that each of the users successfully or unsuccessfully performed the activity, and (ii) obtaining, by the information management system, the rule or policy based risk for the user based on the number of times that the user successfully or unsuccessfully performed the activity.

In some embodiments, the program instructions are further configured to assign, by the information management system, a first weight to the rule or policy based risk for each of the users, and assign, by the computing system, a second weight to the behavior based risk for each of the users, wherein the first weight and the second weight are assigned based on a frequency the activity within the system.

In some embodiments, the program instructions are further configured to: provide, by the information management system, a user interface that includes a depiction of each of the live information flows from each of the users to each of the destinations on the system, wherein the user interface further includes a depiction of the threat perception determined for each of the users; determine, by the information management system, an occurrence of a security event within the one or more live information flows based on a trigger of an enforcement policy from the one or more enforcement policies, wherein the enforcement policy includes a specification of a source, a destination, and an enforcement action, and when the data within the one or more live information flows matches at least the source and the destination of the enforcement policy, the enforcement policy is triggered and the enforcement action is applied; and update, by the information management system, the user interface to reflect the occurrence of the security event by: (i) identifying the user that is associated with the enforcement action applied by the enforcement policy, and (ii) updating the threat perception determined for the user based on the occurrence of the security event.

In various embodiments, a non-transitory machine readable storage medium is provided for preventing insider attacks from within a system. The non-transitory machine readable storage medium having instructions stored thereon that when executed by one or more processors cause the one or more processors to perform a method comprising: monitoring, by an access management and threat detection system, one or more live information flows, where the live information flows include flows of data from users within user sessions to a plurality of destinations on a system; analyzing, by the information management system, the data associated with the one or more live information flows against data collected concerning interactions between each of the users and one or more enforcement policies deployed within the access management and threat detection system to obtain a rule or policy based risk for each of the users; analyzing, by the information management system, the data associated with the one or more live information flows against a behavior model associated with each of the users to obtain a behavior based risk for each of the users; determining, by the information management system, a threat perception for each of the users based on the rule or policy based risk and the behavior based risk obtained for each of the users, respectively; and transmitting, by the information management system, the threat perception score to at least one of: the target system, the target resource, a visualization server, and an access manager such that the at least one of: the target system, the target resource, the visualization server, and the access manager allow, challenge, or deny activity of each of the users based on the threat perception score determined for each of the users, respectively.

Optionally, the analyzing the data from the plurality of historical access requests comprises generating, by the information management system, the behavior model associated with each of the users by classifying the data from the plurality of historical access requests against the set of parameters and using a clustering algorithm on the classified data to generate one or more data clusters within each of the behavior models associated with each of the users.

Optionally, the analyzing the data associated with the one or more live information flows against the behavior model associated with each of the users comprises: (i) determining, by the information management system, a deviation of the activity within the live information flows from the one or more data clusters within each of the behavior models associated with each of the users, and (ii) obtaining, by the information management system, the behavior based risk for each of the users based on the deviation, respectively.

Optionally, the analyzing the data associated with the one or more live information flows against the data collected concerning the interactions between each of the users and the one or more enforcement policies comprises: (i) determining, by the information management system, a number of times that each of the users successfully or unsuccessfully performed the activity, and (ii) obtaining, by the information management system, the rule or policy based risk for the user based on the number of times that the user successfully or unsuccessfully performed the activity.

In some embodiments, the method further comprises assigning, by the information management system, a first weight to the rule or policy based risk for each of the users, and assign, by the computing system, a second weight to the behavior based risk for each of the users, wherein the first weight and the second weight are assigned based on a frequency the activity within the system.

In some embodiments, the method further comprises: providing, by the information management system, a user interface that includes a depiction of each of the live information flows from each of the users to each of the destinations on the system, wherein the user interface further includes a depiction of the threat perception determined for each of the users; determining, by the information management system, an occurrence of a security event within the one or more live information flows based on a trigger of an enforcement policy from the one or more enforcement policies, wherein the enforcement policy includes a specification of a source, a destination, and an enforcement action, and when the data within the one or more live information flows matches at least the source and the destination of the enforcement policy, the enforcement policy is triggered and the enforcement action is applied; and updating, by the information management system, the user interface to reflect the occurrence of the security event by: (i) identifying the user that is associated with the enforcement action applied by the enforcement policy, and (ii) updating the threat perception determined for the user based on the occurrence of the security event.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
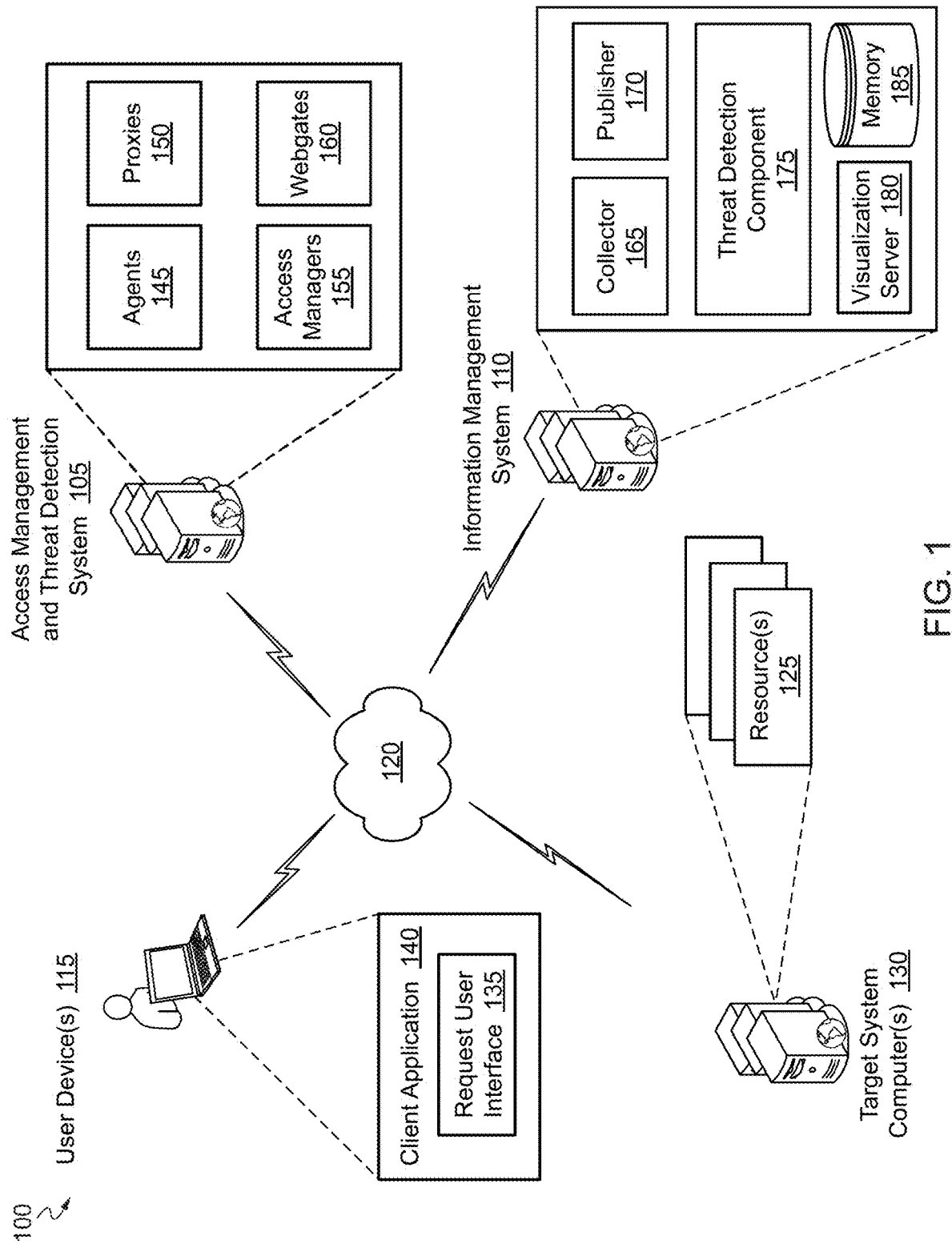
FIG. 1 depicts a simplified block diagram illustrating a high level threat intelligence platform in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

I. Introduction

The following disclosure describes a threat intelligence platform that can provide real-time threat detection and analytics. In various embodiments, a system may be provided for that includes: a processor; and a memory storing a set of instructions which when executed by the processor configure the processor to: receive a security event from an agent, the security event including at least a destination and a source; trigger a policy when the security event corresponds to a policy, wherein the policy includes a specification of the source, the destination, and an enforcement action; implement the enforcement action for the security event based on the policy; and update a user interface to link the source and destination of the security event through the triggered policy. However, an entity (e.g., a company, a country) may have thousands or hundreds of thousands of employees and other individuals (e.g., users, consultants, guests) who are constantly accessing various services (e.g., sources) through its network generating security events. As people are attempting to gain access to a wide variety services, there may be various access violations, password errors and such that would necessitate monitoring. Currently, static security rules within security policies are not able to match evolving threats for compromised users, compromised applications, and compromised hosts. Manual or home-grown analysis with user interfaces is cost prohibitive as there is an extremely high volume of user activity (e.g., billions of events per day). Moreover, it is difficult to have automated pattern detection for a large number of users that would be highly accurate and thereby be capable of preventing those unauthorized users from gaining access to services.

To address these problems, various embodiments provide techniques (e.g., systems, methods, computer program products storing code or instructions executable by one or more processors) for analyzing security events using dynamic policies and behavior models to determine anomalous activity, and displaying a consolidated view of active threats and user activity including the perceived threats associated with each user. Some embodiments may track user access and collect information in real-time to identify patterns, produce analytics, and take corrective actions accordingly. By collecting data in real-time or near real-time, corrective actions determined based on the data can be immediately applied. For example, when a user is authenticating against an application, there would only be a short period of time (e.g., milliseconds) until when action(s) would need to be taken to prevent an unauthorized user from gaining access to content. In additional or alternative embodiments, by collecting data in real-time or near real-time and keeping a history of such data, corrective actions determined based on the real-time data and historical data can be applied to prevent the unauthorized user from gaining access even after the user has been authenticated, and take the user out of the network.

Some embodiments provide visibility into the identity of users, resource usage patterns, and performance characteristics. In certain embodiments, the techniques can provide real-time enforcement leveraging certain access controls. For example, certain embodiments may enforce compliance or block users to unsanctioned applications, perform adaptive authorization, challenge users based on policy and behavior models, and perform content inspection for privacy and leakage. Certain embodiments may provide real-time enforcement using dynamic rules and models, and analytics. Some embodiments may provide a threat visualization that presents real-time data analytics in a manner that is easily understandable to an end user. By digesting a large amount of data and presenting the analyzed data in real-time and in a meaningful way, an end user may identify actionable items and ensure that certain policies are enforced while also ensuring that appropriate policies are updated.

In one example, as a user is in a login page and typing in the username and password and submitting those user credentials, the user credentials are being sent in real-time or near real time to a data collector. In some instances, the data can be collected and sent less than every second or 30 milliseconds, depending on a set of tuning parameters (e.g., whether the collector is sitting in the cloud, etc.). Aside from the network latency (e.g., when the agent is on a host machine collecting information and the collector is on a different machine such as in the cloud), there is very little delay in the transporting of data (i.e., near real-time). Nonetheless, as the user types in the credentials, the system may determine whether these credentials typically come from a particular server and determines that additional challenges may need to be presented to the user if there is suspicious activity. By the time the user accesses the page, if the system determines that the user should not be authorized despite the credentials being validated, the system will kick the user out of accessing the page.

In some embodiments, a Web proxy can constantly monitor and learn user activity and behavior and trigger an anomaly (thereby cause additional challenges to be presented to the user), after the user logs into an account. For example, the user may try to transfer a large sum of money. This action may trigger the system to present the user with additional challenges. In certain embodiments, the proxy may provide another source of information (e.g., traffic flow) and the collected data is fed and analyzed in real time. When a user is accessing a protected application or a cloud application that is not protected by an agent, the proxy server can determine the user's activity e.g., that the user is going to a certain website to download information. The proxy server can monitor the user activity and provide information that the user is blacklisted because of the collected data. Further, the proxy may provide historical information such that when the user is accessing a new site, the historical information pertaining to the user can be taken into consideration when granting access to the user.

Some embodiments can feed the real time data as it becomes available to a real time visualization server and present the analytics to a customer in real time. As the data is provided to the customer in real time, an action may be determined quickly and responsive to those real time analytics. Some embodiments may store the data and use the stored or historical data to come up with additional rules and policies that can be applied in real time. By mining historical data, certain embodiments may produce enforcement policies and behavior models based on the historical data. Certain embodiments may use both historical data and analytics that is computed in real time and trigger an anomaly accordingly. Advantageously, these approaches are capable of collecting, monitoring, visualizing, and taking action on very large volumes of security data in real-time (i.e., billions of streaming events).

II. System Architecture for Anomaly Detection

FIG. 1 depicts aspects of a system 100 for detecting threats in real-time based on detecting anomalous access requests from users, in accordance with various embodiments of the present disclosure. In some embodiments, the system 100 includes an access management and threat detection system 105 and an information management system 110 communicatively connected to a user device 115 via a network 120 in a distributed environment. The access management and threat detection system 105 and the information management system 110 are part of an identity access manager. There are different types of agents as part of the identity access manager and the agents protect access for web servers or applications. For example, when a user is trying to access an email server or a document server, there may be a protection agent that communicates with an access server (e.g., Oracle Access Manager (OAM server)). OAM is a security application that provides access management functionality such as web single sign-on (SSO), identity context, authentication and authorization, policy administration, testing, logging, auditing, etc. The agent will validate whether the user can access the email server or the document server, for example, by validating the credentials associated with an ID. Certain embodiments may have enhanced agents and access servers such that when a user is requesting the data, information on who is accessing what, is sent out to a data collection engine of the information management system 110 in real-time.

Network 120 may facilitate communications and exchange of data between user device 115, access management and threat detection system 105, and information management system 110. Network 120 may be any type of network familiar to those skilled in the art that can support data communications using any of a variety of commercially-available protocols, including without limitation TCP/IP, SNA, IPX, AppleTalk, and the like. Merely by way of example, network 120 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

User device 110 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, user device 110 may be any other electronic device, such as a thin-client computer, Internet-enabled gaming system, and/or personal messaging device, capable of communicating over a network (e.g., network 115).

Although exemplary system environment 100 is shown with one user device, any number of user and/or client computing devices may be supported, in other embodiments.

Access management and threat detection system 105 may comprise one or more computers and/or servers, which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up access management and threat detection system 105 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, the access management and threat detection system 105 may comprise one or more components operable to protect resources 125 provided by one or more target systems 130 of an organization. In some embodiments, a 'target system' may refer to any system that provides or comprises one or more resources. Resources 125 to which access is provided, either locally or remotely, by a target system 130 may be of various types including a file, a web page, a document, web content, a computing resource, software products, applications (e.g., cloud-based applications, enterprise applications, or any other applications), cloud services, various types of data (e.g., networked files, directory information, databases, or the like), and other resources. For example, system 100 may include resources such as applications and/or content accessible through those applications. A resource may be requested and accessed using an application. For example, an application may request access to a web page from a resource server based on a URL identifying a requested resource. Resources may be provided by one or more target systems 130, e.g., a resource server that provides access to one or more resources upon authentication of user in a SSO system. A target system 130 may include one or more databases, lightweight directory access protocol (LDAP) servers, Active Directory (AD) systems, Email Systems, UNIX systems and the like. For example, a target system 130 may be an Active Directory (AD) system that provides access to active directory services to access an Active Directory server. In some examples, a target system 130 may be a computing system that provides access to a meeting room, such as access to the meeting room using a badge. In some embodiments, a target system 130 may also be referred to as an application instance.

In certain embodiments, access to resources 125 provided by a target system 130 may be controlled using various types of accounts in the target system 130. An account may be provisioned in a target system 130 based upon the resources 125 provided by the target system 130. An account may be of various types such as user accounts, administrative accounts, application accounts, and the like, with each account type providing a particular level of access to one or more resources 125 provided by the target system 130. Separate accounts (e.g., user accounts, administrative accounts, and/or application accounts) may be provided in a target system 130 to enable a user to access or otherwise log into the target system 130. An account may be created, or provisioned, to a user or a group of users (e.g., an organization) based on the identity of the user or the group of users. A user or a group of users may be provided with a particular account type to access a particular resource type. For instance, an e-mail account on an Exchange server provided to a user may be an account of a resource type Exchange. A user may be given multiple accounts, each corresponding to an account type for a resource type. For example, a user may have two different accounts for logging into a target system 130 to perform different types of operations. For example, a target system 130 may host an Email exchange server and provide an email account type. The same target system 130 may also host a human resource (HR) system and provide an HR administrator account type for performing administrative functions related to the HR system. A particular user may have an email account on the target system 130 and also have an HR administrative account on the target system 130. When logged in using the email account, the user may access emails. When logged in using the HR administrative account, the user can perform administrative tasks related to managing resources in an organization.

In accordance with at least some embodiments, a user on a user device 115 may communicate with a target system 130 to request access for a resource 125 (e.g., an email application) by accessing a web-based request user interface (UI) 135 on the user device 115. For example, request UI may include a graphical user interface 135 viewable via a client application 140 (e.g., a browser) on the user's device 115. When a user wishes to access a resource on a target system 130 or attempt to perform an operation on a resource on target system 130, access management and threat detection system 105 may intercept the access request from the user, and attempt to first authenticate/authorize the user. For example, the access management and threat detection system 105 may provide the user with a log-in page to obtain the user's credentials (e.g., log-in identifier and password). The access management and threat detection system 105 may then be configured to determine if the user is an authorized user based on the user's login credentials. The access management and threat detection system 105 may be configured to receive various types of access requests such as web requests, software development kit (SDK) requests, programmatic requests, and the like for various events/operations (e.g., authN, authZ, policy checks, stepup authN, single sign-on (SSO), token issuance) via various channels (HTTP, OAP) from the users.

In various embodiments, the access management and threat detection system 105 includes one or more agents 145, one or more proxies 150 (e.g., forward or reverse proxies), one or more access managers 155 (e.g., access server), and/or one or more Webgates 160 (a Webgate is a web-server plug-in for OAM that intercepts HTTP requests and forwards them to the access manager or access server for authentication and authorization). The access management and threat detection system 105 may be implemented in system 100 according to an agent-server model for enabling communication between user device 115 and target system 130 (e.g., a distributed environment server) to provide access control functionality over resource 125. The agent-server model may include an agent component (e.g., the one or more agents 145, one or more proxies 150, and/or one or more Webgates 160, also known as a single sign-on agent or policy-enforcement agent) and a server component (e.g., one or more access managers 155, also known as a single sign-on server or policy server). For example, the one or more access managers 155 may include a security application (e.g., OAM) and serve as the decision component for controlling access to the resource 125, and the one or more agents 145, one or more proxies 150, and/or one or more Webgates 160 may implement or operate as the enforcement component for controlling access to the resource 125. In some embodiments, the one or more agents 145, one or more proxies 150, and/or one or more Webgates 160 may be deployed with the resource 125 as a plugin or as a portion of the resource 125, or the one or more agents 145, one or more proxies 150, or one or more Webgates 160 may be provisioned separate from the resource 125, for example, running on a web server in front of the resource 125. The one or more access managers 155 may be deployed as a part of the identity access manager.

The access management and threat detection system 105 enables SSO functionality within a distributed environment, and may perform various access control related functions for managing access to resources within the distributed environment. For example, the one or more agents 145, one or more proxies 150, one or more access managers 155, and/or one or more Webgates 160 may perform authentication of a user operating a user device 115. Authentication is a process by which a user is verified to determine that he/she is who he/she claims to be. To authenticate a user, access management and threat detection system 105 may present a user with a request for authentication credentials in the form of a challenge (e.g., via the user's web browser). In various embodiments, enforcement policies (e.g., authentication policies) and behavior analysis are used to specify the authentication methodology to be used for authenticating the user for whom the access must be provided on a given resource. The policies and behavior analysis are used to determine a threat perception for the user and may be used define the way in which the resource access is to be protected (e.g., type of encryption, or the like). The one or more access managers 155 may also determine authorization of a user to access a resource 125. Authorization is the process of determining if a user has a right to access a requested resource. In various embodiments, enforcement policies (e.g., authorization policies) and behavior analysis are used to specify the conditions under which a user or group of users has access to a resource. For example, an administrator may only authorize certain users within a group to access particular resources and/or those users must be behaving in a predicted manner.

The one or more agents 145 may be enforcement agents that act as a filter for resource requests. The one or more agents 145 may intercept resource requests and apply enforcement policies and behavior analysis to determine whether the requested resources are protected by the access management and threat detection system 105. If so, the resource request may be forwarded to the one or more access managers 155 to determine whether the user requesting the protected resource may access the protected resource. In certain embodiments, one or more Webgates 160 may be used as an agent so that it can filter the resource requests. The one or more agents 145 and the one or more Webgates 160 may be a hardware structure or a combination of hardware and software implementations, in accordance with various embodiments.

The one or more proxies 150 may be enforcement agents that act as a filter for resource requests. For example, the one or more proxies 150 may be authentication proxies that handle user authentication for resources. The authentication proxies may be called (e.g., instantiated) by a web application or the resources to provide authentication capabilities. In some embodiments, the authentication proxies may include a high-level API that integrates one or more low-level authentication schemes to allow for programs that rely on authentication to be designed and written independently of an underlying authentication scheme. The one or more proxies 150 may intercept resource requests and apply enforcement policies and behavior analysis to determine whether the requested resources are protected by the access management and threat detection system 105. If so, the resource request may be forwarded to one or more access managers 155 to determine whether the client requesting the protected resource may access the protected resource. An example of such an authentication proxy is a pluggable authentication module (PAM) used in Linux systems. The one or more proxies 150 may be a hardware structure or a combination of hardware and software implementations, in accordance with various embodiments.

The one or more access managers 155 may have multiple components for authentication and/or authorization processes. Additionally, the one or more access managers 155 may include one or more authentication schemes. The authentication schemes may be configured to protect the resources using one or more access policies (e.g., static or dynamic enforcement policies) and behavior analysis. The authentication schemes may include details about a credential collection mechanism and type of credential collector used to collect credentials. For example, credential collection may occur using an HTTP(S) transport channel that is handling HTTP(S) request from a remote user. In certain embodiments, the authentication schemes may identify a redirect URL (Uniform Resource Locator), which is used to notify the user device 115 of the success or failure of the authentication and/or authorization processes. In addition, the authentication scheme may identify an authentication level indicating the trust level to protect transport of credentials from the user device 115. For example, an LDAP (Lightweight Directory Access Protocol) scheme may be at authentication level 2 with an LDAP authentication module to protect Manager-related resource, e.g., URLs, based on a form challenge method. In the form challenge method, an HTML form with one or more text input fields may be used to gather credential information. In some embodiments, the form-based challenge may collect credentials such as username and password, social security number, date of birth, one time password, or a combination of other common parameters.

FIG. 1 further illustrates an example of a SSO session managed within a distributed environment implementing the access management and threat detection system 105 including the one or more agents 145, one or more proxies 150, one or more access managers 155, and/or one or more Webgates 160. For example, a user may operate user device 115 to request access to resource 125 controlled by target system 130. The request may be routed to or intercepted by the one or more agents 145, one or more proxies 150, and/or one or more Webgates 160, which controls access to resource 125. In some embodiments, some resources managed by the one or more agents 145, one or more proxies 150, and/or one or more Webgates 160 may be protected, in which case the one or more agents 145, one or more proxies 150, and/or one or more Webgates 160 may query the one or more access managers 155 to determine if the requested resource is protected. The one or more access managers 155 checks relevant enforcement policies for the resource 125 to determine whether authentication is required for access to the resource 125. If the requested resource 125 is protected and requires authentication for use, the one or more access managers 155 may determine whether any session exists for the user. Upon determining that no session has been established for the user, the user may be forwarded by the one or more access managers 155 to a login service (e.g., an authentication service) of the identity access manager. The login service checks relevant enforcement policies for the resource and a threat perception for the user to determine whether the user is authentic.

In various embodiments, upon determining that no session has been established for the user, the information management system 110 is configured to analyze information associated with request against enforcement policies and a behavior model generated for the user to determine if the user's access request is anomalous and generate a threat perception for the user. The authentication service may request authentication credentials from the user based on enforcement policies and the threat perception for the user (e.g., request a user name/password and a one-time password from a user with a higher threat perception). The authentication service may determine that the user is authentic upon receiving the proper authentication credentials by validating the credentials against those stored in a user directory or identity store.

Based on determining that the user is authentic, the one or more access managers 155 may forward the user back to the one or more agents 145, one or more proxies 150, and/or one or more Webgates 160. Thereafter, the one or more agents 145, one or more proxies 150, and/or the one or more Webgates 160 establish a first session for the user. As a result, the user is logged into the target system 130 (e.g., a distributed environment server) for the session. Once logged in, the user may access resources to which the user is authorized to access, such as running different applications, accessing cloud storage, or the like. Once the user is logged into the target system 130, the one or more access managers 155 may create a cookie that tracks session activity for a user. The cookie may include a length of time that the user has been active on a session. The cookie may be stored as session activity data within the information management system 110.

Upon determining that the user is authenticated for a SSO session, the one or more agents 145, one or more proxies 150, and/or one or more Webgates 160 may process the original request for resource 125 by directing an authorization query to the one or more access managers 155. The one or more access managers 155 checks relevant enforcement policies for the resource and a threat perception for the user to determine whether the user is authorized to access the resource 125. The authorization service may allow or deny access based on the enforcement policies and the threat perception for the user (e.g., a user with a higher threat perception may be denied access even if they are typically authorized via an enforcement policy to access the resource). The one or more access managers 155 responds to the one or more agents 145, one or more proxies 150, and/or one or more Webgates 160 with an allow or deny message based on the enforcement policies and the behavior analysis. Upon determining that the user is allowed access to the resource 125, the one or more agents 145, one or more proxies 150, and/or one or more Webgates 160 allow the request from the user device 115 for access to the resource 125 to go through and the user can access the resource 125 on the target system 130 via user device 115. Upon determining that the user is denied access to the resource 125, the one or more agents 145, one or more proxies 150, and/or one or more Webgates 160 notifies the user device 115 that access to the resource 125 for the user is not permitted and block access to the resource 125.

In various embodiments, the access management and threat detection system 105 is further configured to detect insider attacks by monitoring a user's usage pattern after the user has successful logged into the target system. Once logged in, the user may commence activity, such as running different applications, accessing cloud storage, accessing resources, creating/editing resources, or the like. Once the user is logged into the target system 130, the one or more access managers 155 may create a cookie that tracks session activity for a user. The cookie may include a length of time that the user has been active on a session. The cookie may be stored as session activity data within the information management system 110. Upon determining that the user is authenticated for a SSO session, the one or more agents 145, one or more proxies 150, one or more Webgates 160, and/or one or more access managers 155 monitor activity of the user within the session. The information management system 110 is configured to analyze information associated with the activity against enforcement policies and one or more behavior models generated for the user to determine if the user's activity is anomalous and generate a threat perception for the user. The one or more access managers 155 checks relevant enforcement policies and the threat perception for the user to determine whether the access management and threat detection system 105 should initiate a configured action, e.g., allow/challenge/deny the user's activity in the target system. Upon determining that the activity is allowed, the one or more agents 145, one or more proxies 150, and/or one or more Webgates 160 allow the activity from the user device 115 to continue. Upon determining that the user activity is suspicious or not allowed, the one or more agents 145, one or more proxies 150, and/or one or more Webgates 160 challenge's the user with one or more security challenges (e.g., a one-time password) or denies/ends the activity.

FIG. 1 further depicts aspects of the information management system 110 for collecting information regarding user access to resources, analyzing the information, dynamically publishing rules or policies based on the analytics of the information, building models based on the analytics of the information, determining rule or policy based risk based on the rules or policies, determining behavioral based risk based on the models, determining a consolidation of rule based risk and behavioral risk (e.g., determining a threat perception of the end user), and visualizing the risks and/or threat perception. Information management system 110 may comprise one or more computers and/or servers in a distributed environment, which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up information management system 110 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, the information management system 110 is responsible for supporting the access management and threat detection system 105 to protect and authorize user access to resources 125. In some embodiments, the information management system 110 is configured to collect information regarding user access to resources, generate and publish rules and policies based on the information, determine a user's behavior background based on the information, build models around the behavior background, detect anomalous access requests from users based on the rules and models in order to determine a threat perception for the end user, and ultimately authenticate/ authorize the user's access into the target system 130 in real-time. In additional or alternative embodiments, the information management system 110 is configured to collect information regarding a user's activities after the user has logged into the system, generate and publish rules and policies based on the information, determine a user's behavior background based on the information, build models around the behavior background, detect anomalous activity from users based on the rules and models in order to determine a threat perception for the end user, and ultimately allow, challenge, or end the user's access into the target system 130 in real-time. As used herein, when an action is "based on" something, this means the action is based at least in part on at least a part of the something.

In some embodiments, the information management system 110 includes a data collector 165 and a publisher 170 communicatively connected via network 120 to access management and threat detection system 105. The data collector 165 and the publisher 170 are also communicatively connected to a threat detection component 175, a visualization server 180, and system memory 185. In various embodiments, the collector 165 and publisher 170 include a network topology in which nodes such as the threat detection component 175, the visualization server 180, the one or more agents 145, the one or more proxies 150, the one or more access managers 155, and/or the one or more Webgates 160 are all interconnected. The collector 165 and publisher 170 implement a software architecture for distributed computing that include routing messages and data between the various nodes, controlling deployment of various policies (e.g., enforcement policies) and/or behavior analysis, and providing services such as facilitating the collection of data, analyzing the data, generating behavior models, and publishing the various policies (enforcement policies) and/or behavior analysis to listeners (i.e., the agents).

The threat detection component 175 and visualization server 180 may comprise one or more computers and/or servers, which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up threat detection component 175 and visualization server 180 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

The system memory 185 may be one or more storage mediums, including for example, non-transitory machine readable storage medium such as flash memory, permanent memory such as read-only memory ("ROM"), semi-permanent memory such as random access memory ("RAM"), any other suitable type of non-transitory storage component, or any combination thereof. The memory 185 provides for storage of computer readable program instructions, data structures, program modules and other data for operation of the system 100 in accordance with the different aspects. In embodiments, memory 185 may store an operating system, application programs, the policies, data such as information related to a user's activity and access requests, and program data in accordance with certain aspects.

With the system of FIG. 1 deployed, the access management and threat detection system 105 (enabled by one or more agents 145, one or more proxies 150, one or more access managers 155, and/or one or more Webgates 160) can make informed decisions based on: (i) rules within static and dynamic enforcement policies, and (ii) behavior models, about whether an end user is authenticated and/or authorized to access resources on a target system. The rules may include a specification of a destination (e.g., URI, host name, destination IP address or port, etc. of a target system or resource such as an application or service), a source (e.g., a user ID, designation for a group of users, an IP address for a client device, etc.), a time duration (e.g., a predetermined time that the policy is in effect), and an enforcement action (e.g., block a user from accessing, request authentication/ authorization factors, monitor activity, etc.), and when network traffic or a user activity pattern corresponding to the rules in a policy, the policy is triggered and the enforcement action may be applied taking into consideration a threat perception for the user. The static and dynamic enforcement policies may be stored in the memory 185 as a cache of static policies and a cache of dynamic policies. The behavior models are generated for one or more users based on analysis of information related to the user's or group of users' access request(s) (e.g., analyzing a pattern in which a user accesses various applications stored on the target system), and when network traffic or a user activity pattern corresponding to the behavior model is anomalous, a threat perception for the user is updated to reflect the anomalous activity and the enforcement action may be applied taking into consideration the updated threat perception for the user. The behavior models may be stored in the memory 185.

In certain embodiments, the general method proceeds as follows. An end user enters a URL or an identification of a requested resource residing in a protected policy domain. The user's browser sends the URL as part of an HTTP request to a Web Server. The one or more agents 145, one or more proxies 150, and/or one or more Webgates 160 recognize and intercept the request. If the end user has not already been authenticated, the one or more agents 145, one or more proxies 150, and/or one or more Webgates 160 causes the Web Server to issue a challenge to the browser for log-in information. The received log-in information is then passed back to the Web Server and on to the one or more agents 145, one or more proxies 150, and/or one or more Webgates 160. The one or more agents 145, one or more proxies 150, and/or one or more Webgates 160 in turn makes an authentication request to the one or more access managers 155, which determines whether the user's supplied log-in information is authentic or not. The one or more access managers 155 performs the authentication by accessing attributes of the user's identity profile and the resource's authentication criteria stored in memory 185. If the user's supplied log-in information satisfies the authentication criteria, the process flows as described below; otherwise, the end user is notified that access to the requested resource is denied and the process halts.

After authenticating the user, the one or more agents 145, one or more proxies 150, and/or one or more Webgates 160 queries the one or more access managers 155 about whether the user is authorized to access the resource requested. The one or more access managers 155 in turn queries information management system 110 for the appropriate authorization criteria for the requested resource. The one or more access managers 155 retrieves the authorization criteria for the resource and answers the one or more agents 145, one or more proxies 150, and/or one or more Webgates 160 authorization query, based on the resource's authorization criteria and the user's identity profile. If the user is authorized, the user is granted access to the resource; otherwise, the user's request is denied. Various alternatives to the above described flow are also within the spirit and scope of the present invention.

In various embodiments, the authentication and authorization decisions may be made based on policy domains, policies (e.g., static and dynamic enforcement policies), behavior models and perceived threat perception. A policy domain is a logical grouping including Web Server host ID's, host names, URL prefixes, and rules. Host names and URL prefixes specify the course-grain portion of the web name space a given policy domain protects. Rules of the policy domain specify the conditions in which access to requested resources is allowed or denied, and to which end users these conditions apply. Policy domains may comprise two levels of rules: first level default rules and second level rules contained in policies. The first level default rules may apply to any resource in a policy domain not associated with a policy. The second level rules may apply to any resource in a policy domain associated with a policy. A policy is a grouping including a URL pattern, resource type, operation type (such as a request method), and rules that restrict access to particular resources by user, static or dynamic group memberships, time of the day or week, IP (Internet Protocol) addresses, etc. A policy may be static or dynamic, attached to a policy domain, and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated in view of the behavior models and perceived threat perception to determine whether the request should be allowed or denied; if there is not a match, then default policy domain rules are used.

The static and dynamic enforcement policies are statements that bring together attributes to express what is allowed and what is not allowed. The enforcement policies may use any type of attributes (user attributes, resource attributes, object, actions, environment attributes, etc.) and comprise logic such as Boolean logic, in which rules contain statements (e.g., "IF, THEN") to evaluate the attributes and determine what is allowed and is not allowed (e.g., whether the user making the request is authenticated, whether the user making the request is authorized to access the requested resource, whether the user making the request is authorized to take the request action on the requested resource, etc). For example: IF the requestor is a manager, THEN allow read/write access to sensitive data. The static enforcement policies comprise default rules or rules written/rewritten through-out the life span of the system (e.g., created by an administrator of the system) to evaluate evolving dynamics or attributes of the system. However, the rules contained within the static policies are not written/rewritten in real-time such that the policy is capable of evaluating evolving dynamics or attributes of the system in real-time. On the other hand, the dynamic enforcement policies comprise rules written/rewritten (e.g., created by machine learning techniques or an administrator of the system) to evaluate evolving dynamics or attributes of the system in real-time.

In various embodiments, systems and methods for policy provisioning and enforcement are provided based on threat detection. In some embodiments, the static and dynamic policies can be created manually by an administrator or can be injected automatically by a consuming application (e.g., an application on a target system providing a resource) or the threat detection component 175 into the system 100. Certain embodiments may also designate a time period (e.g., a predetermined period of time) in which the static or dynamic policy should be run. For example, a policy may be set for only a predetermined period of time (e.g., 5 minutes, 10 minutes, 4 hours, 1 day, 2 weeks, etc.) to allow the threat detection component 175 and/or administrator to monitor and trigger anomalies based on data in that predetermined period of time. The policy may then expire after the predetermined period of time. As such, some embodiments may monitor the behavior and ensure the stability of the system with the newly added dynamic policy. The dynamic policies can be modified as they are monitored and can become a solid or persistent policy (i.e., not bounded by the predetermined period of time). Using machine learning capabilities, some embodiments may create a dynamic policy for a predetermined time period (e.g., the next 30 minutes) and eventually have it permanently overwrite the static policies that are configured for the system. As should be understood, it would be inefficient and resource consuming to have a security administrator, who is viewing a visualization application, generate these policies quickly and push them into the system regardless of whether a full approval process is needed. The static and dynamic enforcement policies may be enforced by the various agents (e.g., one or more agents 145, one or more proxies 150, and/or one or more Webgates 160) along the enforcement path and the policies may be interpreted as each applies to the agents' position in the enforcement path.

In some embodiments, a sticky policy (i.e., a static policy that cannot be overwritten) may be created where the policy may not be affected by the threat detection component 175. In other embodiments, the threat detection component 175 can learn about the default policies or policies created by an administrator (e.g., static policies that can be overwritten) or a consuming application, and modify the policies or overwrite the policies with dynamic policies. In certain embodiments, the machine learning aspects of the threat detection component 175 may cause a default policy or static policy previously configured by a system administrator to change based on additional data, and overwrite the default policy or static policy. For example, an anomalous activity can be put into a certain category that corresponds to a block policy, which is a high alert policy, that may overwrite another category such as a second factor authentication where even if a user is in a valid session, some action performed by the user may cause a form or a question to be present to the user for an additional layer of authentication. Other embodiments may specify to never create a block policy (e.g., a policy with logic configured to block a user or group of users from an action such as read/write on a resource), so that the administrator can monitor the types of policies the machine learning is triggering. For example, the administrator may for the first few months observe that the machine learning is creating several high alerts under certain circumstances or when there are certain patterns, verify those alerts, and determine that the machine learning is not creating a high number of false positives. Then, the administrator or consuming application may adjust the policy and indicate that instead of creating a high alert for this pattern, create a second factor authentication policy for the same pattern.

In one example, a user can be accessing servers (e.g., a target system) every day from 7-9 am from home or another location, and then from 10 am to 4 pm, accessing the servers from work or the headquarters. When the user travels to another location and tries to access the servers, the threat detection component 175 may determine that the accessing is an anomalous activity, generate a higher threat perception, and thereby trigger a second factor authentication. The second factor authentication may be triggered because the system had already been configured with a default or static policy for the anomaly to trigger second factor authentication when the location based data does not match the historical data and the higher threat perception is received. After a period of time, the system may learn and adapt from the default or static policies and the behavior models, and determine that based on user behavior pattern, the system should not trigger an anomalous activity when the user is traveling to the other location. The system may also differentiate a user behavior pattern. Based on historical data and updated real-time data, the system may determine whether an anomalous activity should be triggered intelligently. The threat detection component 175 can be constantly learning from historical data and real-time data to create and modify the end user identity profiles or models of behavior and the polices governing the behavior. Instead of updating the identity profiles and policies every week or every other week, these identity profiles or models of behavior and policies are updated in real-time such that the following anomaly detections have taken all historical data and real-time data of the user's activity into account. This enables something that might have been identified as an anomalous activity to be taken into account promptly for the next determination. So in this example, the new location and behavior models have already been updated in the memory 185 such that the next time the user logs in while the user is in this geographic location, the activity on the system does not cause the anomaly detection to be triggered. In essence, the behavior models adapt to the user activity, a new dynamic policy is created that overwrites the previous policy, and the updated behavior model and new policy do not recognize the activity as anomalous, trigger an increased threat perception for the user, and trigger counteractive enforcement action.

FIG. 1 further illustrates a mechanism for event/data collection. In some embodiments, threat detection component 175 can be more successful in generating enforcement policies and behavior models if the machine learning has more data to process and can find increased numbers and complexity of patterns. In certain embodiments, the event/data collection is dynamic and an inspection policy mechanism can facilitate the collection of data. The collected data can be linked to machine learning, which will then create more enforcement policies or trigger anomalies triggered by the enforcement policies. In some embodiments, any consuming application integrating with the access management and threat detection system 105 can define a an inspection policy comprising a subset of parameters that needs to be monitored to evaluate a usage pattern for the application and related resources. For example, a financial application might want to track usage based on user, time of the day, duration of access etc. Alternatively, when onboarding a new consuming application, the system 100 may activate (automatically via the threat detection component 175 or manually via an administrator) a preliminary inspection policy to understand how the consuming application and related resources work. The preliminary inspection policy may determine a subset of parameters that needs to be monitored to evaluate a usage pattern for the application and related resources. The threat detection component 175 or an administrator can define an inspection policy based on the determined subset of parameters. The inspection policy may generate data by examining user activity with the application in consideration of the rules of the inspection policy. The threat detection component 175 may automatically categorize the activity based on the collected data, and determine that the activity is a low, medium, or high alert activity based on a pattern identified within the data. Thereafter, the threat detection component 175 may automatically generate dynamic inspection and enforcement policies based on the data collected by the collector 165, which can be published with the publisher 170 and used by agents to overwrite static policies for a predetermined period of time.

In certain embodiments, anything that is published in the enterprise (e.g., on a network of the enterprise) may be available in the real-time data collection via the collector 165 and consumed and analyzed by the threat detection component 175. In some embodiments, the threat detection component 175 can perform event correlation and generate reports and publish the reports on the publisher 170 from which the threat detection component 175 continuously receives the information in real time and may then provide the information via visualization server 180 through a user interface. The threat detection component 175 is also consuming the real-time events as well as historical data from the collector 165 and the memory 185. Accordingly, the threat detection component 175 can generate behavior models, detect anomalies, publish policies (inspection or enforcement), and/or generate threat perceptions based on the rules of policies and behavior models.

In various embodiments, to detect and trigger a anomalous activity or a threat, the system may rely on data captured and sent by the agent(s) including one or more agents 145, one or more proxies 150, one or more access managers 155, and/or one or more Webgates 160. A predefined set of attributes (e.g., user attributes, resource attributes, object, actions, environment attributes, etc.) may not suffice when the agent(s) have to support newer target systems, consuming application(s), and change in existing application interfaces. Accordingly, the use of dynamic inspection policies may allow the system to send dynamic rules requesting agents to collect/inspect additional information or attributes such as data in various payloads (e.g., HTTP). This information may then be reported as part of the regular access request event. The threat detection component 175 can then generate or update behavior models, detect anomalies on this new set of data or information, and insert a dynamic enforcement policy, which may then trigger more anomalies. As more anomalies are triggered, additional enforcement policies may be created to prevent particular types of traffic, thus completing the collection, detection, and enforcement cycle.

The collector 165 may be configured to obtain the information associated with a security event such as an end user's access request and report the information or data to the threat detection component 175. The configuration of the collector 165 may be based on default or static inspection policies comprising rules for collecting a predefined set of attributes (e.g., user attributes, resource attributes, object, actions, environment attributes, etc.) when certain criteria is satisfied. In certain embodiments, an inspection policy monitors data and informs an administrator when a certain criteria match a predefined pattern. The inspection policy does not cause an alert to be triggered when the pattern exists but collects the predefined set of attributes when the pattern exists. For example, the system may provide an inspection policy user interface (UI) that allows an administrator to designate the triggering of certain inspection policies when a set of criteria has been met (e.g., if header data matches, for a threshold time interval). In accordance with other aspects, the configuration of the collection may be based on dynamic inspection policies comprising rules for collecting the data or attributes. For example, the collector 165 and the threat detection component 175 may work together to collect the predefined set of attributes and trigger anomalies based on rules that were previously configured (default, static, or dynamic inspection and enforcement policies). The inspection policies can designate the predefined set of attributes to be collected and the criteria for the patterns in the data to be identified. Once the attributes and patterns are collected via the collector 165, the threat detection component 175 may inspect the attributes and patterns in the data and determine whether the attributes and patterns match any rules defined within the enforcement policies. Once the data comes into the collector 165, it may be stored in memory 185 and becomes part of historical data. The threat detection component 175 can be constantly learning from the historical data and real-time data to create and modify the inspection and enforcement policies and the behavior models to efficiently collect information required for threat assessment of user activity on the system.

Figure 2:
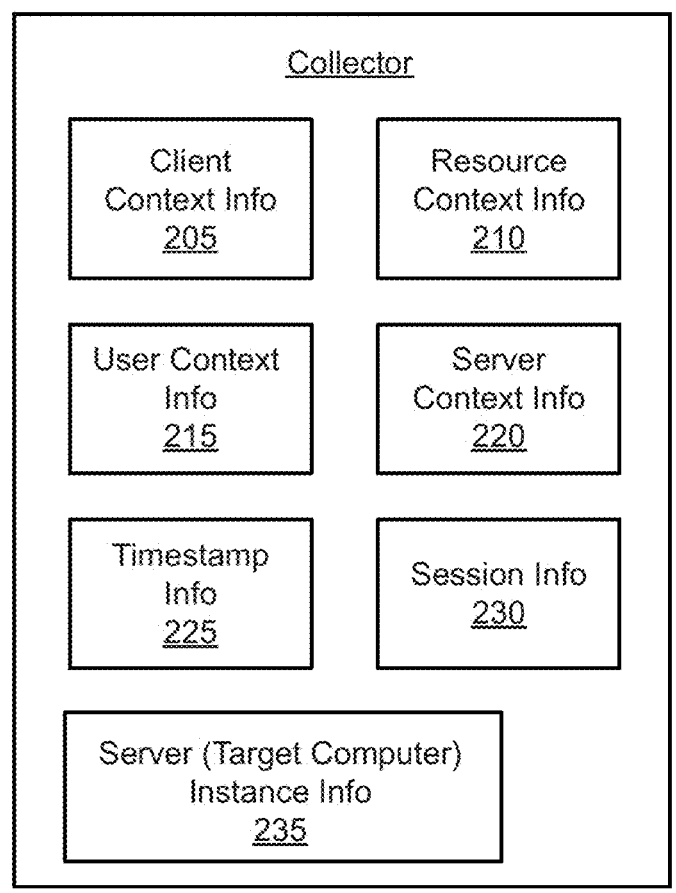
FIG. 2 depicts a simplified block diagram illustrating information associated with an event collected and classified by a collector in accordance with various embodiments.

As shown in FIG. 2, the information associated with an event may be collected by the collector 165 from one or more agents including the one or more agents 145, one or more proxies 150, one or more access managers 155, and/or one or more Webgates 160, and include, for example, the client IP address from where the request originated, device information, user information, resource being requested, time of request, and so on. In certain embodiments, the information is additionally collected from third party agents including GPS applications within the client device, weather applications, monitoring software, hardware sensors, load balancing software, etc. The information may be collected by the collector 165 in an asynchronous manner. For example, the collector 165 may include a queue configured to process the information, index the information in real-time, and perform data aggregation and query operations on the information. In some examples, the collector 165 may be configured to organize the information related to an access request received from a user into various categories such as the client context 205 (user-agent identifier, IP address, host name, GPS location, etc.), the resource context 210 (resource URL, application domain, agent name, tenant name, etc.), the user context 215 (user identity store, user identity, user groups (static or dynamic groups)), server context 220 (event context such as AuthN, Reauthn, AuthZ, Deny, etc.) timestamps 225 (last access time, last updated time, etc.), session information 230 (session ID, session index, access, etc.), the server instance (e.g., the server instance processing the request, etc.) 235 processing the request, and so on. In various embodiments, the collector 165 is configured to store the information or data obtained and organized from user activity in an information database of a memory 185.

Figure 3:
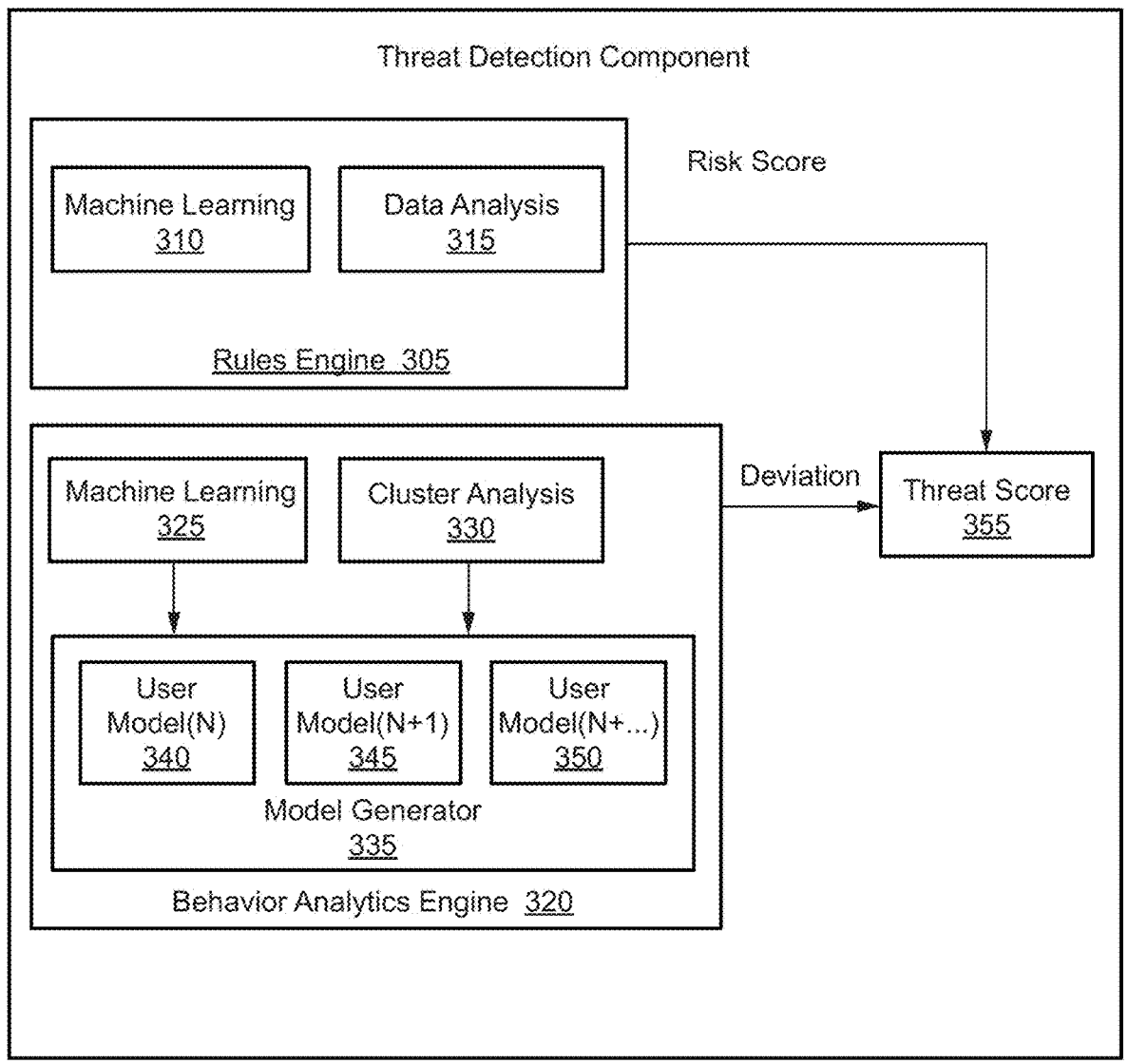
FIG. 3 depicts a simplified block diagram illustrating a threat detection component in accordance with various embodiments.

FIG. 1 further illustrates a mechanism for creating dynamic enforcement polices based on the event/data collection, and publishing the dynamic enforcement polices for consumption by the agents (e.g., one or more agents including the one or more agents 145, one or more proxies 150, one or more access managers 155, and/or one or more Webgates 160). As shown in FIG. 3, a threat detection component (e.g., threat detection component 165) may comprise a rules engine 305 having a machine learning component 310 and data analysis component 315, which are configured to create dynamic enforcement policies for a user or group of users by analyzing the incoming real-time data and the historical data regarding access requests received from the user or group of users (e.g., stored in memory 185) over a period of time. In one embodiment, the rules engine 305 may be configured to generate dynamic enforcement policies for a user or group of users by identifying a subset of parameters associated with incoming real-time data and the historical data of access requests for the user or group of users and analyze the incoming real-time data and the historical data of access requests against the subset of parameters to create dynamic enforcement policies. For example, the data analysis component 315 and machine learning component 310 may be configured to analyze a user or group of users' access requests based on a time parameter (e.g., the time) at which the user or group of users normally accesses one or more applications stored on the target system and create an enforcement policy based on monitoring the time of access from the user, over a period of time. The enforcement policy may include rules where if the user or group of users tries to access the one or more applications outside of the normal time parameter, then a second factor authentication may be requested or a block may be placed on the user or group of users.

In some embodiments, the subset of parameters to be monitored may be identified/defined by a resource (e.g., a target application) on the target system that the user generally accesses and the target application may provide this information to the data analysis component 315. For instance, the target application (e.g., a financial application) might want to track a user's access requests based on parameters such as the user id, the time of access, the duration of access, and so on. These parameters are configured with the data analysis component 315 and the machine learning component 310, which may then create an enforcement policy for a user or group of users by analyzing the incoming real-time data and the historical data of access requests over a period of time, against these parameters. In certain embodiments, in instances where data is not being collected to satisfy the subset of parameters to be monitored, the data analysis component 315 and the machine learning component 310 may be configured to create a dynamic inspection policy that is triggered to obtain such data to satisfy the subset of parameters upon certain criteria being satisfied (e.g., the user or group of users logging into the system).

In certain embodiments, the rules engine 305 may be configured to generate multiple policies for the user or group of users. These policies may be generated by analyzing incoming real-time data and the historical data of access requests for a user or group of users against different sets of parameters associated with the access requests. For example, the rules engine 305 may be configured to generate a time based policy for a user or group of users by analyzing the user's or group of users' access requests based on the time at which the user or group of users normally accesses various applications stored on the target system. In another instance, the rules engine 305 may be configured to generate an application access pattern policy for the user by analyzing a pattern in which a user accesses various applications stored on the target system. The rules engine 305 may be configured to generate a policy for the user by capturing the characteristics of security threats, intrusion, Denial Of Service (DOS) attacks from the access requests.

In some embodiments, the rules engine 305 may be configured to generate a policy by classifying the incoming real-time data and the historical data of access requests associated with a user or group of users into one or more data clusters. In certain embodiments, the rules engine 305 may be configured to generate the one or more data clusters using supervised or unsupervised machine learning or other clustering (e.g., K-means) techniques. In various embodiments, the machine learning component 310 may be configured to use unsupervised learning using a density based clustering algorithm and Euclidian distance to calculate the distance of the access request from the centroid of the cluster. In certain examples, the radius of the cluster is calculated based on the mean of the distance from centroid of each point in the cluster. Any point falling outside the radius will have higher risk based on the standard deviation. The closer user activity on the enterprise network is to the centroid, the lower is the risk for that access. In other embodiments, the machine learning component 310 may be configured to use unsupervised learning using a density based clustering algorithm and a mahalanobis distance (measure of the distance between a point and a distribution) that takes into account correlations of the data set for a cluster to calculate the distance of the access request from the cluster. Any point falling outside the cluster will have higher risk based on the standard deviation. The closer user activity on the enterprise network is to the centroid, the lower is the risk for that access.

The incoming real-time data and the historical data values for parameters configured by the data analysis component 315, the machine learning component 310, and/or the integrating application (e.g., the application that the user is requesting access to) can, in certain examples, become data points for building the cluster. Once the cluster is established, the rules engine 305 may be configured to generate a policy that includes rules regarding the one or more data clusters. For example, a rule may be established that states: if certain parameters (x, y, and z) of a request from a user or group of users does not match parameters (x, y, and z) of the cluster then an action may be taken, e.g., a second factor authentication may be requested or a block may be placed on the user or group of users. Consequently, when a new request is received from the user or the group of users, the values of the parameters from the request are matched against the rules in the policy including the already established parameters of the cluster to determine if the access request from the user or group of users is anomalous.

In some embodiments, once the cluster is established, the rules engine 305 may be further configured to categorize the policy based on threat levels. The threat levels may be determined based on the distance calculated from the center of a cluster. As an example, a traffic pattern on the enterprise network can have attributes that are used to generate a policy with rules set on criteria such as a distance of the traffic pattern from one or more clusters. If the distance is one time (e.g., one standard deviation from the mean), then the policy may be classified as a low risk and associated traffic patterns may trigger a low alert. If the distance is two times (e.g., two standard deviation from the mean), then the policy may be classified as a medium risk and associated traffic patterns may trigger a medium alert. If the distance is greater than three times (e.g., greater than three standard deviation from the mean), then the policy may be classified as a block and associated traffic patterns may trigger a block on such activity. Accordingly, the customer need not worry about whether it is an unusual pattern in the traffic pattern. Instead, the customer can be more focused on whether the traffic pattern created a low alert, a medium alert, a high alert, second factor authentication, or a block.

As described herein, a policy can be generated by rules engine 305, or an administrator (by a person seeing that an anomaly has arisen). Some embodiments use Structured Threat Information eXpression (STIX) as the standard in how the policy is declared. In various embodiments, once a policy (e.g., a new dynamic enforcement policy) is established or generated, the policy is published for consumption by the agents (e.g., the one or more agents 145, one or more proxies 150, one or more access managers 155, and/or one or more Webgates 160) in order to enforce the policy. When the policy is being consumed by the agents, the agents all become a part of an enforcement ecosystem. For example, when a new access request is received from a user or group of users, the one or more agents 145, one or more proxies 150, one or more access managers 155, and/or one or more Webgates 160 are configured to analyze the information associated with the access request against an enforcement policy (default, static, or dynamic) and behavior models to determine if the user's or group of users' access request is anomalous.

In some embodiments, the one or more agents 145, one or more proxies 150, one or more access managers 155, and/or one or more Webgates 160 may be configured to first select a policy for the user or group of users from a plurality of enforcement policies that are published. In certain embodiments, the policy may be specifically associated with the user or group of users. The selection may be based on, for example, the type of application that the user or group of users is requesting access to. For instance, if the user or group of users is requesting access to a financial application on the target system, the one or more agents 145, one or more proxies 150, one or more access managers 155, and/or one or more Webgates 160 may be configured to select a policy from the plurality of policies that analyzes a subset of parameters defined by the financial application. For example, and as noted above, a financial application might want to analyze access requests from a user or group of users based on parameters such as the user id, the time of access, the duration of access, and so on. In other embodiments, the one or more agents 145, one or more proxies 150, one or more access managers 155, and/or one or more Webgates 160 may be configured to obtain all of the plurality of enforcement policies published, and analyze access requests from a user or group of users based on parameters from all or a subset of the policies.

Once the one or more agents 145, one or more proxies 150, one or more access managers 155, and/or one or more Webgates 160 has selected or obtained a particular policy, they may be configured to analyze the information associated with the access request against the policy and determine if the user's access request is anomalous. In some embodiments, the one or more agents 145, one or more proxies 150, one or more access managers 155, and/or one or more Webgates 160 may be configured to determine an anomalous request by determining deviation of the access request from the one or more data clusters generated by the data analysis component 315 and machine learning component 310. If the deviation is beyond a predetermined threshold value, the request is determined to be anomalous. The threshold value can be determined by a user (e.g., an administrator) of system, or automatically by the rules engine 305. In certain embodiments, the threshold value may be a Euclidian distance from the centroid of the cluster or a mahalanobis distance (measure of the distance between a point and a distribution) that takes into account correlations of the data set for a cluster.

Each agent can react to a published policy in its own way to achieve the same end goal (e.g., not granting an unauthorized/unauthenticated user access to a protected resource). In certain embodiments, when an anomaly is detected and a policy to block a user is instituted (e.g., in STIX format) and published, the one or more agents 145, one or more proxies 150, one or more access managers 155, and/or one or more Webgates 160 may select or obtain the policy and determine its role in blocking the user or group of users. For example, when the user or group of users is accessing an application, the one or more access managers 155 can be the entity that validates a user's credentials and authenticates the user to be part of an authenticated session, while the one or more agents 145, one or more proxies 150, and/or one or more Webgates 160 can initiate, maintain, or drop the session such that whenever a user is accessing a resource within any part of the enforcement ecosystem, the user may be challenged and validated. The one or more proxies 150 may constantly monitor and learn a user's or groups of users' activity as it is happening, and trigger an anomaly and take action such as a block on activity based on the policy. For instance, the one or more proxies 150 may obtain information of which user to block from a policy, and when a session request is received from an IP address that corresponds to the user, the one or more proxies 150 could block the initiating of the session. Thus, even if a resource is not protected by the other agents, the one or more proxies 150 have the same policy and can take independent action on user activity.

Additionally or alternatively, the one or more agents 145, one or more access managers 155, and/or one or more Webgates 160 may constantly monitor and learn a user's or groups of users' activity as it is happening (e.g., when a user tries to type in a username or password on a login page, when the user is trying to access a protected application, or when the user is trying to access another website through an authorized session), and trigger an anomaly and take action such as a block on the activity based on the same policy. For instance, the one or more agents 145 and/or one or more Webgates 160 may check whether the session is still valid based on whether a time period has expired. In some instances, the time session will be valid for a predetermined period of time such as an hour or eight hours. The moment that session is invalid the user will be asked to login again. The one or more agents 145 and/or one or more Webgates 160 may try to validate the session using the policy and drop the session if the session is no longer valid. The one or more access managers 155 may also obtain the same policy and the next time the same user tries to login using the correct username and password the one or more access managers 155 may not grant the user access. Thus, even if a resource is not protected by one of the agents such as the one or more proxies 150, the one or more agents 145, one or more access managers 155, and/or one or more Webgates 160 have the same policy and can take independent action on user activity. Accordingly, each of the agents reacts to the policy separately and differently, as opposed to conventional systems where the agents react as a group the same way once a rule is determined.

FIG. 1 further illustrates a mechanism for generating behavior models for users or groups of users based on the event/data collection. As shown in FIG. 3, a threat detection component (e.g., threat detection component 165) may comprise a behavior analytics engine 320 having a machine learning component 325, cluster analysis component 330, and model generator 335, which are configured to generate one or more models 340, 345, 350 . . . for a user or group of users by analyzing the incoming real-time data and the historical data regarding access requests received from the user or group of users (e.g., stored in memory 185) over a period of time. For example, the behavior analytics engine 320 may be configured to analyze information related to a user's access requests from access request to an information database and generate a model for the user based on the analysis. In various embodiments, the behavior analytics engine 320 is configured to generate a model for a user or group of users by identifying a subset of parameters associated with incoming real-time data and the historical data of access requests for the user or group of users and analyze the incoming real-time data and the historical data of access requests against the subset of parameters to generate the user model for the user or group of users. For example, the behavior analytics engine 320 may be configured to analyze a user's access requests based on a time parameter (e.g., the time) at which the user normally accesses one or more applications stored on the target system and build a model based on monitoring the time of access from the user, over a period of time.

In some embodiments, the subset of parameters to be monitored may be identified/defined by a resource (e.g., a target application) on the target system that the user generally accesses and the target application may provide this information to the behavior analytics engine 320. For instance, the target application (e.g., a financial application) might want to track a user's access requests based on parameters such as the user id, the time of access, the duration of access, and so on. These parameters are configured with the behavior analytics engine 320, which may then generate/build a model for the user by analyzing the access requests from the user over a period of time, against these parameters. In certain embodiments, in instances where data is not being collected to satisfy the subset of parameters to be monitored, the behavior analytics engine 320 may be configured to create a dynamic inspection policy that is triggered to obtain such data to satisfy the subset of parameters upon certain criteria being satisfied (e.g., the user or group of users logging into the system)

In some embodiments, the behavior analytics engine 320 may be configured to generate one or more models for the user or group of users. These one or more models may be different and generated by analyzing incoming real-time data and the historical data of access requests for a user or group of users against different sets of parameters associated with the access requests. For example, as noted above the behavior analytics engine 320 may be configured to generate a time based model for a user or group of users by analyzing the user's or group of users' access requests based on the time at which the user or group of users normally accesses various applications stored on the target system. In another instance, the behavior analytics engine 320 may be configured to generate an application access pattern model for the user by analyzing a pattern in which a user accesses various applications stored on the target system. The behavior analytics engine 320 may be configured to generate a model for the user by capturing the characteristics of security threats, intrusion, Denial Of Service (DOS) attacks from the access requests.

Figure 4:
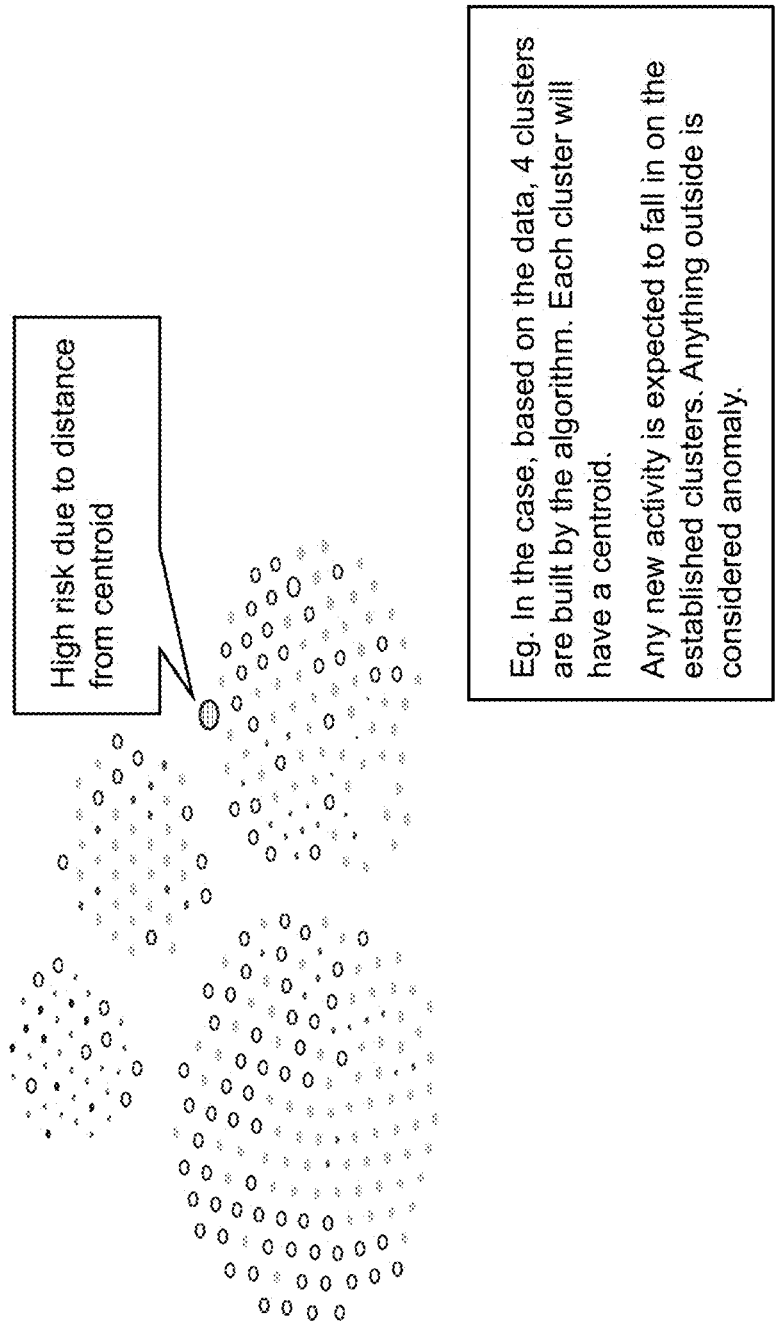
FIG. 4 depicts a behavior model having one or more data clusters in accordance with various embodiments.

As shown in FIG. 4, the behavior analytics engine 320 may be configured to generate a model 400 by classifying the incoming real-time data and the historical data of access requests associated with a user or group of users into one or more data clusters 405. In some embodiments, the behavior analytics engine 320 may be configured to generate the one or more data clusters 405 using supervised or unsupervised machine learning or other clustering (e.g., K-means) techniques. In various embodiments, the behavior analytics engine 320 may be configured to use unsupervised learning using a density based clustering algorithm and Euclidian distance to calculate the distance 410 of the access request 415 from the centroid 420 of the cluster 405. In certain examples, the radius of the cluster 425 is calculated based on the mean of the distance from centroid 420 of each point in the cluster 405. Any point falling outside the radius 425 will have higher risk based on the standard deviation. The closer the user activity on the enterprise network is to the centroid 420, the lower is the risk for that access. In other embodiments, the behavior analytics engine 320 may be may be configured to use unsupervised learning using a density based clustering algorithm and a mahalanobis distance (measure of the distance between a point and a distribution) that takes into account correlations of the data set for a cluster to calculate the distance 430 of the access request from the cluster 405. Any point falling outside the cluster 405 will have higher risk based on the standard deviation. The closer user activity on the enterprise network is to the centroid 420, the lower is the risk for that access. The historical values for parameters configured by the integrating or consuming application (e.g., the application that the user is requesting access to) can, in certain examples, become data points for building the cluster 405. The values of the parameters from the current request are matched against the already established cluster 405 to determine if the access request from the user is anomalous.

FIG. 1 further illustrates a mechanism for analyzing the information associated with a new access request against a model generated for the user or group of users to determine if the user's access request is anomalous. The incoming real-time data and the historical data values for parameters configured by the behavior analytics engine 320 and/or the integrating application (e.g., the application that the user is requesting access to) can, in certain embodiments, become data points for building the cluster. Once the cluster is established, the behavior analytics engine 320 may be configured to detect anomalous requests from a user based on the model. In some embodiments, the behavior analytics engine 320 is configured to select a user model for the user from a plurality of user models associated with the user. The selection may be based on information regarding the user, the access request received from the user, and/or the target system, application, or resource for the request, for instance, the IP address of the user, the user identifier, and/or the type of application or resource that the user is requesting to access. For example, if the user is requesting access to a financial application on the target system, the behavior analytics engine 320 may be configured to select a model from the plurality of models that analyzes a subset of parameters defined by the financial application. As discussed herein, a financial application might want to analyze access requests from a user based on parameters such as the user id, the time of access, the duration of access, and so on. These parameters are configured with the behavior analytics engine 320, and the behavior analytics engine 320 can build a model for the user over a period of time by analyzing these parameters. Consequently, when a user requests access to the financial application the behavior analytics engine 320 can select the model for determining whether the request is anomalous.

In some embodiments, the behavior analytics engine 320 may utilize machine learning and cluster analysis to detect anomalies. For example, once the behavior analytics engine 320 has selected a particular user model, the behavior analytics engine 320 may be configured to analyze the information associated with the access request against the user model and determine if the user's access request is anomalous. In various embodiments, the behavior analytics engine 320 may be configured to determine an anomalous request by determining deviation of the access request from the one or more data clusters generated by the user model. If the deviation is beyond a particular threshold value, the request is determined to be anomalous. The threshold value may be determined by a user (e.g., an administrator) of system 100, or automatically by the behavior analytics engine 320, for example using a standard deviation of 2D or 3D. The behavior analytics engine 320 may be configured to detect anomalies with greater accuracy compared to traditional batch job based detection. The behavior analytics engine 320 may use machine learning to detect anomalies. Advantageously, the model is generated based on historical data and updated using real time data and can constantly learn from this information and determine whether an anomaly should be triggered intelligently. Instead of updating the model every week or every other week, the model can be updated in real time such that an anomalous access can be detected based on all the historical data (including the most recent access by the user). This enables an access request to be identified as an anomaly to be taken into account promptly for the next request.

For example, a user can be accessing a particular resource (e.g., a server) every day from 7 am-9 am from home, and then from 10 am-4 pm, from work. When the user travels to another location and tries to access the servers, the engine can determine that the access is an anomaly and thereby trigger a second factor authentication because the location based data does not match the historical data. After a period of time, the system may learn and adapt from policies (rule) and determine that based on the user behavior pattern, the system should not trigger an anomaly when the user is traveling to the other location. The system may also differentiate a user behavior pattern. Based on historical data and updated real time data, the system may determine whether an anomaly should be triggered intelligently. The model can be constantly learning from historical data. Instead of updating the model every week or every other week, this model can be updated in real time such that the following anomaly detections have taken into account all historical data of the user's activity into account. This enables something that might have been identified as an anomaly to be taken into account promptly for the next determination. So in this example, the new location has already been updated in the database such that next time the user logs in while the user is in this geographic location doesn't cause the anomaly detection to be triggered. In essence, a new dynamic model has been created that overrides the previous model.

FIG. 1 further illustrates a mechanism to compute a threat perception (e.g., a threat score) for a user. In various embodiments, a rule or policy based risk is determined based on the rules or policies. In some embodiments, the rule or policy based risk is computed as a risk score (as shown in FIG. 4) based on previous successes and/or failures of the user's access into the target system as determined by one or more enforcement policies (static or dynamic). The number of previous successes and/or failures can be determined the rules engine 305. The success or failures may include a number of time a user has successfully logged in from a given location, a number of time a user has been successfully authenticated, a number of time a user has been successfully authorized to access a target system, application, resource, etc., a number of times a user has successfully logged in during a given time frame, a number of time a user has successfully completed a first level, second, level, third level etc. verification, a number of times a user has failed to log in from a given location, a number of times a user has failed to be authenticated, a number of times a user has failed to be authorized to access a target system, application, resource, etc., a number of times a user has failed to log in during a given time frame, a number of time a user has failed to complete a first level, second, level, third level etc. verification, or any combination thereof. For example, if a user triggered an enforcement policy requiring a password and the password was properly entered allowing the user to be authenticated and authorized for access to the resource, then the number of times that a user successfully accessed a particular resource may be increased by a number (e.g., one) or a factor (e.g., a factor of 10) and a new risk score may be calculated based on the new number. If a user triggered an enforcement policy requiring a password and the password was improperly entered such that the user authentication and/or authorization failed for access to the resource, then the number of times that a user successfully accessed a particular resource may be decreased by a number (e.g., one) or a factor (e.g., a factor of 10) or the number of times a user failed to access a resource may be increased by a number (e.g., one) or a factor (e.g., a factor of 10) and a new risk score may be calculated based on the new number. The risk score may be calculated automatically by the rules engine 305.

In certain embodiments, the rules engine 305 may use a function such as Equation (1) to compute a risk score (risk factor) for a user.

```
if(totalSuccess > 0) {
// success will reduce risk
riskFactor -= (1d * latestSuccess / (totalSuccess + totalFailure));
}
if(totalFailure > 0) {
// failure will increase risk
riskFactor += (1d * latestFailure / (totalSuccess + totalFailure));
}                                                          Equation (1)
```

As illustrated in Equation (1), the risk score for a user, in certain examples, may be determined based on determining a number of times that the user successfully accessed a particular resource (e.g., the target application) on the target system. The risk score can thus be computed based on previous successes and failures of the user's access into the system.

In various embodiments, a behavioral based risk is determined based on the models. In some embodiments, the behavioral based risk is computed as a deviation (as shown in FIG. 4) of the access request from the one or more data clusters generated by the user model. If the deviation is beyond a particular threshold value, a certain value or score may be assigned to the deviation. The threshold value can be determined by a user (e.g., an administrator) of system 100, or automatically by the behavior analytics engine 320. In certain embodiments, the threshold value may be a Euclidian distance from the centroid of the cluster or a mahalanobis distance (measure of the distance between a point and a distribution) that takes into account correlations of the data set for a cluster. For example, if the distance is one time (e.g., one standard deviation from the mean), then the deviation may be classified as a low risk and associated with a low value or score. If the distance is two times (e.g., two standard deviation from the mean), then the policy may be classified as a medium risk and associated with a medium value or score. If the distance is greater than three times (e.g., greater than three standard deviation from the mean), then the deviation may be classified as anomalous and associated with a high value or score. The score associated with a deviation may be determined automatically by the behavior engine 320.

In certain embodiments, the behavior engine 320 may use a function such as Equation (2) to compute a deviation score (risk factor) for a user.

```
if(totalSuccess > 0) {
// success will reduce risk
riskFactor -= (1d * earlierSuccess / (totalSuccess + totalFailure));
}
if(totalFailure > 0) {
// failure will increase risk
riskFactor += (1d * earlierFailure / (totalSuccess + totalFailure));
}                                                          Equation (2)
```

As illustrated in Equation (2), the deviation score for a user, in certain examples, may be determined based on detection of anomalous activity. The deviation score can thus be computed based on previous behavior of the user's access into the system.

In various embodiments, a consolidation of rule based risk and behavioral based risk (e.g., determining a threat perception of the end user) is determined based on the policy based risk (risk score) and the behavioral based risk (deviation). In some embodiments, the consolidation of rule based risk and behavioral based risk is a threat score (as shown in FIG. 4) computed as a function of the risk score (policy based risk) and the deviation (behavioral based risk). The threat score may be determined automatically by the threat detection component 175. In certain embodiments, threat detection component 175 may use a function such as Equation (3) to compute a threat score for a user.

```
if(totalSuccess > 0) {
// success will reduce risk
riskFactor (rule based) -= (0.75d * (1d * latestSuccess /
(totalSuccess + totalFailure)));
riskFactor (behavior based) -= (0.25d * (1d * earlierSuccess /
(totalSuccess + totalFailure)));
}
if(totalFailure > 0) {
// failure will increase risk
riskFactor (rule based) += (0.75d * (1d * latestFailure /
(totalSuccess + totalFailure)));
riskFactor (behavior based) += (0.25d * (1d * earlierFailure /
(totalSuccess + totalFailure)));
}                                                          Equation (3)
```

As illustrated in Equation (3), when sufficient data related to access requests for a user has not yet been captured, the threat detection component 175 may be configured to use the risk score to determine the threat score for the user. In various embodiments, the threat detection component 175 may be configured to assign a higher weight to the risk score for the user initially as compared to a weight for the deviation score. Through subsequent successful logins as the risk score drops and thus the threat score drops, the threat detection component 175 may be configured to automatically reduce the weight of the risk score and increase the weight of the deviation score. For example, the threat detection component 175 may be configured to assign a first weight (e.g., a greater 75% weight) to a rule based risk score until the amount of data collected for a user reaches a threshold level. The amount of data can be measured based on one or more factors such as storage size of data, units of information, number of access request instances, number of successful log-ins, etc. The threshold level can be determined by a user (e.g., an administrator) of system 100, or automatically by the threat detection component 175. Once the data crosses the threshold level, the rule based risk will be assigned a second weight (e.g., a lesser 25% weight). At this point, since sufficient data related to a user's access patterns have been collected, the threat detection component 175 may be configured to assign a higher weight (e.g., a greater 75% weight) to the deviation score obtained by the model to determine the threat score.

Accordingly, the system 100 may be implemented for detecting anomalous activity or threats in real-time using the rules engine 305 and the behavior analytics engine 320. The rules engine 305 operates on data that is received in real-time and has an extensible architecture, which allows for the dynamic addition and externalization of more rules as needed. The behavior analytics engine 320 determines the user's behavior and builds a model around this behavior. Together these two engines work on real-time data as well as historical data to determine a threat score for the user. This threat score is then given to consuming applications, which can respond in the way they want to, and/or the access management and detection system, which can use the threat score to enforce rules and policies. For instance, based on the threat score, the consuming application can determine whether it wants to block the user, challenge the user, or allow the user to continue to access the application, and/or the access management and detection system can block the user, challenge the user, or allow the user based on enforcement policies. In an example, the threat score can be included in an alert that is sent out to the consuming application in the form of an SMS, an email, and the like, and/or could be published to an agent component (e.g., the one or more agents 145, one or more proxies 150, and/or one or more Webgates 160).

FIG. 1 further illustrates a mechanism for providing a user interface based on the event/data collection and a threat perception determined for each end user. In various embodiments, a consolidated user interface is provided via the visualization server 180. In some embodiments, the consolidated user interface comprises users logging into the system or logged on the system and the perceived threat perception for each of the users. In other embodiments, the consolidated user interface comprises users, sources being accessed by users, the policies, if any, implicated by the such activity, and the perceived threat perception for each of the users. In yet other embodiments, real time statistics are published and viewed on the consolidated user interface for different time buckets such as 5 minutes or 15 minutes etc. at a predetermined time interval (e.g., every 2 seconds, 4 seconds, 5 seconds, 30 seconds, etc.), so that a security administrator can take appropriate actions on "real-time trends."

The consolidated user interface may be presented to a security administrator when they log into the system. The consolidated user interface may present the top users that are creating the network traffic, the sources that these users are accessing, and the perceived threat perception for each of the users. Collected real-time data may be fed into the system. The consolidated user interface may present how often the user is accessing different sources on the network within a time period (e.g., 5 minute window, 30 minute window). The consolidated user interface may be constantly updated as new data comes in, e.g., showing current minus 5 minutes and the perceived threat perception for each of the users. The top IP addresses that are active can also be shown. Some embodiments may show a correlation between the IP addresses that are highly active, the sources (e.g., URLs) that are popular and have a high traffic, and the perceived threat perception for each of the users. Certain embodiments may also notate the IP addresses (e.g., using an asterisk) where the user has not been identified.

Some embodiments may present client IP address to application mapping in addition to user to application mapping. Certain embodiments may show that a particular IP address can be causing accesses to many different sources and vice versa where a particular URL are being accessed by all the different users. The consolidated user interface presents the end users (or client IP addresses) with the perceived threat perception for each of the users on one side and the end sources on the other side. Some embodiments may also use colors to differentiate the groups. Certain embodiments may also present information such as the number of times that each application is being accessed. By selecting a particular user or client IP address, some embodiments may present the number of times that the particular user or client IP address has accessed the application.

Some embodiments enable an administrator via the consolidated user interface to set one or more criteria for matching and values for the criteria. Certain embodiments also enable the administrator via the consolidated user interface to specify the desired alert, perceived threat perception or threat score, and duration for the alert if the one or more criteria and values for the criteria for an event match those specified by the administrator. For instance, some embodiments can match up the user, the threat score, and the client IP address and which destination (e.g., host name, particular IP address, services) this user is accessing, or match up the activity of the user, the threat score, and provide a corresponding alert as designated by the administrator.

III. Consolidated User Interfaces

Figure 5:
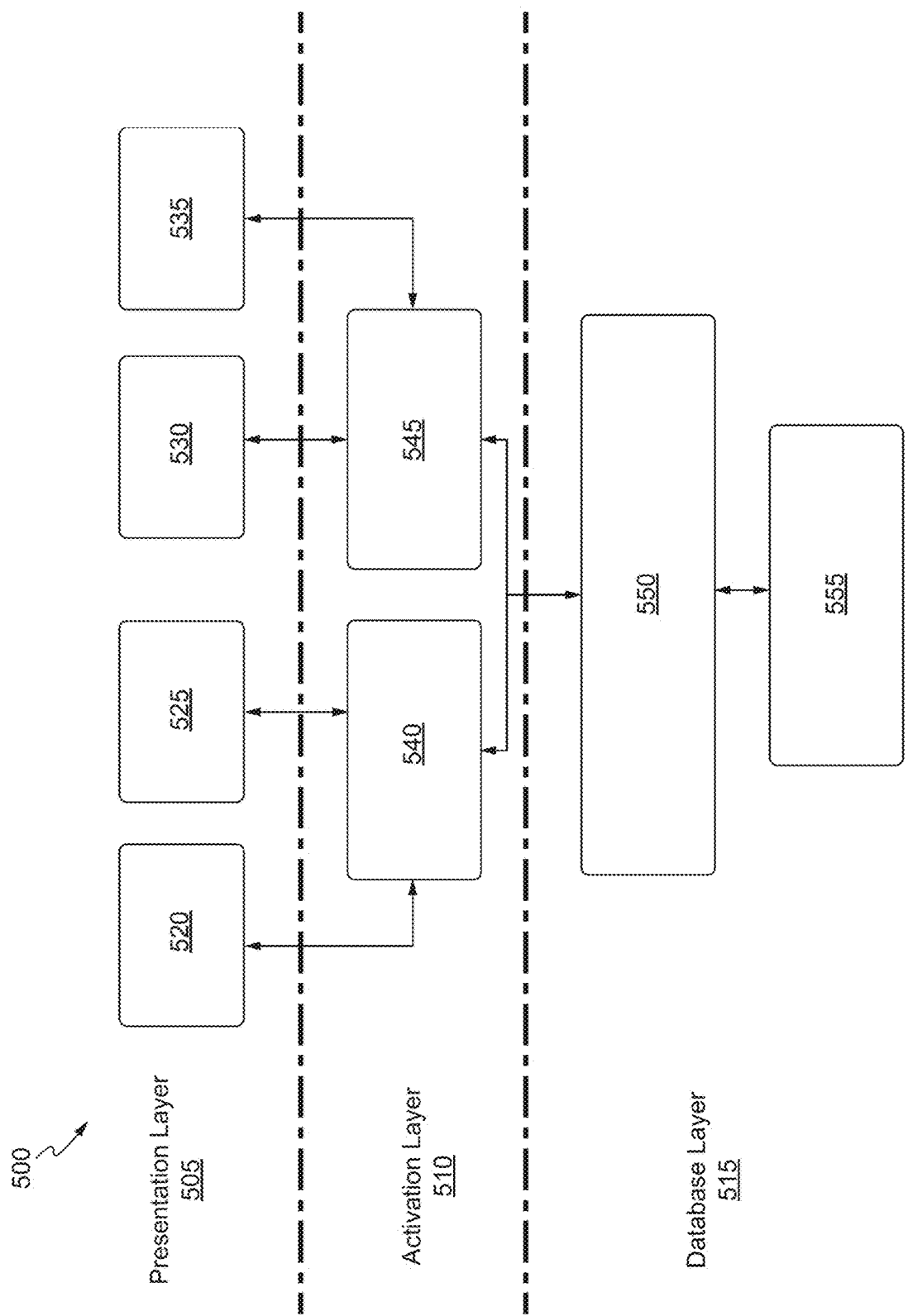
FIG. 5 depicts a block diagram illustrating some of the functional components of a threat visualization system in accordance with various embodiments.

FIG. 5 is a block diagram illustrating some of the functional components of a threat visualization system 500 in accordance with various embodiments. The illustrated system includes three layers: a presentation layer 505, application layer 510 and database layer 515. The presentation layer 505 includes a plurality of user interfaces (e.g., graphical user interfaces (GUIs)) through which users (e.g., customers or administrators) monitor user activity on a network of an enterprise in order to detect threats in real-time based. These include a plurality of UIs 520, 525, 530, and 535 (e.g., consolidated user interface as described with respect to FIG. 1). In some embodiments, UIs 520, 525, 530, and 535 reside on one or more workstations. In other embodiments, UIs 520, 525, 530, and 535 reside on one or more personal computers. In general, UIs 520, 525, 530, and 535 can reside on any computational system, and although four UIs are shown in FIG. 5 it should be understood that any number of UIs can be developed and provide in accordance with the aspects described herein.

UIs 520, 525, 530, and 535 are coupled to one or more application servers 540 and 545 (e.g., rules engine 305 and behavior analytics engine 320 as described with respect to FIG. 3) within application layer 510. Application servers 540 and 545 implement the operations to facilitate security and threat assessment in real-time on the underlying enterprise network, in doing so they communicate and process information between UIs 520, 525, 530, and 535 and the enterprise network. In various embodiments, the application servers 540 and 545 facilitate security and threat assessment through a set of mechanisms described herein. Application servers 540 and 545 may be located at a number of locations in a distributed computing system, including at a computational server or a database server, and may be in communication with any of the UIs in the presentation layer.

Application servers 540 and 545 are coupled to database management system 550 (e.g., memory 185 as described with respect to FIG. 1) within the database layer 515.

Database management system 550 can be any type of custom-made or commercially available database system for managing storage and retrieval of data. In some embodiments, database management system 550 includes database servers, and the like. Exemplary database servers include without limitation those commercially available from Oracle, Microsoft, Sybase, IBM and the like. Database management system 550 is coupled with caches and databases 555 (e.g., caches and databases of memory 185 as described with respect to FIG. 1). Caches and databases 555 can be any type of caches or databases which data can be stored and retrieved. This includes, but is not limited to, hierarchical databases and relational databases.

Figure 6A:
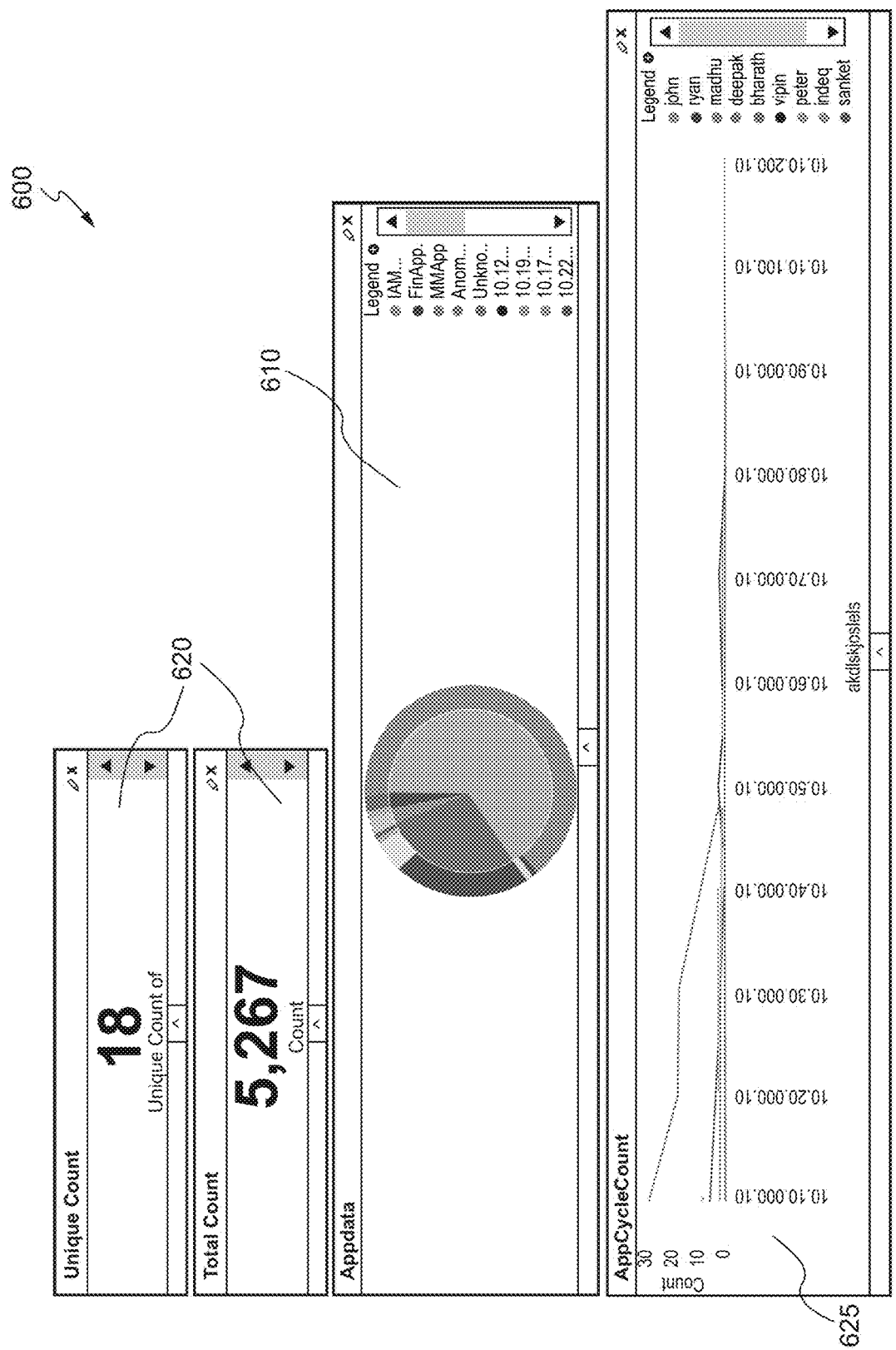
FIGS. 6A, 6B, 7A, 7B, and 7C depict user interfaces (UIs) for displaying a perceived threat for users in accordance with various embodiments.
Figure 6B:
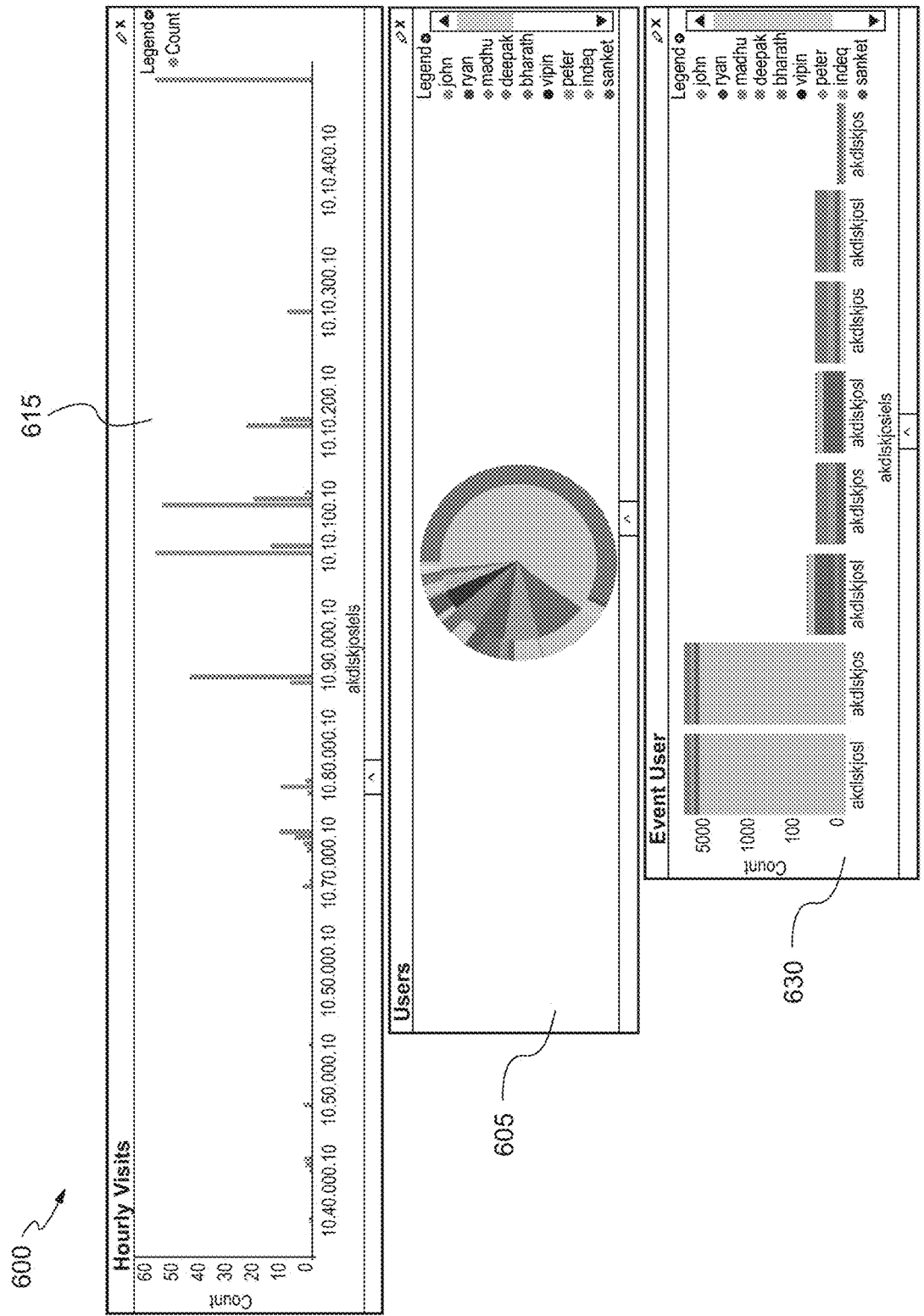
Figure 7A:
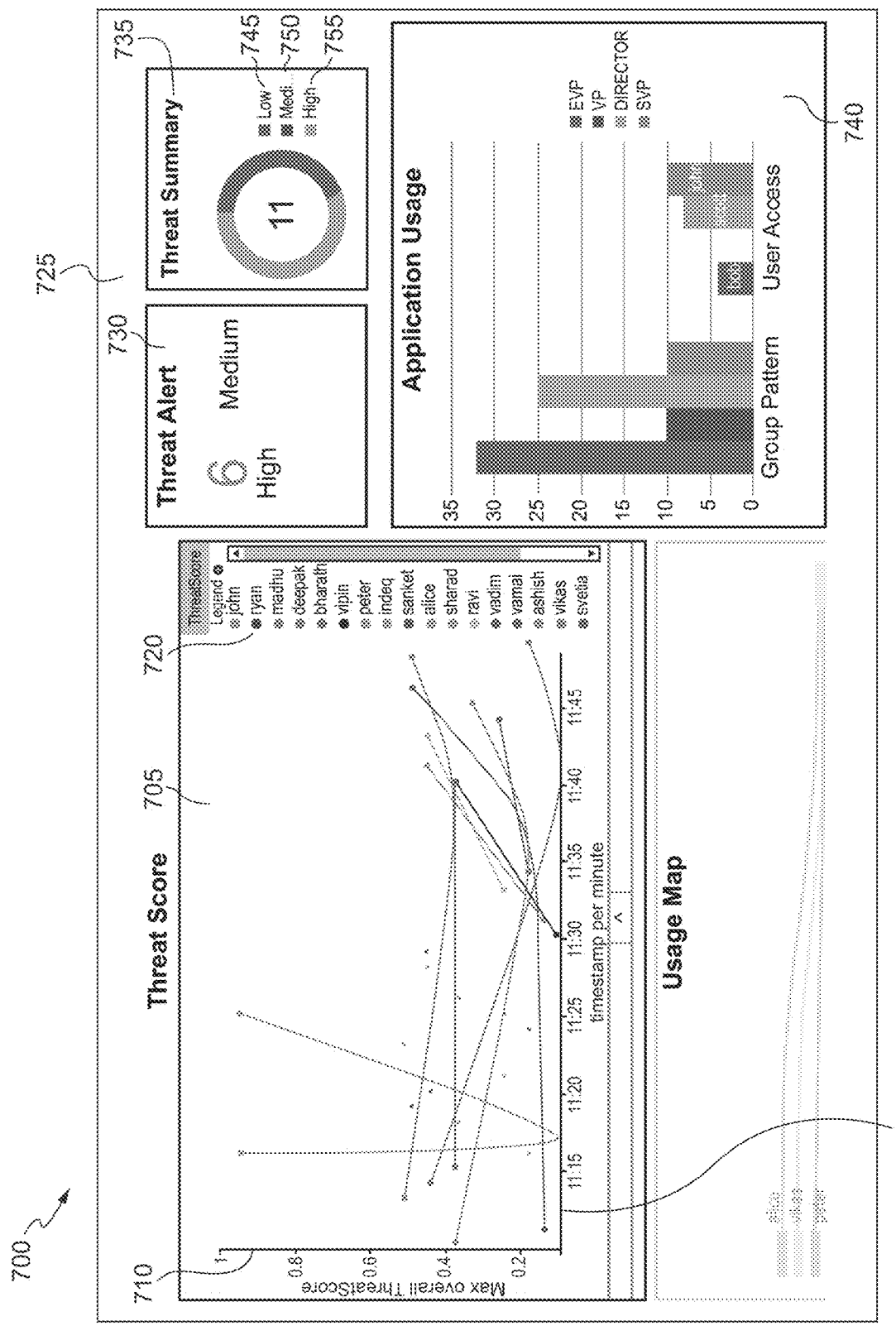

In various embodiments, the presentation layer 505, application layer 510 and database layer 515 operate to provide UIs 520, 525, 530, and 535, which comprise user identifiers, activities of the users (e.g., logging-in, accessing a financial application, downloading software, uploading a program, etc.) and perceived threats for each user. As shown in FIGS. 6A and 6B, some embodiments may provide a consolidated UI 600 that shows users 605 who are accessing resources 610 on a particular target system. Other windows 615, 620, 625, and 630 show hourly visits, counts, application cycle count, and event user, respectively. As shown in FIG. 7A, some embodiments may provide a consolidated UI 700 that shows users who are accessing a particular target system. In window 705, a threat score 710 (i.e., perceived threat) calculated by the threat detection component for each user over time 715 is displayed for each user 720 logging into the target system and conducting activity on the target system. In window 725, a threat alert 730, the threat summary widgets 735, and application or resource usage 740 are displayed. The threat alert 730 and the threat summary widgets 735 show a summary of all the low 745, medium 750, and high 755 threats occurring with respect to the target system. Accordingly, when the users 720 are accessing the target system, the threat detection component shows an administrator who are all the users 720, all the threats 710 associated with them, and the applications or resources being accessed by the users 720.

Figure 7B:
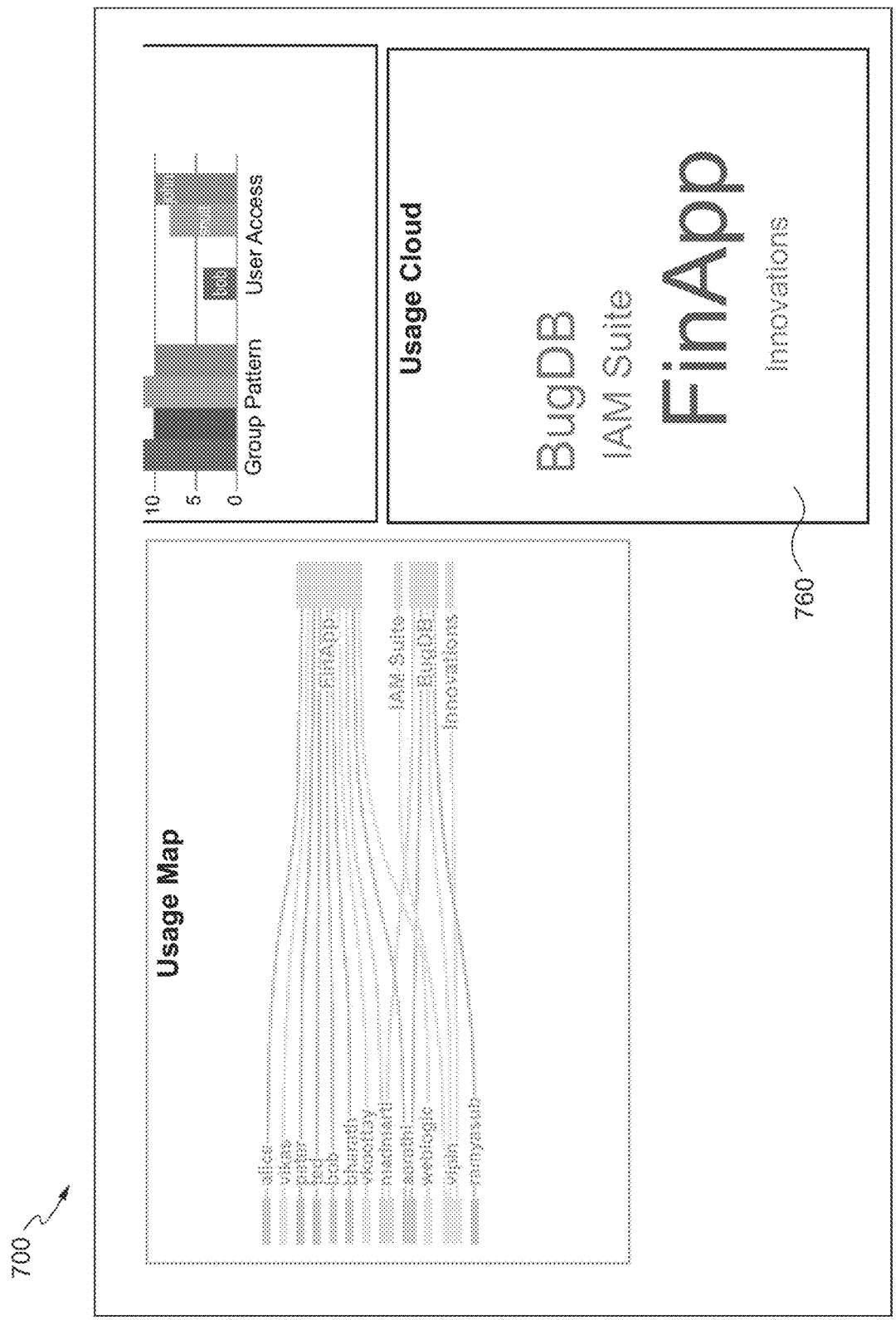
Figure 7C:
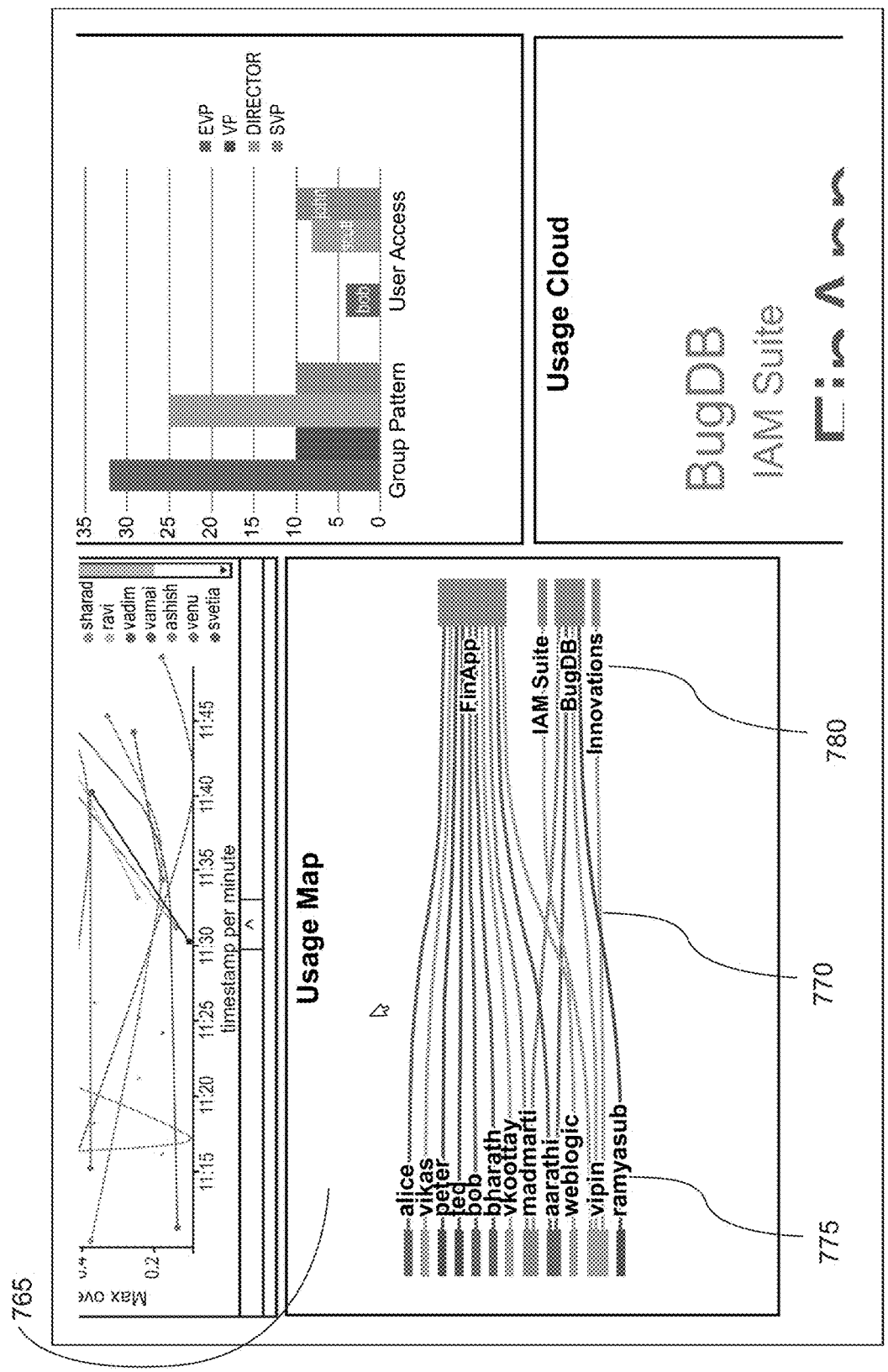

In various embodiments, the presentation layer 505, application layer 510 and database layer 515 may further operate to provide additional functionality or information for an administrator. For example, FIG. 7B illustrates the top applications or resources being accessed can be displayed using a proportional area chart, a bubble chart, or a tag cloud 760 with changes in typography such as font size or color. Additionally or alternatively, the top IP addresses can be displayed using a proportional area chart, a bubble chart, or a tag cloud with changes in typography such as font size or color. Additionally or alternatively, the users with the greatest threat score can be displayed using a proportional area chart, a bubble chart, or a tag cloud with changes in typography such as font size or color. In some embodiments, the presentation layer 505, application layer 510 and database layer 515 operate to provide UIs 520, 525, 530, and 535, which comprise users, applications or resources being acted upon by users, and optionally the policies, if any, implicated by the such activity. For example, FIG. 7C further illustrates that the administrator may view in a window 765 that displays a mapping 770 between users 775 and applications or resources 780 (window 710 may further display policies being implemented by such activity). These displays enable the administrator to quickly decipher a larger quantity of information including who is accessing what, the enforcement actions being taken, how many different users are accessing the same application or resource, and the threat perception for each user. In certain embodiments, the information displayed by the UIs 520, 525, 530, and 535 may be used to detect insider attacks from within the target system.

IV. Processes and Operations for Utilizing a Threat Intelligence Platform

FIGS. 8-12 illustrate techniques for analyzing security events using policies and behavior models, and displaying a consolidated view of active threats and user activity including the perceived threat for the user activity within a distributed environment according to some embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIGS. 8-12 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 8-12 is not intended to be limiting. Other sequences of steps may also be performed according to alternative embodiments. For example, in alternative embodiments the steps outlined above may be performed in a different order. Moreover, the individual steps illustrated in FIGS. 8-12 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
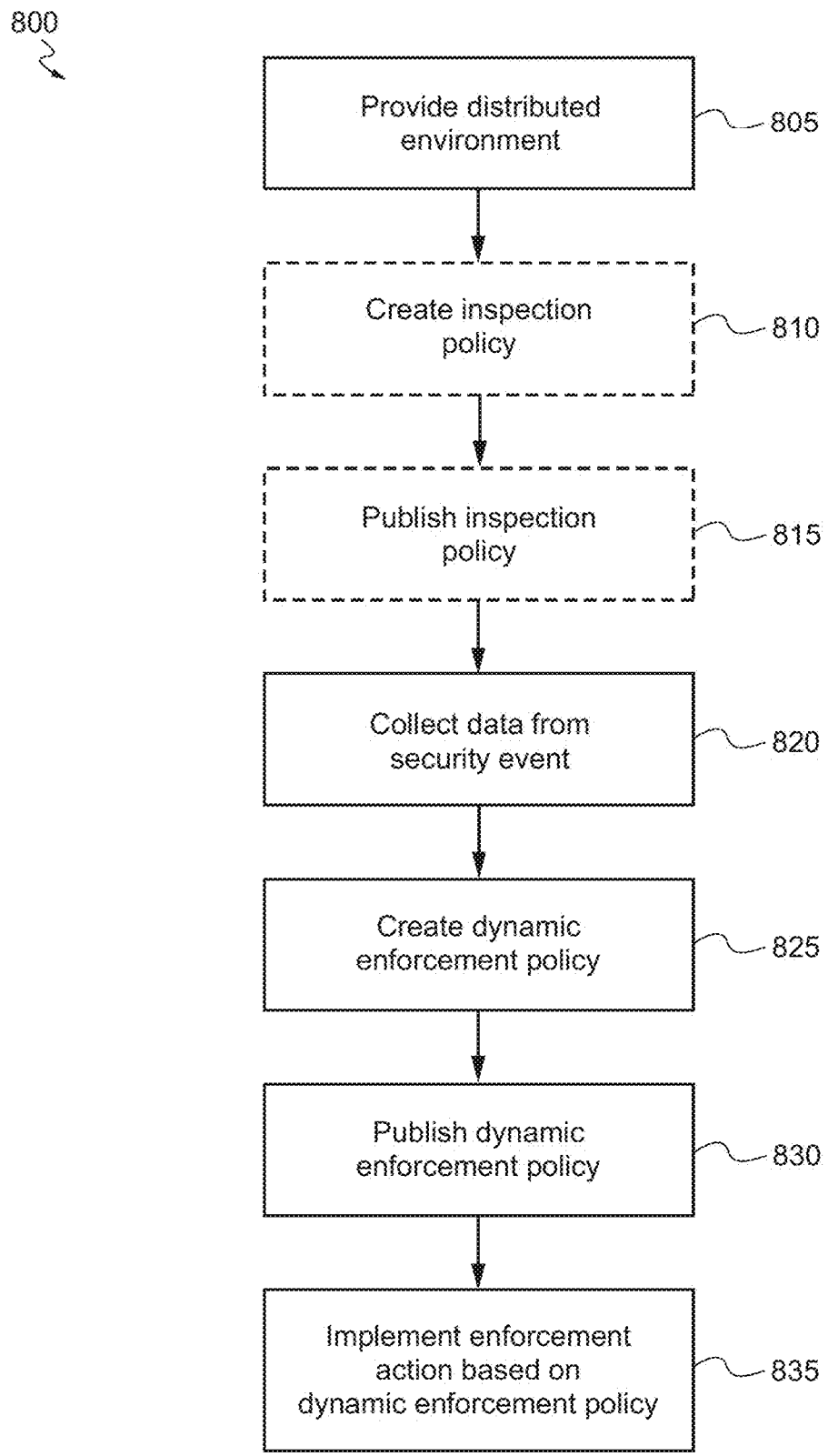
FIG. 8 depicts a flowchart illustrating a process for creating and publishing dynamic policies according to various embodiments in accordance with various embodiments.

FIG. 8 shows a flowchart 800 that illustrates a process for creating and publishing dynamic policies according to various embodiments. In some embodiments, the processes depicted in flowchart 800 may be implemented by the access management and threat detection system 105 and an information management system 110 of FIG. 1. At step 805, a distributed environment is provided or instantiated that includes a user device, a plurality of agents, a collector, a publisher, and target system having a resource. In some embodiments, the distributed environment further includes a threat detection component, and inspection policies and the dynamic enforcement policies are created by the threat detection component. In certain embodiments, the distributed environment further includes memory for storing the inspection policies and the dynamic enforcement policies, and historical data received from one or more information flows.

At optional step 810, an inspection policy can be created based on the historical data or specifications of a target system or resource. In some embodiments, the collection of data is triggered by an inspection policy. For example, the collector may be configured to obtain the information associated with a security event such as an end user's access request and report the information or data. The configuration of the collector may be based on default or static inspection policies comprising rules for collecting a predefined set of attributes (e.g., user attributes, resource attributes, object, actions, environment attributes, etc.) when certain criteria is satisfied. In certain embodiments, the system may provide an inspection policy UI that allows an administrator to create the inspection policy by designate the triggering of certain inspection policies when a set of criteria has been met (e.g., if header data matches, for a threshold time interval). In other embodiments, the configuration of the collection may be based on dynamic inspection policies comprising rules for collecting the data or attributes. For example, the collector and the threat detection component may work together to collect the predefined set of attributes and trigger anomalies based on rules that were previously configured (default, static, or dynamic inspection and enforcement policies). The inspection policies includes rules for collecting the data in real-time, which is a predefined set of attributes pertaining to the security event, when a set of criteria for the security event match a predefined pattern. Once the data comes into the collector, it may be stored in memory and becomes part of historical data. The machine learning component can be constantly learning from the historical data and real-time data to create and modify the inspection and enforcement policies to efficiently collect information required for threat assessment of user activity on the system.

At optional step 815, the inspection policy may be published such that the plurality of agents have access to the inspection policy. Publishing the inspection policy facilitates the collection of data by allowing the listeners (i.e., the agents) to access the policies and enforce the policies to collect the predefined set of attributes based on rules that were previously configured. At step 820, data may be collected pertaining to a security event. In various embodiments, the data includes: (i) a source that identifies a user or the user device, and (ii) a destination that identifies the target system or the resource. The data may be collected by the collector from at least one of the plurality of agents. In some embodiments, the data is collected in accordance with a default, static, or dynamic inspection policy dynamic inspection policy. For example, if criteria of a live information flow including a flow of data from a source to a destination, matches a predefined pattern with in the default, static, or dynamic inspection policy, then the inspection policy may be triggered and one or more agents may collect attributes (e.g., the source and destination) of the information flow or a security event occurring within the information flow. The collected attributes may then be sent to the collector for further processing in accordance with various aspects discussed herein.

At step 825, a dynamic enforcement policy may be created based on the data. The dynamic enforcement policy includes at least a specification of the source, the destination, an enforcement action, and a duration for the dynamic enforcement policy to be active. The duration may be a predetermined period of time of at least 5 minutes, at least 10 minutes, at least 30 minutes, or at least on hour, for example, 10 minutes, 30 minutes, 1 hour, 5 hours, 1 day, or 3 days. During the duration for the dynamic enforcement policy to be active, the dynamic enforcement policy overwrites a static enforcement policy that includes a specification of at least the same source and the same destination. For example, a static enforcement policy may be default or active for a user or group of users from an IP address that requires a first level authentication, whenever any user from that IP address tries to access a resource on a specified target system. A dynamic enforcement policy may be published for a user or group of users from the same IP address that requires a second factor authentication, whenever any user from that IP address tries to access a resource on the same specified target system. The dynamic enforcement policy may have a duration of 5 hours. Accordingly, the static enforcement policy is inactive during the predetermined period of time (e.g., 5 hours), the dynamic enforcement policy is active (e.g., second factor authentication is enforced on requests from the IP address to the specified target system) during the predetermined period of time (e.g., 5 hours), the dynamic enforcement policy is rendered inactive and may be removed from the publisher after the predetermined period of time has expired, and the static enforcement policy is active (e.g., first level authentication is enforced on requests from the IP address to the specified target system) after the predetermined period of time has expired.

In certain embodiments, the system may provide an enforcement policy UI that allows an administrator to create the dynamic enforcement policy by designate the triggering of certain enforcement actions when a set of attributes has been met (e.g., if a source and destination of a live information flows matches a source and destination of the policy). In other embodiments, the data analysis and a machine learning components create the dynamic enforcement policy. The creating the dynamic enforcement policy may comprise: classifying the data collected in real-time and historical data into one or more data clusters, analyzing the predefined set of attributes using the one or more data clusters, and creating the source, the destination, the enforcement action, and the duration for the dynamic enforcement policy to be active based on the analysis. The one or more data clusters may be generated using supervised or unsupervised machine learning or clustering techniques, and the analyzing may include calculating a distance of the predefined set of attributes from a centroid of the one or more data clusters. The enforcement action such as a block or second factor authentication may be determined based on the distance of the predefined set of attributes from the centroid of the one or more data clusters.

At step 830, the dynamic enforcement policy may be published such that the plurality of agents have access to the dynamic enforcement policy. Publishing the dynamic enforcement policy facilitates threat detection on for example an enterprise network by allowing the listeners (i.e., the agents) to access the policies and activate enforcement actions of the policies based on rules that were previously configured. At step 835, the enforcement action for the security event may be implemented based on the dynamic enforcement policy. In some embodiments, at least one of the plurality of agents implements the enforcement action. The enforcement action may be implemented by at least one of the plurality of agents determining that attributes (e.g., a source and destination) of the information flow or a security event occurring within the information flow match the attributes (e.g., the source and destination) within the specification of the dynamic enforcement policy. Thereafter, the enforcement action may be implemented by at least one of the plurality of agents performing the enforcement action, for example, (i) blocking user access to the destination prior the user being authorization for access, (ii) dropping connection of the user with the destination, (iii) blocking authentication of the user on the system, (iii) requesting second factor authentication or authorization, (iv) reporting a low alert, medium alert, or high alert, etc.

Figure 9:
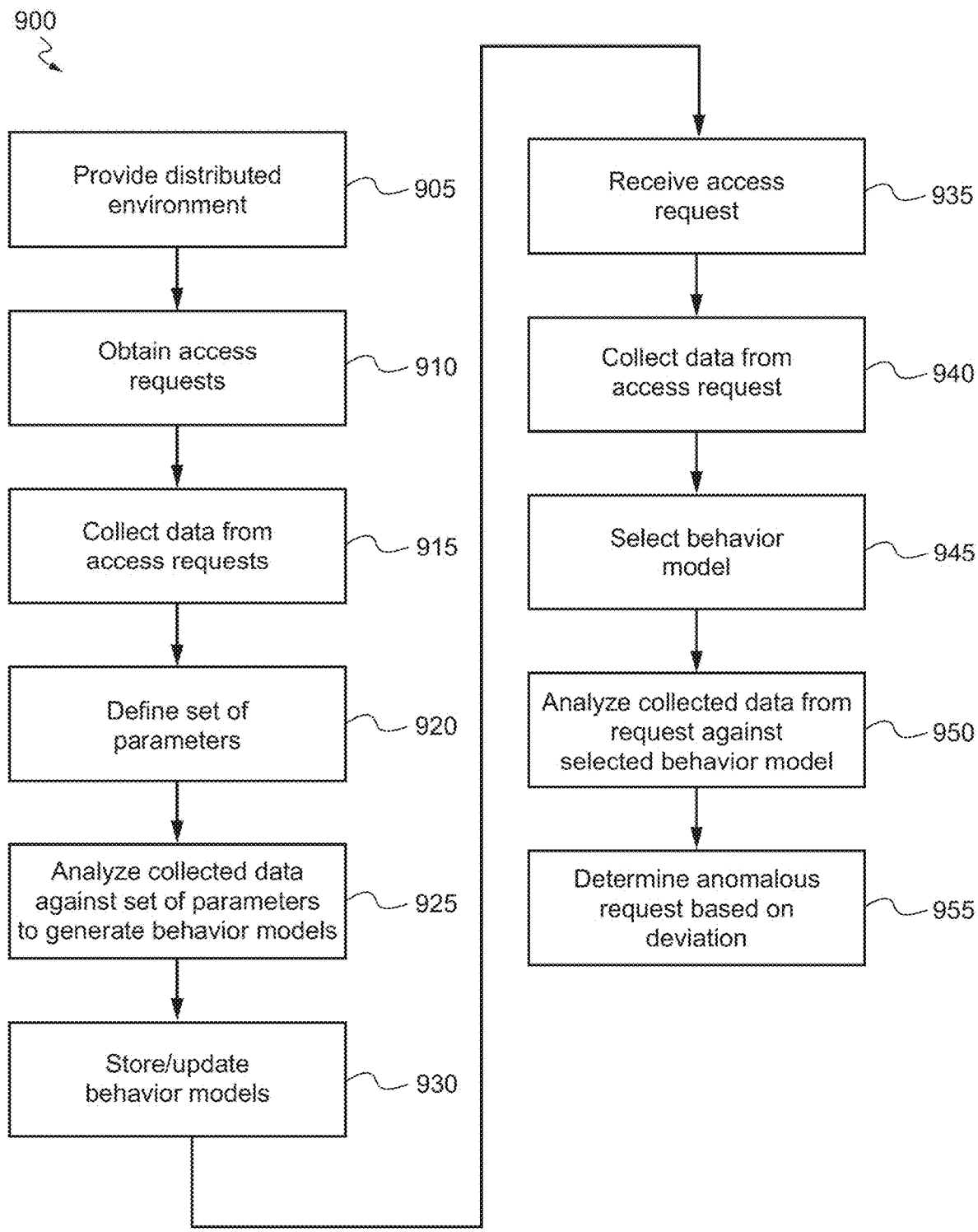
FIG. 9 depicts a flowchart illustrating a process for generating behavior models for a user and determining whether an access request of a user to a target system is anomalous based on one or more of the behavior models in accordance with various embodiments.

FIG. 9 shows a flowchart 900 that illustrates a process for generating behavior models for a user and determining whether an access request of a user to a target system is anomalous based on one or more of the behavior models. In some embodiments, the processes depicted in flowchart 900 may be implemented by the access management and threat detection system 105 and an information management system 110 of FIG. 1. At step 905, a distributed environment is provided or instantiated that includes a user device, a plurality of agents, a collector, a publisher, and target system having a resource. In some embodiments, the distributed environment further includes a threat detection component, and inspection policies, enforcement policies, and behavior models that are created by the threat detection component. In certain embodiments, the distributed environment further includes memory for storing the inspection policies, the enforcement policies, the behavior models, and historical data received from one or more information flows.

At step 910, a plurality of access requests associated with a user over a period of time is obtained by the computing device (e.g., the access management and threat detection system 105 and an information management system 110). At step 915, data from the plurality of access requests is collected. The data may be real-time from incoming access requests or historical data accumulated from past access requests. The data may include information (e.g., user-agent identifier, IP address, host name, GPS location, resource URL, application domain, agent name, tenant name, user identity store, user identity, user groups (static or dynamic groups), etc.) related to a predefined set of attributes (e.g., user attributes, resource attributes, object, actions, environment attributes, etc.) for an access request. In some examples, the information is organized into various categories such as a client context (user-agent identifier, IP address, host name, GPS location, etc.), a resource context (resource URL, application domain, agent name, tenant name, etc.), a user context (user identity store, user identity, user groups (static or dynamic groups)), a server context (event context such as AuthN, Reauthn, AuthZ, Deny, etc.) timestamps (last access time, last updated time, etc.), session information (session ID, session index, access, etc.), a server instance (e.g., the server instance processing the request, etc.) processing the request, and so on.

At step 920, a set of parameters associated with the data from the plurality of access requests is identified/defined to be monitored. In some embodiments, the subset of parameters to be monitored may be identified/defined by a resource (e.g., a target application) on the target system that the user generally accesses and the target application may provide this information to the behavior analytics engine. For instance, the target application (e.g., a financial application) might want to track a user's access requests based on parameters such as the user id, the time of access, the duration of access, and so on. In other embodiments, the subset of parameters to be monitored may be identified/defined by an administrator of the system or an inspection policy defined by an administrator or a machine learning component. For instance, an administrator might want to track a user's access requests based on parameters such as the user id, the time of access, the duration of access, and so on. In certain embodiments, where the data is not being collected to satisfy a defined subset of parameters to be monitored, the behavior analytics engine may be configured to create a dynamic inspection policy that is triggered to obtain such data to satisfy the subset of parameters upon certain criteria being satisfied (e.g., the user or group of users logging into the system). In various embodiments, once the set of parameters are identified/defined to be monitored, then the system will monitor and save/classify the data associated with the set of parameters from the data being collected in step 915.

At step 925, the collected data from the plurality of access requests is analyzed against the set of parameters to generate one or more behavior models. In some embodiments, the behavior analytics engine may be configured to generate a behavior model by classifying the incoming real-time data and the historical data of access requests associated with a user into one or more data clusters. The one or more data clusters may be generated using supervised or unsupervised machine learning or other clustering (e.g., K-means) techniques. For example, the behavior analytics engine may be configured to use unsupervised learning using a density based clustering algorithm. The density based clustering algorithm is a clustering algorithm that given a set of points (e.g., user-agent identifier or IP address) in some space (e.g., user attributes), the algorithm groups together points that are closely packed together (points with many nearby neighbors), marking as outliers points that lie alone in low-density regions (whose nearest neighbors are too far away). For example, a behavior model for a user's typical access request may comprise clusters of data points for the following parameters: user's identifier, time of access, and GPS location. Another behavior model for the same user may comprise clusters of data points for the following parameters: target system identifier, duration of access, and target resource identifier. At step 930, the one or more behavior models are stored and updated as additional access requests are received and data is collected.

At step 935, an access request associated with the user is received by the computing device. At step 940, data from the access requests is collected. At step 945, a behavior model is selected from the one or more behavior models stored for the user. The behavior model may be selected based on the data collected from the access request. In some embodiments, one or more behavior models may be selected from the one or more behavior models stored for the user. For example, if a cluster of the behavior model selected for the user is generated based on an identity parameter for a client device and the data includes an identifier associated with a client device, then that behavior model may be selected. Alternatively or additionally, if a cluster of a behavior model for the user is generated based on an identity parameter for a target system or resource and the data includes an identifier associated with a target system or resource, then that behavior model may be selected.

At step 950, the collected data from the access request is analyzed against the selected behavior model(s) to determine whether the access request is anomalous. In some embodiments, a Euclidian distance is used to calculate a distance of data points of the access request from the centroid of each cluster in the selected behavior model. In certain examples, the radius of each cluster is calculated based on the mean of the distance from centroid of each point in the cluster. Any point falling outside the radius will have higher risk based on the standard deviation. For example, any point falling outside the radius by a predetermined value (e.g., two standard deviation or three standard deviation) will have a higher risk assigned. The closer the user activity is to the centroid, the lower is the risk for that access. In other embodiments, a Mahalanobis distance (measure of the distance between a point and a distribution) that takes into account correlations of the data set for a cluster is used to calculate a distance of data points of the access request from the cluster. Any point falling outside the cluster will have higher risk based on the standard deviation. For example, any point falling outside the cluster by a predetermined value (e.g., two standard deviation or three standard deviation) will be have a higher risk assigned. The closer user activity is to the centroid, the lower is the risk for that access. At step 955, an overall deviation of the collected data from the one or more data clusters is used to determine whether the access request is anomalous. For example, an overall deviation over a predetermined threshold value (e.g., two standard deviation or three standard deviation) may be interpreted as an anomalous access request.

Figure 10:
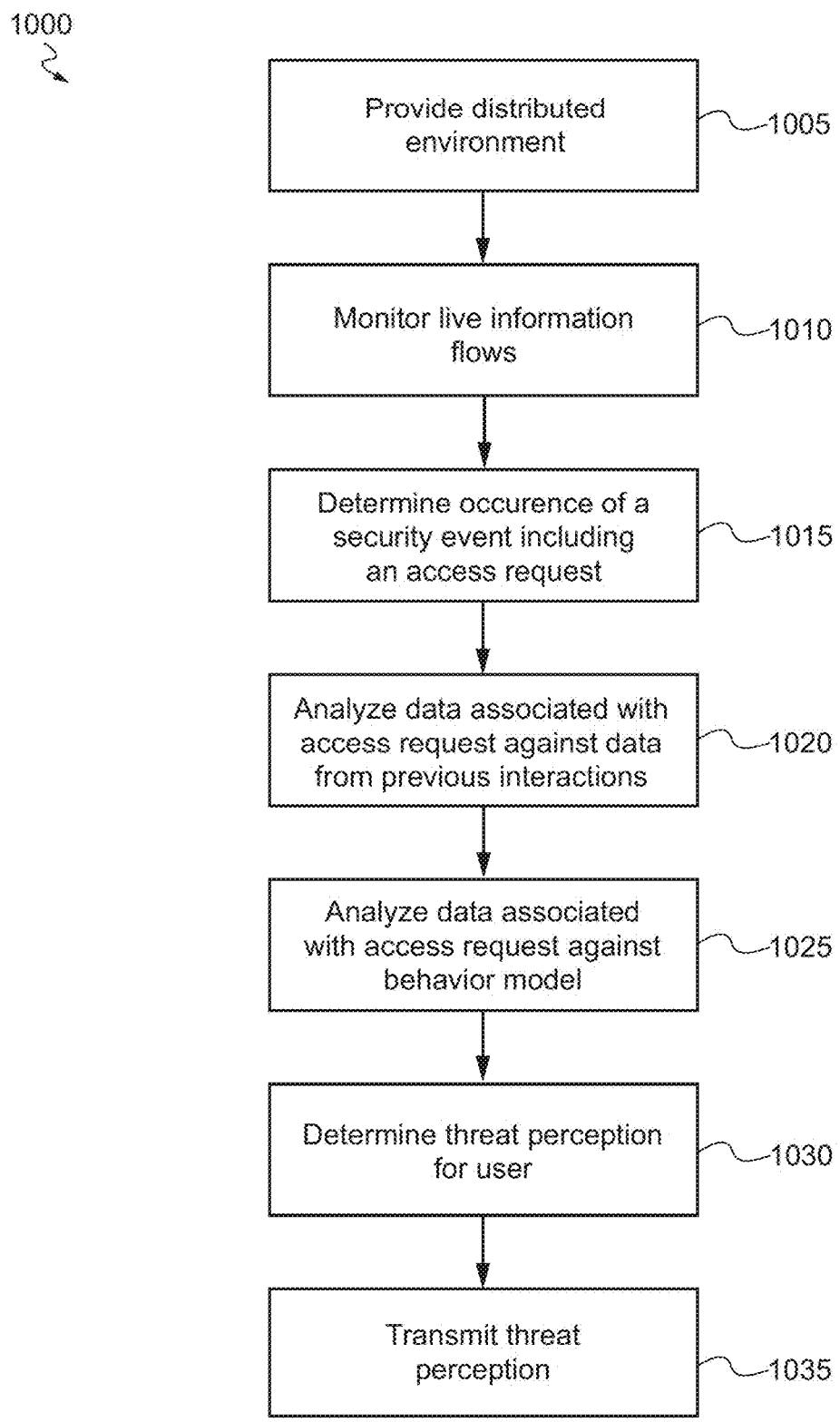
FIG. 10 depicts a flowchart illustrating a process for access management of a target resource in accordance with various embodiments.

FIG. 10 shows a flowchart 1000 that illustrates a process for access management of a target resource. The process may include generating a threat perception score for a user requesting access to a target resource on a target system (detecting an external threat to the system), and transmitting the threat perception score to at least one of: the target system, the target resource, a visualization server, and an access manager such that the at least one of: the target system, the target resource, the visualization server, and the access manager allow, challenge, or deny access to the target resource based on the threat perception score for the user. In some embodiments, the processes depicted in flowchart 1000 may be implemented by the access management and threat detection system 105 and an information management system 110 of FIG. 1. At step 1005, a distributed environment is provided or instantiated that includes a user device, a plurality of agents, a collector, a publisher, and target system having a resource. In some embodiments, the distributed environment further includes a threat detection component, and inspection policies, enforcement policies, and behavior models are created by the threat detection component. In certain embodiments, the distributed environment further includes memory for storing the inspection policies, the enforcement policies, the behavior models, and historical data received from one or more information flows.

At step 1010, one or more live information flows may be monitored by the computing system (e.g., the access management and threat detection system 105 and an information management system 110 of FIG. 1). The live information flows may include flows of data from a plurality of sources to a plurality of destinations. In some embodiments, the monitoring is performed by the plurality of agents. The monitoring may be performed in accordance with various policies (e.g., inspection and enforcement policies). At step 1015, an occurrence of a security event is determined within the one or more live information flows based on a trigger of an enforcement policy. The enforcement policy may include a specification of a source, a destination, and an enforcement action, and when the data within the one or more live information flows matches at least the source and the destination of the enforcement policy, the enforcement policy is triggered and the enforcement action is applied. In some embodiments, the occurrence of a security event is determined upon receiving, at the computing system from a client application executing at a computing device (e.g., client device 115 of FIG. 1), data associated with an access request, the access request requesting access to a target application on a target system, by a user. The received data may include a source of the request (e.g., a user ID, designation for a group of users, an IP address for a client device, etc.) and a destination for the request (e.g., URI, host name, destination IP address or port, etc. of a target system or resource such as an application or service) that match source and destination of one or more enforcement policies, and thus trigger the one or more enforcement policies.

At step 1020, the data associated with the access request is analyzed against data collected concerning previous interactions between the user and one or more enforcement policies to obtain a rule or policy based risk for the user. The interactions may include any activity from the user that triggered one or more enforcement policies. In some embodiments, the activity is limited to past activity concerning the target application and/or the target system of the present access request. In other embodiments, the activity is not limited to past activity concerning the target application and/or the target system of the present access request, and instead pertains to any activity associated with the user that has triggered one or more enforcement policies published by the computing system. In some embodiments, the interactions include previous successes and/or failures of the user's access into the target system as determined by the one or more enforcement policies. The number of previous successes and/or failures can be determined by the rules engine of the computing system. The successes or failures may include a number of times a user has successfully logged in from a given location, a number of times a user has been successfully authenticated, a number of times a user has been successfully authorized to access a target system, application, resource, etc., a number of times a user has successfully logged in during a given time frame, a number of times a user has successfully completed a first level, second, level, third level etc. verification, a number of times a user has failed to log in from a given location, a number of times a user has failed to be authenticated, a number of times a user has failed to be authorized to access a target system, application, resource, etc., a number of times a user has failed to log in during a given time frame, a number of time a user has failed to complete a first level, second, level, third level etc. verification, or any combination thereof. In some embodiments, the rule or policy based risk is computed as a risk score based on the previous interactions between the user and one or more enforcement policies, as described with respect to FIG. 1.

At step 1025, the data associated with the access request is analyzed against a behavior model associated with the user to obtain a behavior based risk for the user. In some embodiments, analyzing the data associated with the access request against the behavior model comprises determining a deviation of the access request from one or more data clusters of the behavior model. A Euclidian distance may be used to calculate a distance or deviation of data points of the access request from the centroid of each cluster in the selected behavior model. In certain examples, the radius of each cluster is calculated based on the mean of the distance from centroid of each point in the cluster. Any point falling outside the radius will have higher risk based on the standard deviation. For example, any point falling outside the radius by a predetermined value (e.g., two standard deviation or three standard deviation) will have a higher risk assigned. The closer the user activity is to the centroid, the lower is the risk for that access. Alternatively, a Mahalanobis distance (measure of the distance between a point and a distribution) that takes into account correlations of the data set for a cluster may be used to calculate a distance or deviation of data points of the access request from the cluster. Any point falling outside the cluster will have higher risk based on the standard deviation. For example, any point falling outside the cluster by a predetermined value (e.g., two standard deviation or three standard deviation) will be have a higher risk assigned. The closer user activity is to the centroid, the lower is the risk for that access. In various embodiments, an overall deviation of the collected data from the one or more data clusters is used to determine the behavior based risk of the user.

At step 1030, a threat perception for the user is determined based on the rule or policy based risk for the user and the behavior based risk for the user. In various embodiments, the threat perception for the user is calculated as a function of the risk score (policy based risk) and the deviation score (behavioral based risk). In certain embodiments, the threat detection component may use a function such as Equation (3) to compute the threat score for a user. As illustrated in Equation (3), when sufficient data related to access requests for a user has not yet been captured, the threat detection component may be configured to use the risk score (policy based risk) to determine the threat score for the user. In various embodiments, the threat detection component may be configured to assign a higher weight to the risk score (policy based risk) for the user initially as compared to a weight for the deviation score (behavioral based risk). Through subsequent successful logins as the risk score drops and thus the threat score drops, the threat detection component may be configured to automatically reduce the weight of the risk score and increase the weight of the deviation score. For example, the threat detection component may be configured to assign a first weight (e.g., a greater 75% weight) to a rule based risk score until the amount of data collected for a user reaches a threshold level. The amount of data can be measured based on one or more factors such as storage size of data, units of information, number of access request instances, number of successful log-ins, etc. Once the data crosses the threshold level, the rule based risk will be assigned a second weight (e.g., a lesser 25% weight). At this point, since sufficient data related to a user's access patterns have been collected, the threat detection component may be configured to assign a higher weight (e.g., a greater 75% weight) to the deviation score obtained by the model to determine the threat score.

At step 1035, the threat perception for the user is transmitted to at least one of: the target system, the target resource, a visualization server, and an access manager such that the at least one of: the target system, the target resource, the visualization server, and the access manager allow, challenge, or deny access to the target resource based on the threat perception score for the user. In some embodiments, the threat perception score is transmitted to the target system or the target resource. The target system or the target resource may determine whether it wants to block the user, challenge the user, or allow access to the target system or target resource. In an example, the threat perception can be transmitted as an alert sent out to the target system or target resource in the form of an SMS, an email, and the like. In some embodiments, the threat perception score is transmitted to the access manager (e.g., the access manager of the access management and threat detection system). The access manager may utilize the one or more agents and/or one or more enforcement policies to initiate a configured action, e.g., allow/challenge/deny on the user's access request to the target resource in the target system. In an example, the threat perception can be published and the access manager, agent, and enforcement policies can utilize the published threat perception to take action on the user's access request. In other embodiments, the threat perception score is transmitted to the visualization server. The visualization server may generate consolidated GUI(s) displaying the threat perception score, as described in detail herein. In an example, the threat perception can be published, the visualization server can display the published threat perception, and an administrator can view the threat perception score and take action, e.g., allow/challenge/deny on the user's access request to the target resource in the target system. In some embodiments, allowing the access includes authenticating the user and/or confirming authorization of the user to access the target resource on the target system.

Figure 11:
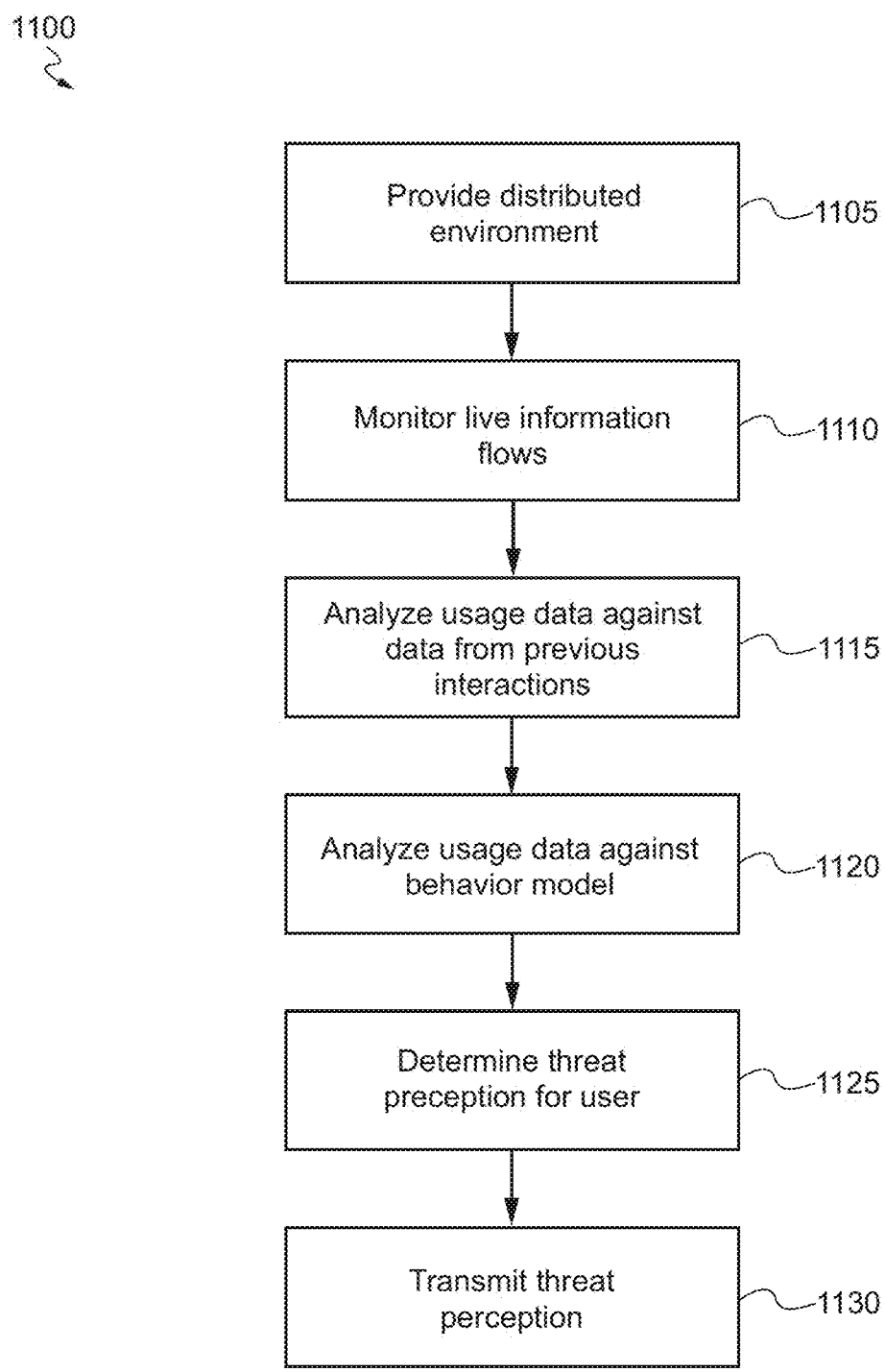
FIG. 11 depicts a flowchart illustrating a process for preventing insider attacks from within a system in accordance with various embodiments.

FIG. 11 shows a flowchart 1100 that illustrates a process for preventing insider attacks from within a system. The process may include generating a threat perception score for each user logged into a system, and transmitting the threat perception score to at least one of: the target system, the target resource, a visualization server, and an access manager such that the at least one of: the target system, the target resource, the visualization server, and the access manager allow, challenge, or deny activity of each of the users based on the threat perception score determined for each of the users, respectively. In some embodiments, the processes depicted in flowchart 1100 may be implemented by the access management and threat detection system 105 and an information management system 110 of FIG. 1. At step 1105, a distributed environment is provided or instantiated that includes a user device, a plurality of agents, a collector, a publisher, and target system having a resource. In some embodiments, the distributed environment further includes a threat detection component, and inspection policies, enforcement policies, and behavior models are created by the threat detection component. In certain embodiments, the distributed environment further includes memory for storing the inspection policies, the enforcement policies, the behavior models, and historical data received from one or more information flows.

At step 1110, one or more live information flows may be monitored by the computing system (e.g., the access management and threat detection system 105 and an information management system 110 of FIG. 1). The live information flows may include flows of data from a plurality of sources (e.g., users) to a plurality of destinations (e.g., resources). In some embodiments, the monitoring is performed by the plurality of agents. The monitoring may be performed in accordance with various policies (e.g., inspection and enforcement policies). In various embodiments, the monitoring includes monitoring activity of one or more users on a system once the more more users have been granted access or logged into the system. At step 1115, the usage data (e.g., usage pattern) associated with the activity of the users on the system is analyzed against data collected concerning previous interactions between each of the users and one or more enforcement policies to obtain a rule or policy based risk for each of the users. The interactions may include any activity from a user that triggered one or more enforcement policies. In some embodiments, the activity is limited to past activity concerning an application and/or a system. In other embodiments, the activity is not limited to past activity concerning the application and/or the system, and instead pertains to any activity associated with the user that has triggered one or more enforcement policies published by the computing system. In some embodiments, the interactions include previous successes and/or failures of the activity of each of the users on the system as determined by the one or more enforcement policies. The number of previous successes and/or failures can be determined by the rules engine of the computing system. In some embodiments, the rule or policy based risk is computed as a risk score based on the previous interactions between each of the users and one or more enforcement policies, as described with respect to FIG. 1.

At step 1120, the usage data (e.g., usage pattern) associated with the activity of each of the users on the system is analyzed against a behavior model associated with each of the users to obtain a behavior based risk for each of the users. In various embodiments, the threat detection module may be configured to analyze a user's usage data (e.g., usage pattern) after the user has successfully logged into a system or accessed a resource against a set of one or more parameters over a period of time and generate a behavior model for the user based on analysis. The identified parameters can become the data points for building the clusters in the model. For example, the threat detection module may be configured to identify parameters for monitoring based on multiple factors such as a pattern of system usage by users or a group of users that are similar to each of the users, a pattern of resource usage by users or a group of users similar to each of the users, a percentage of time spent on each system or resource by users or a group of users similar to each of the users, and so on. The threat detection module may be configured to build the behavior model for a user (who is a 'Vice President') that represents the application usage of all users who are in a 'Vice President' role within the organization. Thereafter, data associated with the user's activity may be analyzed against the behavior model and a deviation of the user's activity from one or more data clusters of the behavior model is determined. As described herein in detail, a Euclidian distance may be used to calculate a distance or deviation of data points of the user activity from the centroid of each cluster in the selected behavior model. Alternatively, a Mahalanobis distance (measure of the distance between a point and a distribution) that takes into account correlations of the data set for a cluster may be used to calculate a distance or deviation of data points of the user activity from the cluster. In various embodiments, an overall deviation of the usage data from the one or more data clusters is used to determine the behavior based risk of the user At step 1125, a threat perception for each of the users is determined based on the rule or policy based risk determined for each of the users and the behavior based risk determined for each of the users. In various embodiments, the threat perception for the user is calculated as a function of the risk score (policy based risk) and the deviation score (behavioral based risk). In certain embodiments, the threat detection component may use a function such as Equation (3) to compute the threat score for a user. As illustrated in Equation (3), when sufficient data related to user activity has not yet been captured, the threat detection component may be configured to use the risk score (policy based risk) to determine the threat score for the user. In various embodiments, the threat detection component may be configured to assign a higher weight to the risk score (policy based risk) for the user initially as compared to a weight for the deviation score (behavioral based risk). Through subsequent activity as the risk score drops and thus the threat score drops, the threat detection component may be configured to automatically reduce the weight of the risk score and increase the weight of the deviation score. For example, the threat detection component may be configured to assign a first weight (e.g., a greater 75% weight) to a rule based risk score until the amount of data collected for a user reaches a threshold level. The amount of data can be measured based on one or more factors such as storage size of data, units of information, number of access request instances, number of successful log-ins, etc. Once the data crosses the threshold level, the rule based risk will be assigned a second weight (e.g., a lesser 25% weight). At this point, since sufficient data related to a user's usage pattern has been collected, the threat detection component may be configured to assign a higher weight (e.g., a greater 75% weight) to the deviation score obtained by the model to determine the threat score.

At step 1130, the threat perception for the user is transmitted to at least one of: the target system, the target resource, a visualization server, and an access manager such that the at least one of: the target system, the target resource, the visualization server, and the access manager allow, challenge, or deny activity of the user on the target system based on the threat perception score for the user. In some embodiments, the threat perception score is transmitted to the target system or the target resource. The target system or the target resource may determine whether it wants to block the user, challenge the user, or activity of the user on the target system or target resource. In an example, the threat perception can be transmitted as an alert sent out to the target system or target resource in the form of an SMS, an email, and the like. In some embodiments, the threat perception score is transmitted to the access manager (e.g., the access manager of the access management and threat detection system). The access manager may utilize the one or more agents and/or one or more enforcement policies to initiate a configured action, e.g., allow/challenge/deny on the user's activity on the target system or target resource. In an example, the threat perception can be published and the access manager, agent, and enforcement policies can utilize the published threat perception to take action on the user's activity. In other embodiments, the threat perception score is transmitted to the visualization server. The visualization server may generate consolidated GUI(s) displaying the threat perception score, as described in detail herein. In an example, the threat perception can be published, the visualization server can display the published threat perception, and an administrator can view the threat perception score and take action, e.g., allow/challenge/deny on the user's activity on the target system or target resource. In some embodiments, allowing the activity includes confirming authorization of the user to access the target resource on the target system.

Figure 12:
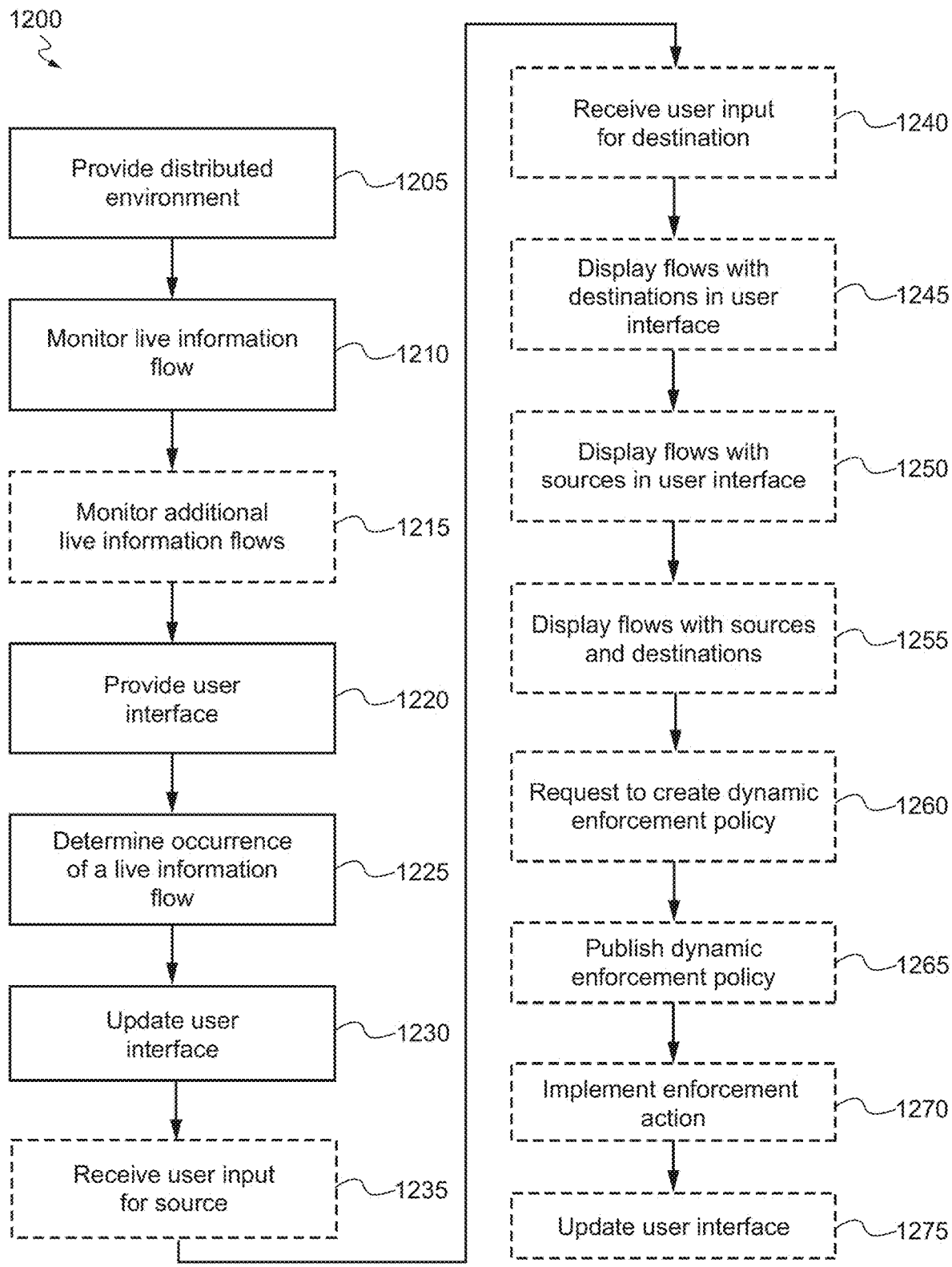
FIG. 12 depicts a flowchart illustrating a process for providing a consolidated view of users, applications being accessed by users, the access policies, if any, implicated by the such accesses, and the threat perception for each of the users.

FIG. 12 shows a flowchart 1200 that illustrates a process for providing a consolidated view of users, applications being accessed by users, the access policies, if any, implicated by the such accesses, and the threat perception for each of the users. In some embodiments, the processes depicted in flowchart 1200 may be implemented by the access management and threat detection system 105 and an information management system 110 of FIG. 1. At step 1205, a distributed environment is provided or instantiated that includes a user device, a plurality of agents, a collector, a visualizer, and target system having a resource. In some embodiments, the distributed environment further includes an analytics server and a machine learning component, and inspection policies and the dynamic enforcement policies are created by the analytics server and machine learning component. In certain embodiments, the distributed environment further includes memory for storing the inspection policies and the dynamic enforcement policies, and historically data received from one or more information flows.

At step 1210, a live information flow may be monitored. The live information flow may include a flow of data from a source to a destination. In some embodiments, the monitoring is performed by the plurality of agents. The monitoring may be performed in accordance with various policies (e.g., inspection and enforcement policies). Optionally, at step 1215, one or more live information flows may be monitored. For example, one or more additional live information flows may be monitored. The additional live information flows may include: (i) flows of data from a plurality of sources to a plurality of destinations, and (ii) one or more enforcement policies triggered by the data. At step 1220, a user interface may be provide that includes the source and the destination connected via a line. For example, each source included within live information flows may be connected via a graphical line to one or more destinations being accessed. A threat perception for each source may be provided in accordance with various aspects discussed herein and/or sources with the highest threat perceptions may be provided in a summary display. Optionally, in the instance of monitoring additional live information flows, the user interface may further include: (i) one or more lines connecting each source from the plurality of sources with a corresponding destination from the plurality of destinations, and (ii) an indicator on each line for an enforcement policy triggered by the data flowing between each source and each destination.

At step 1225, an occurrence of a security event may be determined within the live information flow based on a trigger of an enforcement policy. The enforcement policy may include a specification of the source, the destination, and an enforcement action, and when the data within the one or more live information flows matches at least the source and the destination of the enforcement policy, the enforcement policy is triggered and the enforcement action is applied. At step 1230, the user interface may be updated to reflect the occurrence of the security event by: (i) identifying an indicator of the enforcement policy, and (ii) displaying the line connecting the source and the destination running through the indicator of the enforcement policy. In some embodiments, the source is displayed on one side of a window of the user interface, the destination is displayed on a side of the window opposite the side having the source, and the indicator of the enforcement policy is displayed on the line between the source and the destination.

Optionally, at step 1235, a user input may be received corresponding to a selection of a particular source from the plurality of sources. In some embodiments, in response to the selection, the live information flows starting at the particular source including the one or more enforcement policies triggered by the data within the live information flows, the behavior models triggered by the data, and the threat perception for the user are displayed. Optionally, at step 1240, a user input may be received corresponding to a selection of a particular destination from the plurality of destinations. In some embodiments, in response to the selection, the live information flows ending at the particular destination including the one or more enforcement policies triggered by the data within the live information flows, the behavior models triggered by the data, and the threat perception for the user are displayed are displayed. Optionally, at step 1245, the live information flows including the plurality of sources and the plurality of destinations may be displayed within the user interface. In some embodiments, an indication of a set of top sources may be provided based on an amount of the data flowing from the plurality of sources to the plurality of destinations. Optionally, at step 1250, the live information flows including the plurality of sources and the plurality of destinations may be displayed within the user interface. In some embodiments, an indication of a set of top destinations may be provided based on an amount of the data flowing from the plurality of sources to the plurality of destinations. Optionally, at step 1255, the live information flows including the plurality of sources and the plurality of destinations may be displayed within the user interface. In some embodiments, an indication of a set of top enforcement policies and/or threat perceptions may be provided based on an amount of the data flowing from the plurality of sources to the plurality of destinations, a set of active enforcement policies published, and behavior models being accessed.

Optionally, at step 1260, a request to create a dynamic enforcement policy may be received based on the data. The dynamic enforcement policy may include a specification of a source, a destination, an enforcement action, and a duration for the dynamic enforcement policy to be active. Optionally, at step 1265, the dynamic enforcement policy may be published such that a plurality of agents have access to the dynamic enforcement policy. As discussed herein, the duration may be a predetermined period of time of at least 5 minutes, at least 10 minutes, at least 30 minutes, or at least on hour, for example, 10 minutes, 30 minutes, 1 hour, 5 hours, 1 day, or 3 days. During the duration for the dynamic enforcement policy to be active, the dynamic enforcement policy overwrites a static enforcement policy that includes a specification of at least the same source and the same destination. Optionally, at step 1270, the enforcement action may be implemented for another security event within the one or more live information flows based on the dynamic enforcement policy. At least one of the plurality of agents may implement the enforcement action. Optionally, at step 1275, the user interface may be updated to reflect the implementation of the enforcement action for the another security event by: (i) identifying an indicator of the enforcement policy, and (ii) displaying a line connecting the source and the destination running through the indicator of the enforcement policy.

V. Computing Environments

Figure 13:
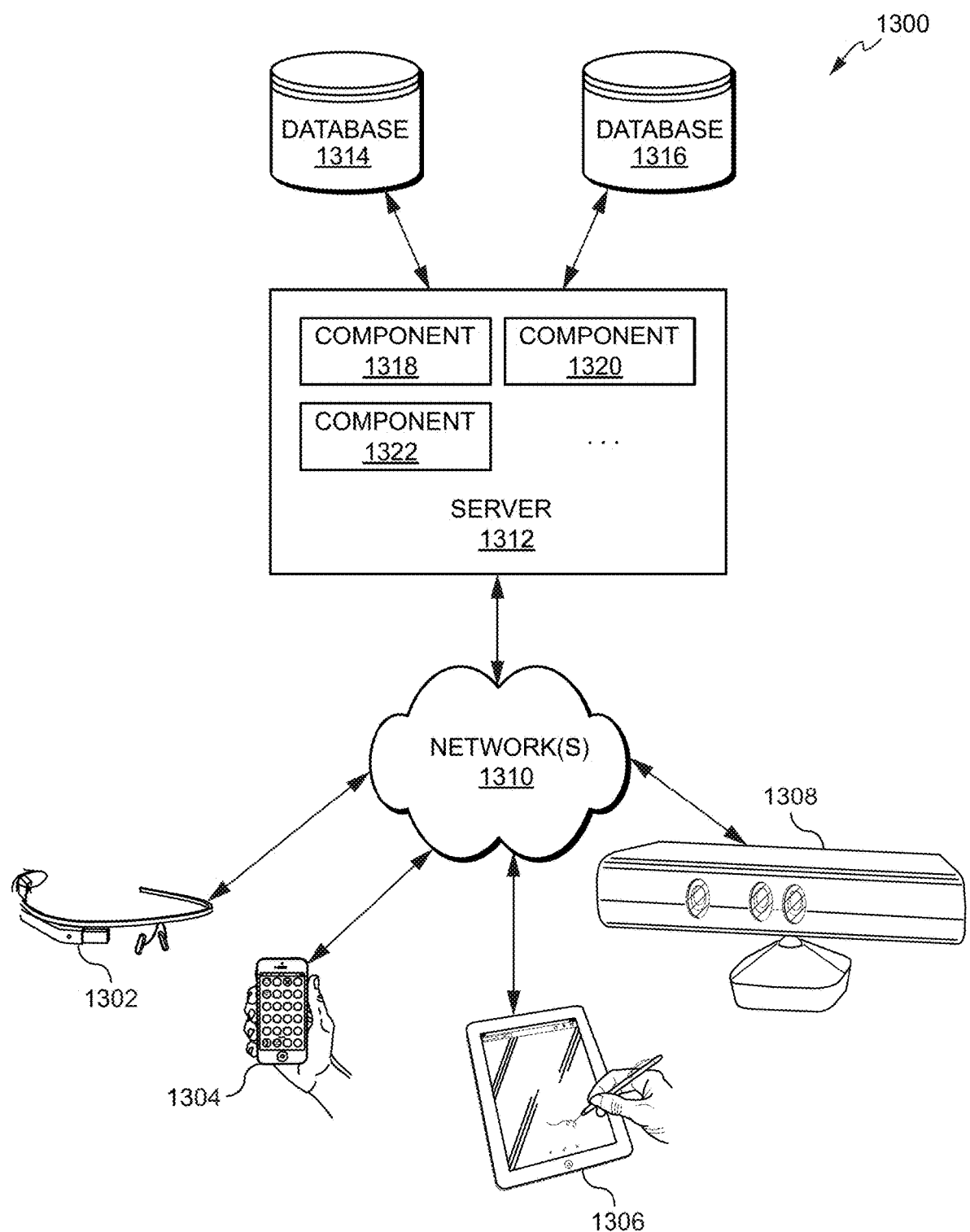
FIG. 13 depicts a simplified block diagram of a distributed system may be used to implement various embodiments of the present disclosure.

FIG. 13 depicts a simplified diagram of a distributed system 1300 for implementing an embodiment of the present disclosure. In the illustrated embodiment, the distributed system 1300 includes one or more client computing devices 1302, 1304, 1306, and 1308, which are configured to execute and operate a client application such as a web browser, proprietary client (e.g., Oracle Forms), or the like over one or more network(s) 1310. The server 1312 may be communicatively coupled with the remote client computing devices 1302, 1304, 1306, and 1308 via network 1310.

In various embodiments, the server 1312 may be adapted to run one or more services or software applications such as services and applications that provide identity management services. In certain embodiments, the server 1312 may also provide other services or software applications can include non-virtual and virtual environments. In some embodiments, these services may be offered as web-based or cloud services or under a Software as a Service (SaaS) model to the users of the client computing devices 1302, 1304, 1306, and/or 1308. Users operating the client computing devices 1302, 1304, 1306, and/or 1308 may in turn utilize one or more client applications to interact with the server 1312 to utilize the services provided by these components.

In the configuration depicted in FIG. 13, the software components 1318, 1320 and 1322 of system 1300 are shown as being implemented on the server 1312. In other embodiments, one or more of the components of the system 1300 and/or the services provided by these components may also be implemented by one or more of the client computing devices 1302, 1304, 1306, and/or 1308. Users operating the client computing devices may then utilize one or more client applications to use the services provided by these components. These components may be implemented in hardware, firmware, software, or combinations thereof. It should be appreciated that various different system configurations are possible, which may be different from distributed system 1300. The embodiment shown in FIG. 13 is thus one example of a distributed system for implementing an embodiment system and is not intended to be limiting.

The client computing devices 1302, 1304, 1306, and/or 1308 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1310.

Although distributed system 1300 in FIG. 13 is shown with four client computing devices, any number of client computing devices may be supported. Other devices, such as devices with sensors, etc., may interact with the server 1312.

The network(s) 1310 in the distributed system 1300 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1310 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1312 can include one or more virtual machines running virtual operating systems, or other computing architectures involving virtualization. One or more flexible pools of logical storage devices can be virtualized to maintain virtual storage devices for the server. Virtual networks can be controlled by the server 1312 using software defined networking. In various embodiments, the server 1312 may be adapted to run one or more services or software applications described in the foregoing disclosure. For example, the server 1312 may correspond to a server for performing processing as described above according to an embodiment of the present disclosure.

The server 1312 may run an operating system including any of those discussed above, as well as any commercially available server operating system. Server 109 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 1312 may include one or more applications to analyze and consolidate data feeds and/or event updates received from users of the client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1312 may also include one or more applications to display the data feeds and/or real-time events via one or more display devices of the client computing devices 1302, 1304, 1306, and 1308.

The distributed system 1300 may also include one or more databases 1314 and 1316. These databases may provide a mechanism for storing information such as user identity information, and other information used by various embodiments. Databases 1314 and 1316 may reside in a variety of locations. By way of example, one or more of databases 1314 and 1316 may reside on a non-transitory storage medium local to (and/or resident in) the server 1312. Alternatively, the databases 1314 and 1316 may be remote from the server 1312 and in communication with the server 1312 via a network-based or dedicated connection. In one set of embodiments, the databases 1314 and 1316 may reside in a storage-area network (SAN). Similarly, any necessary files for performing the functions attributed to the server 1312 may be stored locally on the server 1312 and/or remotely, as appropriate. In one set of embodiments, the databases 1314 and 1316 may include relational databases, such as databases provided by Oracle, that are adapted to store, update, and retrieve data in response to SQL-formatted commands.

Figure 14:
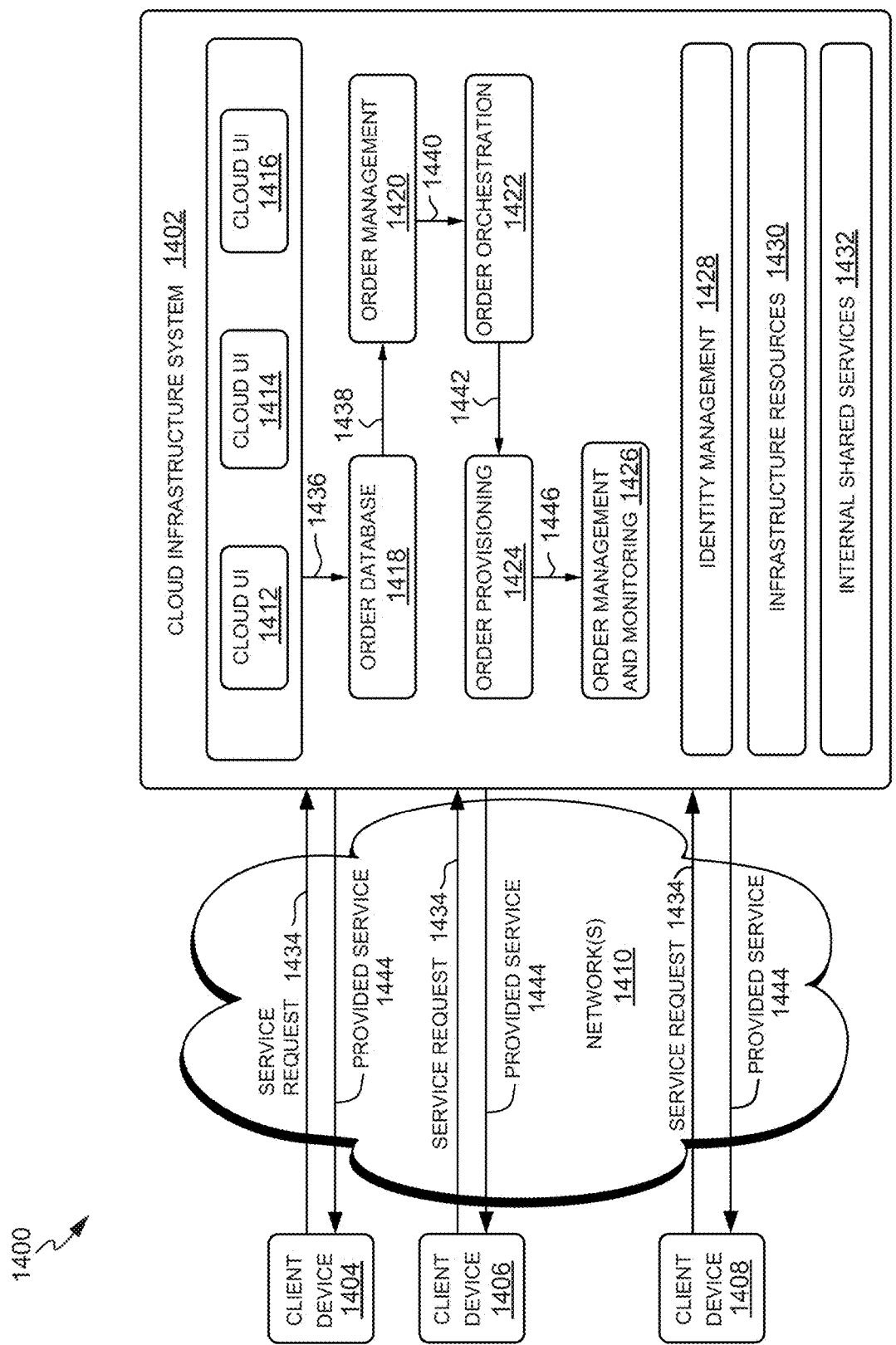
FIG. 14 depicts a simplified block diagram of one or more components of a system environment in which services may be offered as cloud services, in accordance with various embodiments.

In some embodiments, the identity management services described above may be offered as services via a cloud environment. FIG. 14 is a simplified block diagram of one or more components of a system environment 1400 in which services may be offered as cloud services, in accordance with an embodiment of the present disclosure. In the illustrated embodiment in FIG. 14, system environment 1400 includes one or more client computing devices 1404, 1406, and 1408 that may be used by users to interact with a cloud infrastructure system 1402 that provides cloud services, including services for managing entitlements stored in target systems of an organization. Cloud infrastructure system 1402 may comprise one or more computers and/or servers that may include those described above for server 1312.

It should be appreciated that cloud infrastructure system 1402 depicted in FIG. 14 may have other components than those depicted. Further, the embodiment shown in FIG. 14 is only one example of a cloud infrastructure system that may certain embodiments. In some other embodiments, cloud infrastructure system 1402 may have more or fewer components than shown in the figure, may combine two or more components, or may have a different configuration or arrangement of components.

Client computing devices 1404, 1406, and 1408 may be devices similar to those described above for 1302, 1304, 1306, and 1308. Client computing devices 1404, 1406, and 1408 may be configured to operate a client application such as a web browser, a proprietary client application (e.g., Oracle® Forms), or some other application, which may be used by a user of the client computing device to interact with cloud infrastructure system 1402 to use services provided by cloud infrastructure system 1402. Although exemplary system environment 1400 is shown with three client computing devices, any number of client computing devices may be supported. Other devices such as devices with sensors, etc. may interact with cloud infrastructure system 1402.

Network(s) 1410 may facilitate communications and exchange of data between clients 1404, 1406, and 1408 and cloud infrastructure system 1402. Each network may be any type of network familiar to those skilled in the art that can support data communications using any of a variety of commercially-available protocols, including those described above for network(s) 710.

In certain embodiments, services provided by cloud infrastructure system 1402 may include a host of services that are made available to users of the cloud infrastructure system on demand. In addition to services related to identity management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1402 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1402 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1402 may be adapted to automatically provision, manage and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle Corporation) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some embodiments, the services provided by cloud infrastructure system 1402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some embodiments, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1402 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1402 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1402 may also include infrastructure resources 1430 for providing the resources used to provide various services to customers of the cloud infrastructure system. In one embodiment, infrastructure resources 1430 may include pre-integrated and optimized combinations of hardware, such as servers, storage, and networking resources to execute the services provided by the PaaS platform and the SaaS platform, and other resources.

In some embodiments, resources in cloud infrastructure system 1402 may be shared by multiple users and dynamically re-allocated per demand. Additionally, resources may be allocated to users in different time zones. For example, cloud infrastructure system 1402 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1432 may be provided that are shared by different components or modules of cloud infrastructure system 1402 to enable provision of services by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1402, and the like.

In one embodiment, as depicted in FIG. 14, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In an exemplary operation, at 1434, a customer using a client device, such as client device 1404, 1406 or 1408, may interact with cloud infrastructure system 1402 by requesting one or more services provided by cloud infrastructure system 1402 and placing an order for a subscription for one or more services offered by cloud infrastructure system 1402. In certain embodiments, the customer may access a cloud User Interface (UI) such as cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 that the customer intends to subscribe to.

At 1436, the order information received from the customer may be stored in an order database 1418. If this is a new order, a new record may be created for the order. In one embodiment, order database 1418 can be one of several databases operated by cloud infrastructure system 1418 and operated in conjunction with other system elements.

At 1438, the order information may be forwarded to an order management module 1420 that may be configured to perform billing and accounting functions related to the order, such as verifying the order, and upon verification, booking the order.

At 1440, information regarding the order may be communicated to an order orchestration module 1422 that is configured to orchestrate the provisioning of services and resources for the order placed by the customer. In some instances, order orchestration module 1422 may use the services of order provisioning module 1424 for the provisioning. In certain embodiments, order orchestration module 1422 enables the management of business processes associated with each order and applies business logic to determine whether an order should proceed to provisioning.

As shown in the embodiment depicted in FIG. 14, at 1442, upon receiving an order for a new subscription, order orchestration module 1422 sends a request to order provisioning module 1424 to allocate resources and configure resources needed to fulfill the subscription order. Order provisioning module 1424 enables the allocation of resources for the services ordered by the customer. Order provisioning module 1424 provides a level of abstraction between the cloud services provided by cloud infrastructure system 1400 and the physical implementation layer that is used to provision the resources for providing the requested services. This enables order orchestration module 1424 to be isolated from implementation details, such as whether or not services and resources are actually provisioned on the fly or pre-provisioned and only allocated/assigned upon request.

At 1444, once the services and resources are provisioned, a notification may be sent to the subscribing customers indicating that the requested service is now ready for use. In some instance, information (e.g. a link) may be sent to the customer that enables the customer to start using the requested services.

At 1446, a customer's subscription order may be managed and tracked by an order management and monitoring module 1426. In some instances, order management and monitoring module 1426 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1400 may include an identity management module 1428 that is configured to provide identity services, such as access management and authorization services in cloud infrastructure system 1400. In some embodiments, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.) Identity management module 1428 may also include the management of descriptive information about each customer and about how and by whom that descriptive information can be accessed and modified.

Figure 15:
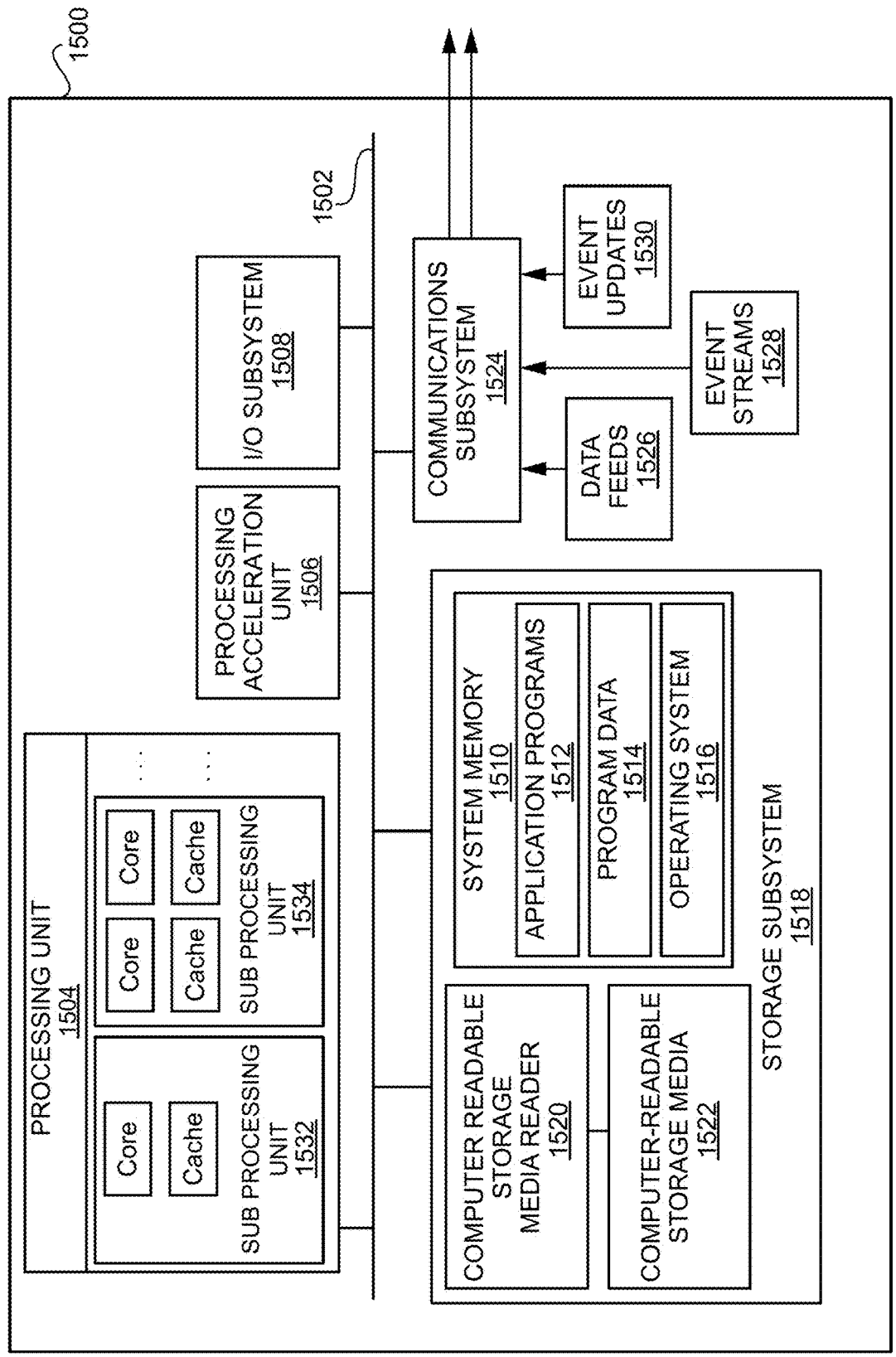
FIG. 15 depicts an exemplary computer system that may be used to implement various embodiments of the present disclosure.

FIG. 15 illustrates an exemplary computer system 1500 that may be used to implement an embodiment of the present disclosure. In some embodiments, computer system 1500 may be used to implement any of the various servers and computer systems described above. As shown in FIG. 15, computer system 1500 includes various subsystems including a processing subsystem 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 may include tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1504 controls the operation of computer system 1500 and may comprise one or more processing units 1532, 1534, etc. A processing unit may include be one or more processors, including single core or multicore processors, one or more cores of processors, or combinations thereof. In some embodiments, processing subsystem 1504 can include one or more special purpose co-processors such as graphics processors, digital signal processors (DSPs), or the like. In some embodiments, some or all of the processing units of processing subsystem 1504 can be implemented using customized circuits, such as application specific integrated circuits (ASICs), or field programmable gate arrays (FPGAs).

In some embodiments, the processing units in processing subsystem 1504 can execute instructions stored in system memory 1510 or on computer readable storage media 1522. In various embodiments, the processing units can execute a variety of programs or code instructions and can maintain multiple concurrently executing programs or processes. At any given time, some or all of the program code to be executed can be resident in system memory 1510 and/or on computer-readable storage media 1510 including potentially on one or more storage devices. Through suitable programming, processing subsystem 1504 can provide various functionalities described above for dynamically modifying documents (e.g., webpages) responsive to usage patterns.

In certain embodiments, a processing acceleration unit 1506 may be provided for performing customized processing or for off-loading some of the processing performed by processing subsystem 1504 so as to accelerate the overall processing performed by computer system 1500.

I/O subsystem 1508 may include devices and mechanisms for inputting information to computer system 1500 and/or for outputting information from or via computer system 1500. In general, use of the term "input device" is intended to include all possible types of devices and mechanisms for inputting information to computer system 1500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1518 provides a repository or data store for storing information that is used by computer system 1500. Storage subsystem 1518 provides a tangible non-transitory computer-readable storage medium for storing the basic programming and data constructs that provide the functionality of some embodiments. Software (programs, code modules, instructions) that when executed by processing subsystem 1504 provide the functionality described above may be stored in storage subsystem 1518. The software may be executed by one or more processing units of processing subsystem 1504. Storage subsystem 1518 may also provide a repository for storing data used in accordance with the various aspects.

Storage subsystem 1518 may include one or more non-transitory memory devices, including volatile and non-volatile memory devices. As shown in FIG. 15, storage subsystem 1518 includes a system memory 1510 and a computer-readable storage media 1522. System memory 1510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1500, such as during start-up, may typically be stored in the ROM. The RAM typically contains data and/or program modules that are presently being operated and executed by processing subsystem 1504. In some implementations, system memory 1510 may include multiple different types of memory, such as static random access memory (SRAM) or dynamic random access memory (DRAM).

By way of example, and not limitation, as depicted in FIG. 15, system memory 1510 may store application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1522 may store programming and data constructs that provide the functionality of some embodiments. Software (programs, code modules, instructions) that when executed by processing subsystem 1504 a processor provide the functionality described above may be stored in storage subsystem 1518. By way of example, computer-readable storage media 1522 may include non-volatile memory such as a hard disk drive, a magnetic disk drive, an optical disk drive such as a CD ROM, DVD, a Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1522 may provide storage of computer-readable instructions, data structures, program modules, and other data for computer system 1500.

In certain embodiments, storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for storing computer-readable information.

In certain embodiments, computer system 1500 may provide support for executing one or more virtual machines. Computer system 1500 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1500. Accordingly, multiple operating systems may potentially be run concurrently by computer system 1500. Each virtual machine generally runs independently of the other virtual machines.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to establish a communication channel to one or more client devices via the Internet for receiving and sending information from and to the client devices. For example, the account management system 112 depicted in FIG. 1 may receive user login information including input related to a training word from client devices using communication subsystem 1524. Additionally, communication subsystem 1524 may be used to communicate notifications of successful logins or notifications to re-enter a password from the account management system to the requesting users.

Communication subsystem 1524 may support both wired and/or wireless communication protocols. For example, in certain embodiments, communications subsystem 1524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

Communication subsystem 1524 can receive and transmit data in various forms. For example, in some embodiments, communications subsystem 1524 may receive input communication in the form of structured and/or unstructured data feeds 1526, event streams 1528, event updates 1530, and the like. For example, communications subsystem 1524 may be configured to receive (or send) data feeds 1526 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1524 may be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1500 depicted in FIG. 15 is intended only as a specific example. Many other configurations having more or fewer components than the system depicted in FIG. 15 are possible. Based on the disclosure and teachings provided herein, a person of ordinary skill in the art will appreciate other ways and/or methods to implement the various embodiments.

While the present embodiments have been described in detail, modifications within the spirit and scope of the embodiments discussed herein will be readily apparent to the skilled artisan. It should be understood that aspects of the various embodiments and portions of various aspects and various features recited above and/or in the appended claims may be combined or interchanged either in whole or in part. In the foregoing descriptions of the various embodiments, those embodiments which refer to another embodiment may be appropriately combined with other embodiments as will be appreciated by the skilled artisan. Furthermore, the skilled artisan will appreciate that the foregoing description is by way of example only, and is not intended to limit the invention.

What is claimed is:

1. A method comprising:
   receiving, at a computing system from a client application executing at a computing device, initial access requests, by a user, to a resource on a target system over a period of time;
   collecting, by the computing system, initial data from the access requests, the initial data including information related to a predefined set of attributes for the initial access requests;
   defining, by the computing system, a set of parameters associated with the initial data collected from the initial access requests, wherein the set of parameters are identified by the resource or the target system;
   creating, by the computing system, a dynamic inspection policy that is configured to: (i) trigger upon the user logging into the target system, and (ii) obtain parameter data from access requests to satisfy the set of parameters;
   collecting, by the computing system implementing the dynamic inspection policy, the parameter data from the access requests, by the user, to the resource on the target system;
   analyzing, by the computer system, the collected parameter data from the access requests against the set of parameters to generate a one or more behavior models for the user, wherein the generating the one or more behavior models comprises classifying the collected parameter data against the set of parameters to obtain classified data and using a clustering algorithm on the classified data to generate data clusters;
   analyzing, by the computing system, data associated with subsequent access requests against the one or more behavior models generated for the user to obtain a behavior based risk for the user, wherein the analyzing the data associated with the subsequent access requests against the one or more behavior models comprises: (i) determining, by the computing system, a deviation of the subsequent access requests from the data clusters of the one or more behavior models, and (ii) obtaining, by the computing system, the behavior based risk for the user based on the deviation;
   determining, by the computing system, a threat perception for the user based on the behavior based risk; and
   challenging or denying, by the computer system, subsequent access requests, by the user, to the resource on the target system based on the threat perception score for the user.

2. The method of claim 1, wherein the analyzing the data associated with the subsequent access requests against the one or more behavior models further comprises selecting a behavior model from the one or more behavior models associated with the user, wherein: (i) the selection is based on the data associated with the subsequent access requests, (ii) the selected behavior model includes a data cluster generated based on a parameter of data, and (iii) the data associated with the subsequent access request includes data associated with the parameter of data.

3. The method of claim 1, further comprising:
   storing, by the computing system, the one or more behavior models; and
   updating, by the computing system, the one or more behavior models based on parameter data from the subsequent access requests, by the user, to the resource on the target system.

4. The method of claim 1, wherein the initial data is collected in real-time from incoming access requests or historical data accumulated from past access requests.

5. A system comprising:
one or more data processors; and
a non-transitory computer readable storage medium containing instructions which, when executed on the one or more data processors, cause the one or more data processors to perform actions comprising:
receiving, at a computing system from a client application executing at a computing device, initial access requests, by a user, to a resource on a target system over a period of time;
collecting, by the computing system, initial data from the access requests, the initial data including information related to a predefined set of attributes for the initial access requests;
defining, by the computing system, a set of parameters associated with the initial data collected from the initial access requests, wherein the set of parameters are identified by the resource or the target system;
creating, by the computing system, a dynamic inspection policy that is configured to: (i) trigger upon the user logging into the target system, and (ii) obtain parameter data from access requests to satisfy the set of parameters;
collecting, by the computing system implementing the dynamic inspection policy, the parameter data from the access requests, by the user, to the resource on the target system;
analyzing, by the computer system, the collected parameter data from the access requests against the set of parameters to generate a one or more behavior models for the user, wherein the generating the one or more behavior models comprises classifying the collected parameter data against the set of parameters to obtain classified data and using a clustering algorithm on the classified data to generate data clusters;
analyzing, by the computing system, data associated with subsequent access requests against the one or more behavior models generated for the user to obtain a behavior based risk for the user, wherein the analyzing the data associated with the subsequent access requests against the one or more behavior models comprises: (i) determining, by the computing system, a deviation of the subsequent access requests from the data clusters of the one or more behavior models, and (ii) obtaining, by the computing system, the behavior based risk for the user based on the deviation;
determining, by the computing system, a threat perception for the user based on the behavior based risk; and
challenging or denying, by the computer system, subsequent access requests, by the user, to the resource on the target system based on the threat perception score for the user.

6. The system of claim 5, wherein the analyzing the data associated with the subsequent access requests against the one or more behavior models further comprises selecting a behavior model from the one or more behavior models associated with the user, wherein: (i) the selection is based on the data associated with the subsequent access requests, (ii) the selected behavior model includes a data cluster generated based on a parameter of data, and (iii) the data associated with the subsequent access request includes data associated with the parameter of data.

7. The system of claim 5, wherein the actions further comprise:
storing, by the computing system, the one or more behavior models; and
updating, by the computing system, the one or more behavior models based on parameter data from the subsequent access requests, by the user, to the resource on the target system.

8. The system of claim 5, wherein the initial data is collected in real-time from incoming access requests or historical data accumulated from past access requests.

9. A computer-program product tangibly embodied in a non-transitory machine-readable storage medium, including instructions configured to cause one or more data processors to perform actions comprising:
receiving, from a client application executing at a computing device, initial access requests, by a user, to a resource on a target system over a period of time;
collecting initial data from the access requests, the initial data including information related to a predefined set of attributes for the initial access requests;
defining a set of parameters associated with the initial data collected from the initial access requests, wherein the set of parameters are identified by the resource or the target system;
creating a dynamic inspection policy that is configured to: (i) trigger upon the user logging into the target system, and (ii) obtain parameter data from access requests to satisfy the set of parameters;
collecting, using the dynamic inspection policy, the parameter data from the access requests, by the user, to the resource on the target system;
analyzing the collected parameter data from the access requests against the set of parameters to generate a one or more behavior models for the user, wherein the generating the one or more behavior models comprises classifying the collected parameter data against the set of parameters to obtain classified data and using a clustering algorithm on the classified data to generate data clusters;
analyzing, by the computing system, data associated with subsequent access requests against the one or more behavior models generated for the user to obtain a behavior based risk for the user, wherein the analyzing the data associated with the subsequent access requests against the one or more behavior models comprises: (i) determining, by the computing system, a deviation of the subsequent access requests from the data clusters of the one or more behavior models, and (ii) obtaining, by the computing system, the behavior based risk for the user based on the deviation;
determining, by the computing system, a threat perception for the user based on the behavior based risk; and
challenging or denying, by the computer system, subsequent access requests, by the user, to the resource on the target system based on the threat perception score for the user.

10. The computer-program product of claim 9, wherein the analyzing the data associated with the subsequent access requests against the one or more behavior models further comprises selecting a behavior model from the one or more behavior models associated with the user, wherein: (i) the selection is based on the data associated with the subsequent access requests, (ii) the selected behavior model includes a data cluster generated based on a parameter of data, and (iii) the data associated with the subsequent access request includes data associated with the parameter of data.

11. The computer-program product of claim 9, wherein the actions further comprise:

storing the one or more behavior models; and updating the one or more behavior models based on parameter data from the subsequent access requests, by the user, to the resource on the target system.

\* \* \* \* \*

UNITED STATES PATENT AND TRADEMARK OFFICE
CERTIFICATE OF CORRECTION

PATENT NO. : 11,265,329 B2
APPLICATION NO. : 16/867243
DATED : March 1, 2022
INVENTOR(S) : Koottayi et al.

Page 1 of 2

It is certified that error appears in the above-identified patent and that said Letters Patent is hereby corrected as shown below:

On the Title Page

On page 2, Column 2, under Other Publications, Line 19, delete "/turbotodd wordpress.com/" and insert -- /turbotodd.wordpress.com/ --, therefor.

In the Drawings

On sheet 4 of 18, in FIG. 4, Line 3, delete "Eg." and insert -- E.g., --, therefor.

On sheet 13 of 18, in FIG. 10, under Reference Numeral 1015, Line 1, delete "occurence" and insert -- occurrence --, therefor.

On sheet 14 of 18, in FIG. 11, under Reference Numeral 1125, Line 2, delete "preception" and insert -- perception --, therefor.

In the Specification

In Column 14, Line 41, delete "stepup" and insert -- step-up --, therefor.

In Column 23, Line 49, after "define" delete "a".

In Column 30, Line 32, delete "system)" and insert -- system). --, therefor.

In Column 31, Line 5, delete "may be may be" and insert -- may be --, therefor.

In Column 39, Line 41, delete "with in" and insert -- within --, therefor.

In Column 46, Line 37, delete "more more" and insert -- more --, therefor.

In Column 47, Line 28, delete "user" and insert -- user. --, therefor.

Signed and Sealed this
Sixteenth Day of August, 2022

Katherine Kelly Vidal
*Director of the United States Patent and Trademark Office*

In Column 48, Line 63, delete "provide" and insert -- provided --, therefor.

In Column 60, Line 67, delete "standards" and insert -- standards) --, therefor.